(12) United States Patent
Nakashima et al.

(10) Patent No.: US 9,609,638 B2
(45) Date of Patent: Mar. 28, 2017

(54) MOBILE STATION APPARATUS, BASE STATION APPARATUS, AND COMMUNICATION METHOD

(71) Applicant: Sharp Kabushiki Kaisha, Osaka-shi, Osaka (JP)

(72) Inventors: Daiichiro Nakashima, Osaka (JP); Kimihiko Imamura, Osaka (JP); Toshizo Nogami, Osaka (JP); Kazuyuki Shimezawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 8 days.

(21) Appl. No.: 14/364,614

(22) PCT Filed: Dec. 7, 2012

(86) PCT No.: PCT/JP2012/081739
§ 371 (c)(1),
(2) Date: Jun. 11, 2014

(87) PCT Pub. No.: WO2013/089020
PCT Pub. Date: Jun. 20, 2013

(65) Prior Publication Data
US 2014/0341146 A1  Nov. 20, 2014

(30) Foreign Application Priority Data

Dec. 12, 2011 (JP) ................................ 2011-270774
Dec. 12, 2011 (JP) ................................ 2011-270775

(51) Int. Cl.
*H04L 1/18* (2006.01)
*H04L 5/00* (2006.01)
(Continued)

(52) U.S. Cl.
CPC ......... *H04W 72/042* (2013.01); *H04L 1/0026* (2013.01); *H04L 1/1812* (2013.01);
(Continued)

(58) Field of Classification Search
CPC . H04W 72/04; H04W 48/12; H04W 72/0413; H04W 72/0446; H04W 72/042;
(Continued)

(56) References Cited

U.S. PATENT DOCUMENTS 8,842,628 B2 * 9/2014 Gao ...................... H04L 5/0016
370/329
8,923,201 B2 * 12/2014 Papasakellariou .. H04W 72/042
370/328
(Continued)

FOREIGN PATENT DOCUMENTS

JP   2015-502695 A   1/2015
WO  WO 2013/070050 A1  5/2013

OTHER PUBLICATIONS

NTT DOCOMO, "DM-RS Design for E-PDCCH in Rel-11," 3GPP TSG RAN WG1 Meeting #67, R1-114302, San Francisco, USA, Nov. 14-18, 2011 (Downloaded by EPO on Nov. 9, 2011), pp. 1-3.
(Continued)

Primary Examiner — Ayaz Sheikh
Assistant Examiner — Debebe Asefa
(74) Attorney, Agent, or Firm — Birch, Stewart, Kolasch & Birch, LLP

(57) ABSTRACT

The present invention enables a signal containing control information to be efficiently transmitted and received between a base station apparatus and a mobile station apparatus. The mobile station apparatus includes a first control unit configured to control, for a localized EPDCCH which is an EPDCCH constituted by a resource of one PRB pair, the EPDCCH being constituted by an aggregation of
(Continued)

one or more ECCEs, a plurality of PRB pairs being configured as a region to which the EPDCCH is to be possibly mapped, an antenna port associated with a reference signal used for demodulation of a signal mapped to a corresponding ECCE constituted by a resource obtained by dividing the PRB pair.

8 Claims, 23 Drawing Sheets

(51) Int. Cl.
  *H04L 1/00* (2006.01)
  *H04W 72/04* (2009.01)
(52) U.S. Cl.
  CPC .......... *H04L 5/0053* (2013.01); *H04L 5/0007* (2013.01); *H04L 5/0023* (2013.01)
(58) Field of Classification Search
  CPC ... H04L 5/0007; H04L 1/1812; H04L 1/0026; H04L 5/0023; H04L 5/0053; H04L 5/0092; H04B 7/0473; H04B 7/068; H04B 7/08; H04J 11/0079
  See application file for complete search history.

(56) References Cited

U.S. PATENT DOCUMENTS 9,084,238 B2 * 7/2015 Gao et al.
2014/0307700 A1 10/2014 Seo et al.

OTHER PUBLICATIONS

Ericsson, ST-Ericsson, NTT DOCOMO, Huawei, HiSilicon, ETRI, Panasonic, Samsung, "Way Forward on downlink control channel enhancements by UE-specific RS AI 7.5.3.2", 3GPP TSG-RAN WG1 #66bis, R1-113589, Zhuhai, China, Oct. 10-14, 2011.
Intel Corporation, "On Downlink Control Signalling Enhancement", 3GPP TSG RAN WG1 Meeting #66, R1-112219, Athens, Greece, Aug. 22-26, 2011.
International Search Report, issued in PCT/JP2012/081739, dated Mar. 5, 2013.
MediaTek Inc., "Utilization of DRS Antenna Ports for Diversity and Beamforming Schemes in ePDCCH", 3GPP TSG-RAN WG1 #68bis, R1-121171, Jeju, Korea, Mar. 26-Mar. 30, 2012.
Samsung, "DM-RS based Distributed and Localized E-PDCCH structure", 3GPP TSG RAN WG1 #67, R1-114396, San Francisco, USA, Nov. 14-18, 2011, pp. 1-4.
Written Opinion of the International Searching Authority, issued in PCT/JP2012/081739, dated Mar. 5, 2013.

* cited by examiner

MOBILE STATION APPARATUS, BASE STATION APPARATUS, AND COMMUNICATION METHOD

TECHNICAL FIELD

The present invention relates to a communication system, a mobile station apparatus, a base station apparatus, a communication method, and an integrated circuit that enable, in a communication system including a plurality of mobile station apparatuses and a base station apparatus, efficient configuration of a region to which a signal containing control information is to be possibly mapped so as to allow the base station apparatus to efficiently transmit the signal containing control information to the mobile station apparatuses and allow the mobile station apparatuses to efficiently receive the signal containing control information from the base station apparatus.

BACKGROUND ART

Evolved radio access schemes and wireless networks for cellular mobile communication (hereinafter, referred to as "Long Term Evolution (LTE)" or "Evolved Universal Terrestrial Radio Access (EUTRA)." have been standardized by 3rd Generation Partnership Project (3GGP). LTE employs orthogonal frequency division multiplexing (OFDM), which is multi-carrier transmission, as a communication scheme for wireless communication from the base station apparatus to the mobile station apparatus (downlink; referred to as DL.). LTE also employs single-carrier frequency division multiple access (SC-FDMA), which is single-carrier transmission, as a communication scheme for wireless communication from the mobile station apparatus to the base station apparatus (uplink; referred to as UL.). Specifically, LTE employs DFT-Spread OFDM (Discrete Fourier Transform-Spread OFDM) as the SC-FDMA scheme.

LTE-A (LTE-Advanced), which is advanced LTE and employs new techniques, is being studied. It is assumed that LTE-A at least supports the same channel structure as that employed in LTE. A channel refers to a medium used for transmission of a signal. Channels used in the physical layer and channels used in the medium access control (MAC) layer are respectively referred to as physical channels and logical channels. Kinds of the physical channels include a physical downlink shared channel (PUSCH) used for transmission and reception of downlink data and control information, a physical downlink control channel (PDCCH) used for transmission and reception of downlink control information, a physical uplink shared channel (PUSCH) used for transmission and reception of uplink data and control information, a physical uplink control channel (PUCCH) used for transmission and reception of control information, a synchronization channel (SCH) used to establish downlink synchronization, a physical random access channel (PRACH) used to establish uplink synchronization, a physical broadcast channel (PBCH) used for transmission of downlink system information, and so on. The mobile station apparatus or the base station apparatus maps signals generated from control information, data, etc. to respective physical channels, and transmits the signals. Data transmitted on the physical downlink shared channel or the physical uplink shared channel is referred to as a transport block.

Control information mapped to the physical uplink control channel is referred to as uplink control information (UCI). The uplink control information is control information (reception confirmation response; ACK/NACK) representing acknowledgement (ACK) or negative acknowledgement (NACK) for data mapped on the received physical downlink shared channel, control information (Scheduling Request: SR) representing a request for uplink resource allocation, or control information (Channel Quality Indicator: CQI) representing downlink reception quality (also referred to as channel quality).

<Coordinated Communication>

Inter-cell coordinated communication (Cooperative Multipoint: CoMP communication) in which communication is performed with coordination among neighboring cells is being studied for LTE-A in order to reduce or suppress interference on a mobile station apparatus in a cell-edge area or in order to increase power of a received signal. For example, a configuration in which the base station apparatus performs communication using one given frequency band is called a "cell". For example, as inter-cell coordinated communication, a method (also referred to as Joint Processing or Joint Transmission) is being studied in which signal processing (precoding processing) is applied to a signal using different weights for different cells and a plurality of base station apparatuses transmit the resulting signal to a single mobile station apparatus in a coordinated manner. This method can increase a signal-to-interference-plus-noise power ratio at the mobile station apparatus and improve reception performances at the mobile station apparatus. For example, as inter-cell coordinated communication, a method (Coordinated Scheduling: CS) is being studied in which scheduling is performed for a mobile station apparatus with coordination among a plurality of cells. This method can increase a signal-to-interference-plus-noise power ratio at the mobile station apparatus. For example, as inter-cell coordinated communication, a method (Coordinated beamforming: CB) is being studied in which beamforming is applied to a signal with coordination among a plurality of cells and the resulting signal is transmitted to a mobile station apparatus. This method can increase a signal-to-interference-plus-noise power ratio at the mobile station apparatus. For example, as inter-cell coordinated communication, a method (Blanking or Muting) is being studied in which a signal is transmitted using a certain resource in one cell but no signal is transmitted using the certain resource in another cell. This method can increase a signal-to-interference-plus-noise power ratio at the mobile station apparatus.

As for a plurality of cells used for coordinated communication, different cells may be configured by different base station apparatuses, different cells may be configured by different RRHs (Remote Radio Heads which are outdoor radio units smaller than base station apparatuses and also referred to as Remote Radio Units: RRUs) managed by the same base station apparatus, different cells may be configured by a base station apparatus and an RRH managed by the base station apparatus, or different cells may be configured by a base station apparatus and an RRH managed by another base station apparatus different from the base station apparatus.

A base station apparatus having wide coverage is generally referred to as a macro base station apparatus. A base station apparatus having narrow coverage is generally referred to as a pico base station apparatus or femto base station apparatus. In general, applications of RRHs in a coverage area narrower than that of the macro base station apparatus are being studied. A deployment such as a communication system which includes a macro base station apparatus and an RRH and in which coverage supported by the macro base station apparatus includes part or entirety of coverage supported by the RRH is referred to as a heterogeneous network deployment. A method is being studied in which the macro base station apparatus and the RRH transmit a signal to a mobile station apparatus located in their overlapping coverage in a coordinated manner in a communication system of such a heterogeneous network deployment. Here, the RRH is managed by the macro base station apparatus and its transmission and reception are controlled by the macro base station apparatus. In addition, the macro base station apparatus and the RRH are connected to each other via a wired line such as optical fiber or a wireless line based on a relay technology. The macro base station apparatus and the RRH perform coordinated communication using partially or entirely the same radio resources in this way, whereby overall spectral efficiency (transmission capacity) in the coverage area of the macro base station apparatus can be improved.

While being located near the macro base station apparatus or RRH, the mobile station apparatus is able to perform single-cell communication with the macro base station apparatus or RRH. That is, the mobile station apparatus performs communication with the macro base station apparatus or RRH so as to transmit and receive signals without using coordinated communication. For example, the macro base station apparatus receives an uplink signal from the mobile station apparatus located near the macro base station apparatus. For example, the RRH receives an uplink signal from the mobile station apparatus located near the RRH. Further, while being located near the edge (cell edge) of the coverage of the RRH, the mobile station apparatus requires some measures against co-channel interference from the macro base station apparatus. A method is being studied in which a CoMP scheme enabling coordinated operation of neighboring base station apparatuses is used as multi-cell communication (coordinated communication) of the macro base station apparatus and the RRH so as to reduce or suppress interference on the mobile station apparatus in a cell-edge area.

It is also studied that the mobile station apparatus receives a signal transmitted from both the macro base station apparatus and the RRH using coordinated communication on the downlink and transmits a signal in a form suitable for the macro base station apparatus or RRH on the uplink. For example, the mobile station apparatus transmits an uplink signal at a transmit power suitable for the signal to be received at the macro base station apparatus. For example, the mobile station apparatus transmits an uplink signal at a transmit power suitable for the signal to be received at the RRH. In this way, unnecessary uplink interference can be reduced and spectral efficiency can be improved.

For a data signal reception process, the mobile station apparatus needs to obtain control information representing a modulation scheme, a coding rate, the number of spatial multiplexing, a transmit power adjustment value, resource allocation, and so forth used for a data signal. Introduction of a new control channel for transmitting control information regarding a data signal to LTE-A is being considered (NPL 1). For example, how to improve the overall capacity of control channels is being studied. For example, how to support frequency-domain interference coordination for the new control channel is being studied. For example, how to support spatial multiplexing for the new control channel is being studied. For example, how to support beamforming for the new control channel is being studied. For example, how to support diversity for the new control channel is being studied. For example, the use of the new control channel on a new type of carrier is being studied. For example, it is being studied that a reference signal used in common by all mobile station apparatuses located in a cell is not to be transmitted on the new type of carrier. For example, it is being studied that the reference signal used in common by all mobile station apparatuses located in a cell is transmitted less frequently on the new type of carrier than on the currently used carrier. For example, it is being studied that a signal such as control information is demodulated by the mobile station apparatus using a specific reference signal for the new type of carrier.

For example, in order to implement beamforming, employment of coordinated communication and multi-antenna transmission for the new control channel is being studied. Specifically, it is being studied that a plurality of base station apparatuses and a plurality of RRHs supporting LTE-A apply precoding processing to signals of the new control channel and also apply the same precoding processing to a reference signal (RS) used to demodulate the signals of the new control channel. Specifically, it is being studied that a plurality of base station apparatuses and a plurality of RRHs supporting LTE-A transmit the signals of the new control channel and the RS that are subjected to the same precoding processing, after mapping them to a resource region where the PDSCH is mapped in LTE. It is being studied that a mobile station apparatus supporting LTE-A acquires control information by demodulating the signals of the new control channel having been subjected to the precoding processing, by using the received RS having been subjected to the same precoding processing. With this method, the base station apparatus and the mobile station apparatus no longer need to exchange information regarding the precoding processing applied to the signals of the new control channel therebetween.

For example, in order to implement diversity, a method is being studied in which signals of the new control channel are configured using non-contiguous resources in the frequency domain so as to obtain the advantage of frequency diversity. On the other hand, for the case where beamforming is applied to the new control channel, a method is being studied in which the signals of the new control channel are configured using contiguous resources in the frequency domain.

For example, in order to support spatial multiplexing, employment of MU-MIMO (Multi User-Multi Input Multi Output) enabling multiplexing of control channels addressed to different mobile station apparatuses on the same resource is being studied. Specifically, it is studied that the base station apparatus transmits reference signals that are orthogonal between different mobile station apparatuses and also spatially multiplexes and transmits different signals of the new control channels on a common resource. For example, spatial multiplexing of different signals of the new control channels is implemented by applying beamforming (precoding processing) suitable for each of the different signals of the new control channels.

CITATION LIST

Patent Literature

Non Patent Literature

NPL 1: 3GPP TSG RAN1 #66bis, Zhuhai, China, 10-14, October, 2011, R1-113589 "Way Forward on downlink control channel enhancements by UE-specific RS"

SUMMARY OF INVENTION

Technical Problem

It is desirable that resources are efficiently used to transmit and receive control channels. Control channels require an amount of resources that meets requirements for each mobile station apparatus. Without the efficient use of resources for control channels, the capacity of the control channels are not to be increased, and hence the number of mobile station apparatuses assigned the control channels is not to be increased.

For example, it is desirable to make it possible to efficiently control an improvement of the overall capacity of control channels through spatial multiplexing of a new control channel using MU-MIMO and control an improvement of the overall capacity of control channels by improving performances on the new control channel using beamforming instead of MU-MIMO.

The present invention has been made in view of the points described above, and an object thereof is related to a communication system, a mobile station apparatus, a base station apparatus, a communication method, and an integrated circuit that enable, in a communication system including a plurality of mobile station apparatuses and a base station apparatus, efficient configuration of a region to which a signal containing control information is to be possibly mapped so as to allow the base station apparatus to efficiently transmit the signal containing control information to the mobile station apparatuses and allow the mobile station apparatuses to efficiently receive the signal containing control information from the base station apparatus.

Solution to Problem (1) To achieve the above object, the present invention has made the following measures. Specifically, a communication system according to the present invention is a communication system including a plurality of mobile station apparatuses, and a base station apparatus configured to communicate with the plurality of mobile station apparatuses using an EPDCCH (Enhanced Physical Downlink Control CHannel), the EPDCCH being constituted by an aggregation of one or more ECCEs (Enhanced Control Channel Elements), a plurality of PRB pairs (Physical Resource Block pairs) being configured as a region to which the EPDCCH is to be possibly mapped. The base station apparatus includes a second control unit configured to control, for a localized EPDCCH which is an EPDCCH constituted by a resource of one PRB pair, an antenna port used for transmission of a signal mapped to a corresponding ECCE constituted by a resource obtained by dividing the PRB pair. The mobile station apparatuses each include a first control unit configured to control, for a localized EPDCCH which is an EPDCCH constituted by a resource of one PRB pair, an antenna port associated with a reference signal used for demodulation of a signal mapped to a corresponding ECCE constituted by a resource obtained by dividing the PRB pair.

(2) In the communication system according to the present invention, the second control unit is configured to perform control so that signals mapped to different ECCEs in the PRB pair are to be transmitted using different antenna ports, or perform control so that signals mapped to a plurality of ECCEs in the PRB pair are to be transmitted using a common antenna port.

(3) In the communication system according to the present invention, the first control unit is configured to perform control so that signals mapped to different ECCEs in the PRB pair are to be demodulated using respective reference signals associated with different antenna ports, or perform control so that signals mapped to a plurality of ECCEs in the PRB pair are to be demodulated using a reference signal associated with a common antenna port.

(4) In the communication system according to the present invention, the second control unit is configured to perform control for a distributed EPDCCH which is an EPDCCH constituted by resources of a plurality of PRB pairs so that signals mapped to individual ECCEs are to be transmitted using a plurality of common antenna ports.

(5) In the communication system according to the present invention, the first control unit is configured to perform control for a distributed EPDCCH which is an EPDCCH constituted by resources of a plurality of PRB pairs so that signals mapped to individual ECCEs are to be demodulated using respective reference signals each associated with a corresponding one of a plurality of common antenna ports.

(6) A mobile station apparatus according to the present invention is a mobile station apparatus configured to communicate with a base station apparatus using an EPDCCH (Enhanced Physical Downlink Control CHannel), the EPDCCH being constituted by an aggregation of one or more ECCEs (Enhanced Control Channel Elements), a plurality of PRB pairs (Physical Resource Block pairs) being configured as a region to which the EPDCCH is to be possibly mapped. The mobile station apparatus includes a first control unit configured to control, for a localized EPDCCH which is an EPDCCH constituted by a resource of one PRB pair, an antenna port associated with a reference signal used for demodulation of a signal mapped to a corresponding ECCE constituted by a resource obtained by dividing the PRB pair.

(7) In the mobile station apparatus according to the present invention, the first control unit is configured to perform control so that signals mapped to different ECCEs in the PRB pair are to be demodulated using respective reference signals associated with different antenna ports, or perform control so that signals mapped to a plurality of ECCEs in the PRB pair are to be demodulated using a reference signal associated with a common antenna port.

(8) In the mobile station apparatus according to the present invention, the first control unit is configured to perform control for a distributed EPDCCH which is an EPDCCH constituted by resources of a plurality of PRB pairs so that signals mapped to individual ECCEs are to be demodulated using respective reference signals each associated with a corresponding one of a plurality of common antenna ports.

(9) A base station apparatus according to the present invention is a base station apparatus configured to communicate with a plurality of mobile station apparatuses using an EPDCCH (Enhanced Physical Downlink Control CHannel), the EPDCCH being constituted by an aggregation of one or more ECCEs (Enhanced Control Channel Elements), a plurality of PRB pairs (Physical Resource Block pairs) being configured as a region to which the EPDCCH is to be possibly mapped. The base station apparatus includes a second control unit configured to control, for a localized EPDCCH which is an EPDCCH constituted by a resource of one PRB pair, an antenna port used for transmission of a signal mapped to a corresponding ECCE constituted by a resource obtained by dividing the PRB pair.

(10) In the base station apparatus according to the present invention, the second control unit is configured to perform control so that signals mapped to different ECCEs in the PRB pair are to be transmitted using different antenna ports, or perform control so that signals mapped to a plurality of ECCEs in the PRB pair are to be transmitted using a common antenna port.

(11) In the base station apparatus according to the present invention, the second control unit is configured to perform control for a distributed EPDCCH which is an EPDCCH constituted by resources of a plurality of PRB pairs so that signals mapped to individual ECCEs are to be transmitted using a plurality of common antenna ports.

(12) A communication method according to the present invention is a communication method used in a mobile station apparatus configured to communicate with a base station apparatus using an EPDCCH (Enhanced Physical Downlink Control CHannel), the EPDCCH being constituted by an aggregation of one or more ECCEs (Enhanced Control Channel Elements), a plurality of PRB pairs (Physical Resource Block pairs) being configured as a region to which the EPDCCH is to be possibly mapped. The communication method includes at least a step of controlling, for a localized EPDCCH which is an EPDCCH constituted by a resource of one PRB pair, an antenna port associated with a reference signal used for demodulation of a signal mapped to a corresponding ECCE constituted by a resource obtained by dividing the PRB pair.

(13) The communication method according to the present invention further includes a step of performing control so that signals mapped to different ECCEs in the PRB pair are to be demodulated using respective reference signals associated with different antenna ports, or of performing control so that signals mapped to a plurality of ECCEs in the PRB pair are to be demodulated using a reference signal associated with a common antenna port.

(14) The communication method according to the present invention further includes a step of performing control for a distributed EPDCCH which is an EPDCCH constituted by resources of a plurality of PRB pairs so that signals mapped to individual ECCEs are to be demodulated using respective reference signals each associated with a corresponding one of a plurality of common antenna ports.

(15) A communication method according to the present invention is a communication method used in a base station apparatus configured to communicate with a plurality of mobile station apparatuses using an EPDCCH (Enhanced Physical Downlink Control CHannel), the EPDCCH being constituted by an aggregation of one or more ECCEs (Enhanced Control Channel Elements), a plurality of PRB pairs (Physical Resource Block pairs) being configured as a region to which the EPDCCH is to be possibly mapped. The communication method includes at least a step of controlling, for a localized EPDCCH which is an EPDCCH constituted by a resource of one PRB pair, an antenna port used for transmission of a signal mapped to a corresponding ECCE constituted by a resource obtained by dividing the PRB pair.

(16) The communication method according to the present invention further includes a step of performing control so that signals mapped to different ECCEs in the PRB pair are to be transmitted using different antenna ports, or of performing control so that signals mapped to a plurality of ECCEs in the PRB pair are to be transmitted using a common antenna port.

(17) The communication method according to the present invention further includes a step of performing control for a distributed EPDCCH which is an EPDCCH constituted by resources of a plurality of PRB pairs so that signals mapped to individual ECCEs are to be transmitted using a plurality of common antenna ports.

(18) An integrated circuit according to the present invention is an integrated circuit to be mounted in a mobile station apparatus configured to communicate with a base station apparatus using an EPDCCH (Enhanced Physical Downlink Control CHannel), the EPDCCH being constituted by an aggregation of one or more ECCEs (Enhanced Control Channel Elements), a plurality of PRB pairs (Physical Resource Block pairs) being configured as a region to which the EPDCCH is to be possibly mapped. The integrated circuit includes a first control unit configured to control, for a localized EPDCCH which is an EPDCCH constituted by a resource of one PRB pair, an antenna port associated with a reference signal used for demodulation of a signal mapped to a corresponding ECCE constituted by a resource obtained by dividing the PRB pair.

(19) In the integrated circuit according to the present invention, the first control unit is configured to perform control so that signals mapped to different ECCEs in the PRB pair are to be demodulated using respective reference signals associated with different antenna ports, or perform control so that signals mapped to a plurality of ECCEs in the PRB pair are to be demodulated using a reference signal associated with a common antenna port.

(20) In the integrated circuit according to the present invention, the first control unit is configured to perform control for a distributed EPDCCH which is an EPDCCH constituted by resources of a plurality of PRB pairs so that signals mapped to individual ECCEs are to be demodulated using respective reference signals each associated with a corresponding one of a plurality of common antenna ports.

(21) An integrated circuit according to the present invention is an integrated circuit to be mounted in a base station apparatus configured to communicate with a plurality of mobile station apparatuses using an EPDCCH (Enhanced Physical Downlink Control CHannel), the EPDCCH being constituted by an aggregation of one or more ECCEs (Enhanced Control Channel Elements), a plurality of PRB pairs (Physical Resource Block pairs) being configured as a region to which the EPDCCH is to be possibly mapped. The integrated circuit includes a second control unit configured to control, for a localized EPDCCH which is an EPDCCH constituted by a resource of one PRB pair, an antenna port used for transmission of a signal mapped to a corresponding ECCE constituted by a resource obtained by dividing the PRB pair.

(22) In the integrated circuit according to the present invention, the second control unit is configured to perform control so that signals mapped to different ECCEs in the PRB pair are to be transmitted using different antenna ports, or perform control so that signals mapped to a plurality of ECCEs in the PRB pair are to be transmitted using a common antenna port.

(23) In the integrated circuit according to the present invention, the second control unit is configured to perform control for a distributed EPDCCH which is an EPDCCH constituted by resources of a plurality of PRB pairs so that signals mapped to individual ECCEs are to be transmitted using a plurality of common antenna ports.

Herein, the present invention is disclosed in terms of improvements of a communication system, a mobile station apparatus, a base station apparatus, a communication method, and an integrated circuit that allow a base station apparatus to configure, for a mobile station apparatus, a region to which a control channel is to be possibly mapped.

However, communication schemes to which the present invention is applicable are not limited to LTE or other communication schemes having upward compatibility to LTE, such as LTE-A. For example, the present invention is applicable to UMTS (Universal Mobile Telecommunications System).

Advantageous Effects of Invention

According to the present invention, a base station apparatus can efficiently transmit a signal containing control information to a mobile station apparatus, a mobile station apparatus can efficiently receive a signal containing control information from a base station apparatus, and an efficient communication system can be implemented.

DESCRIPTION OF EMBODIMENTS

Technologies described herein can be used in various wireless communication systems, such as a code division multiple access (CDMA) system, a time division multiple access (TDMA) system, a frequency division multiple access (FDMA) system, an orthogonal frequency division multiple access (OFDMA) system, a single-carrier FDMA (SC-FDMA) system, and other systems. The terms "system" and "network" are often used interchangeably. In a CDMA system, a wireless technology (standard) such as Universal Terrestrial Radio Access (UTRA) or cdma2000 (registered trademark) can be implemented. UTRA includes wideband CDMA (WCDMA) and other improved types of CDMA. The cdma2000 covers IS-2000, IS-95, and IS-856 standards. In a TDMA system, a wireless technology such as Global System for Mobile Communications (GSM (registered trademark)) can be implemented. In an OFDMA system, a wireless technology such as Evolved UTRA (E-UTRA), Ultra Mobile Broadband (UMB), IEEE 802.11 (Wi-Fi), IEEE 802.16 (WiMAX), IEEE 802.20, or Flash-OFDM (registered trademark) can be implemented. UTRA and E-UTRA are part of Universal Mobile Telecommunications System (UMTS). 3GPP's LTE (Long Term Evolution) is UMTS that uses E-UTRA in which OFDMA is adopted in the downlink and SC-FDMA is adopted in the uplink. LTE-A is an improved system, wireless technology, or standard of LTE. UTRA, E-UTRA, UMTS, LTE, LTE-A, and GSM (registered trademark) are explained in documentation issued by an organization called 3rd Generation Partnership Project (3GPP). The cdma2000 and UMB are explained in documentation issued by an organization called 3rd Generation Partnership Project 2 (3GPP2). For clarification, an aspect of the present technology will be described below in relation to data communication based on LTE and LTE-A. Accordingly, the following description uses many LTE and LTE-A terms.

Figure 7:
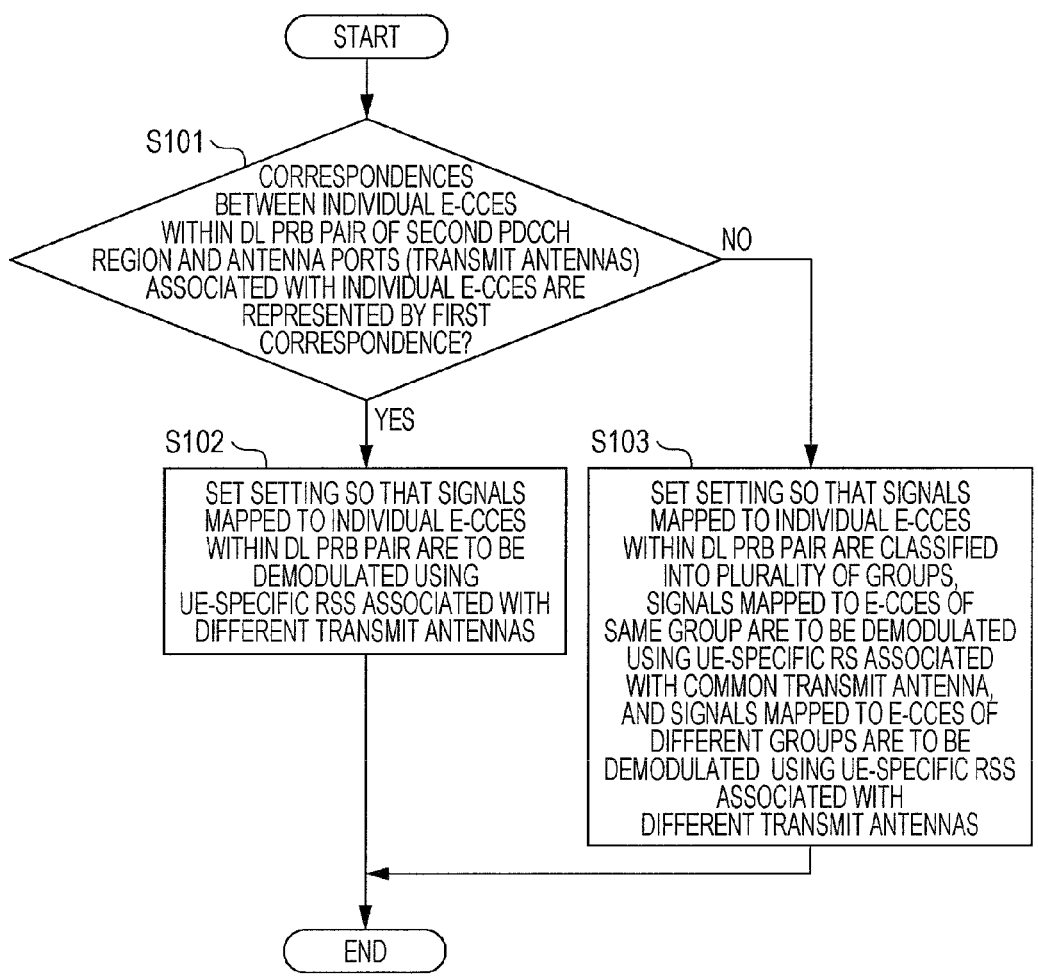
FIG. 7 is a flowchart illustrating an example of processing related to setting of UE-specific RSs used for demodulation of individual E-CCEs in a DL PRB pair of a second PDCCH region performed by the mobile station apparatus 5 in accordance with a first embodiment of the present invention.
Figure 8:
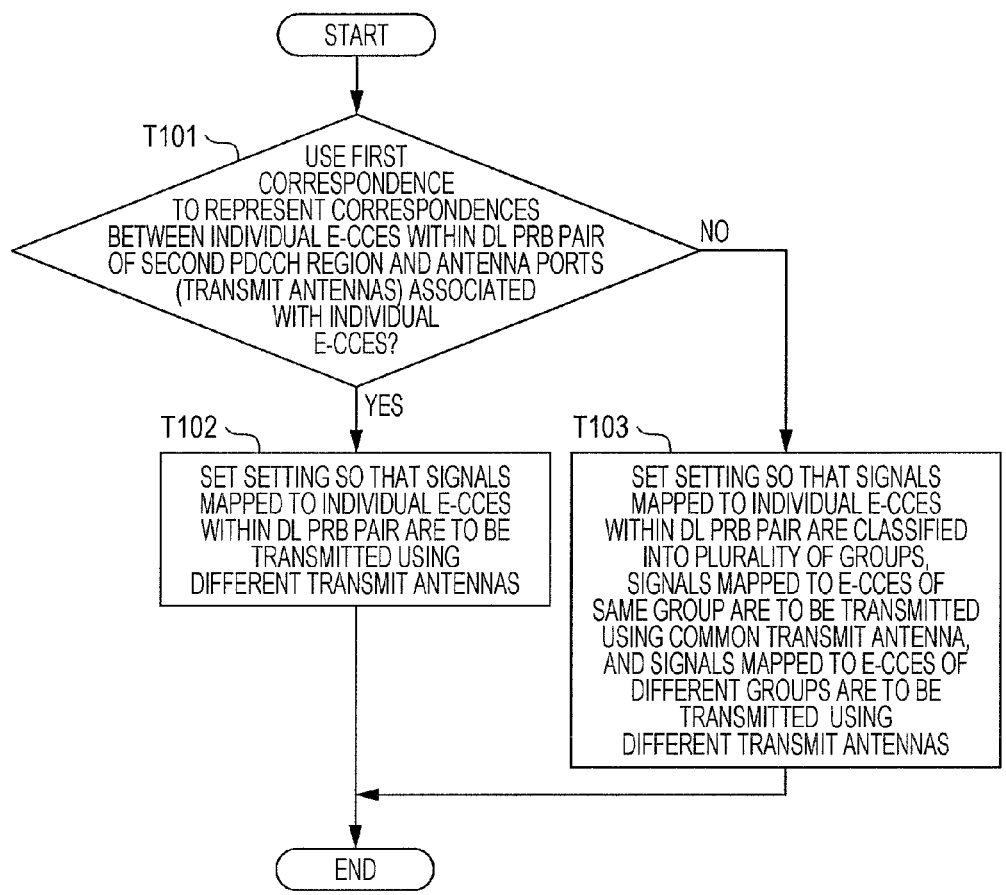
FIG. 8 is a flowchart illustrating an example of processing related to setting of transmit antennas (antenna ports) used for transmission of individual E-CCEs in a DL PRB pair of a second PDCCH region performed by the base station apparatus 3 in accordance with the first embodiment of the present invention.

An embodiment of the present invention will be described in detail below with reference to the drawings. Referring to FIGS. 9 to 23, the overview of a communication system according to the embodiment, the structure of a radio frame, etc. will be described. Referring to FIGS. 1 to 6, the configuration of the communication system according to the embodiment will be described. Referring to FIGS. 7 and 8, operation processes of the communication system according to the embodiment will be described.

Figure 9:
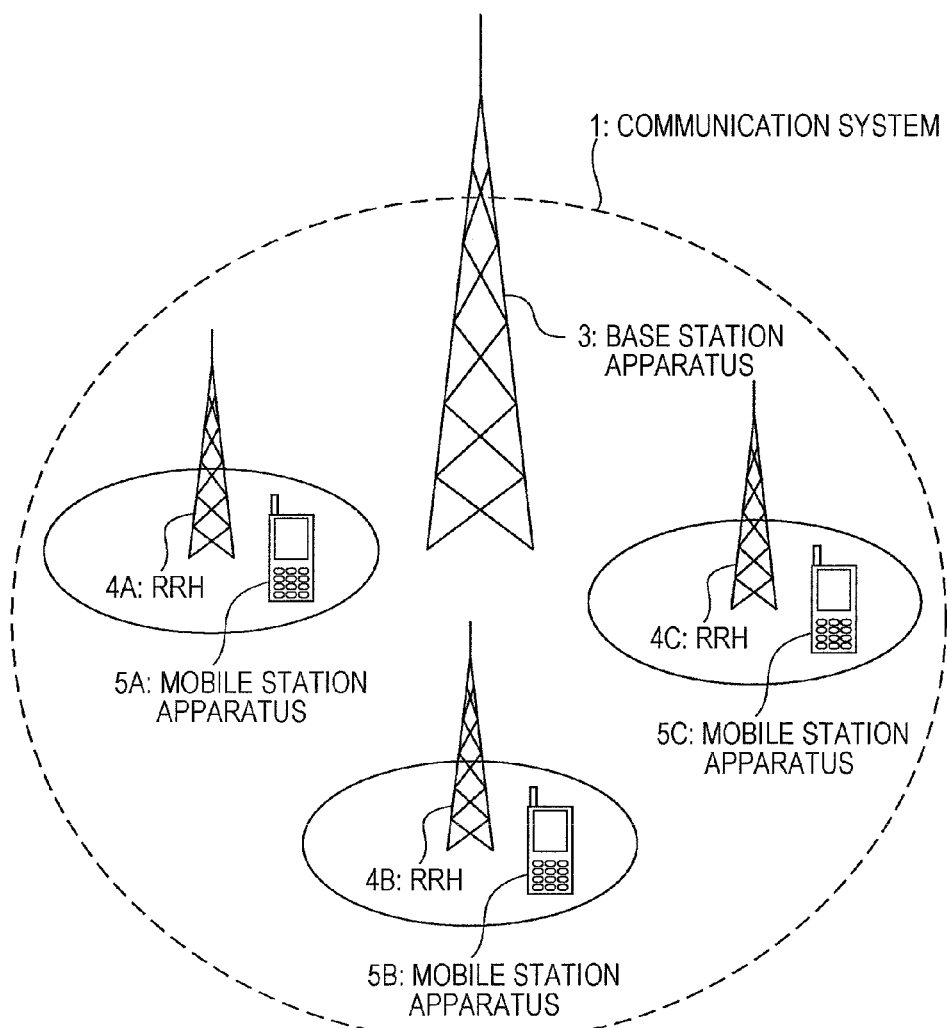
FIG. 9 is a diagram schematically explaining the overview of a communication system according to the embodiment of the present invention.

FIG. 9 is a diagram schematically explaining the overview of a communication system according to an embodiment of the present invention. In a communication system 1 illustrated in this figure, a base station apparatus (also referred to as an eNodeB, NodeB, BS: Base Station, AP: Access Point, or a macro base station) 3; a plurality of RRHs (Remote Radio Heads, i.e., apparatuses each including an outdoor radio unit smaller than base station apparatuses, and also referred to as Remote Radio Units: RRUs) (also referred to as remote antennas or distributed antennas) 4A, 4B, and 4C; and a plurality of mobile station apparatuses (also referred to as UEs: User Equipment, MSs: Mobile Stations, MTs: Mobile Terminals, terminals, terminal apparatuses, mobile terminals) 5A, 5B, and 5C perform communication with one another. In the embodiment, the description will be appropriately given below in which the RRHs 4A, 4B, and 4C are each referred to as an RRH 4 and the mobile station apparatuses 5A, 5B, and 5C are each referred to as a mobile station apparatus 5. In the communication system 1, the base station apparatus 3 and the RRH 4 perform communication with the mobile station apparatus 5 in a coordinated manner. Referring to FIG. 9, the base station apparatus 3 and the RRH 4A perform coordinated communication with the mobile station apparatus 5A, the base station apparatus 3 and the RRH 4B perform coordinated communication with the mobile station apparatus 5B, and the base station apparatus 3 and the RRH 4C perform coordinated communication with the mobile station apparatus 5C.

Note that an RRH can be considered as a special form of a base station apparatus. For example, an RRH can be considered as a base station apparatus that includes only a signal processing unit and for which parameters used by the RRH are set and scheduling is decided by another base station apparatus. Accordingly, it should be noted that the expression "base station apparatus 3" appropriately encompasses the RRH 4 in the following description.

<Coordinated Communication>

The communication system 1 according to the embodiment of the present invention can employ coordinated communication (Cooperative Multipoint: CoMP communication) in which transmission and reception of a signal is performed in a coordinated manner using a plurality of cells. For example, a configuration in which a base station apparatus performs communication using one given frequency band is referred to as a "cell". For example, in coordinated communication, a plurality of cells (the base station apparatus 3 and the RRH 4) apply signal processing (precoding processing) to a signal using different weights, and the base station apparatus 3 and the RRH 4 transmit the signal to the same mobile station apparatus 5 in a coordinated manner (Joint Processing or Joint Transmission). For example, in coordinated communication, scheduling is performed for the mobile station apparatus 5 with coordination among a plurality of cells (the base station apparatus 3 and the RRH 4) (Coordinated Scheduling: CS). For example, in coordinated communication, a plurality of cells (the base station apparatus 3 and the RRH 4) apply beamforming to a signal in a coordinated manner, and transmit the resulting signal to the mobile station apparatus 5 (Coordinated Beamforming: CB). For example, in coordinated communication, one cell (the base station apparatus 3 or the RRH 4) transmits a signal using a certain resource and the other cell (the other of the base station apparatus 3 and the RRH 4) transmits no signal using the certain resource (Blanking or Muting).

Although the description regarding a plurality of cells used for coordinated communication is omitted in the embodiment of the present invention, different cells may be configured by the different base station apparatuses 3, different cells may be configured by the different RRHs 4 managed by the same base station apparatus 3, or different cells may be configured by the base station apparatus 3 and the RRH 4 managed by a different base station apparatus 3 from the base station apparatus.

Note that a plurality of cells are used as different cells physically; however, the plurality of cells may be used as the same cell logically. Specifically, a common cell identifier (physical cell ID) may be used for the cells. A configuration in which a plurality of transmission apparatuses (the base station apparatus 3 and the RRH 4) transmit a common signal to the same reception apparatus using the same frequency band is referred to as a single frequency network (SFN).

A deployment of the communication system 1 according to the embodiment of the present invention assumes heterogeneous network deployments. The communication system 1 includes the base station apparatus 3 and the RRH 4. Coverage supported by the base station apparatus 3 includes part or entirety of coverage supported by the RRH 4. Here, coverage refers to an area in which communication meeting requirements can be performed. In the communication system 1, the base station apparatus 3 and the RRH 4 transmit a signal to the mobile station apparatus 5 located in their overlapping coverage in a coordinated manner. Here, the RRH 4 is managed by the base station apparatus 3 and its transmission and reception is controlled by the base station apparatus 3. Note that the base station apparatus 3 and the RRH 4 are connected to each other via a wired line such as optical fiber or a wireless line based on a relay technology.

While being located near the base station apparatus 3 or the RRH 4, the mobile station apparatus 5 may use single-cell communication with the base station apparatus 3 or the RRH 4. That is, the mobile station apparatus 5 may perform communication with the base station apparatus 3 or the RRH 4 so as to transmit and receive signals without using coordinated communication. For example, the base station apparatus 3 may receive an uplink signal from the mobile station apparatus 5 located near the base station apparatus 3. For example, the RRH 4 may receive an uplink signal from the mobile station apparatus 5 located near the RRH 4. Also, for example, both the base station apparatus 3 and the RRH 4 may receive an uplink signal from the mobile station apparatus 5 located near the edge (cell edge) of the coverage of the RRH 4.

The mobile station apparatus 5 may receive signals transmitted from both the base station apparatus 3 and the RRH 4 using coordinated communication in the downlink and may transmit a signal in a form suitable for the base station apparatus 3 or the RRH 4 in the uplink. For example, the mobile station apparatus 5 transmits an uplink signal at a transmit power suitable for the signal to be received at the base station apparatus 3. For example, the mobile station apparatus 5 transmits an uplink signal at a transmit power suitable for the signal to be received at the RRH 4.

In addition, in the embodiment of the present invention, MU (Multi-User)-MIMO can be employed within one base station apparatus 3. For example, MU-MIMO is a technique for maintaining orthogonality between signals addressed to the mobile station apparatuses 5 or for reducing co-channel interference even in the case where the same resource is used in the frequency-time domain, by controlling beams of signals addressed to the mobile station apparatuses 5 using a precoding technique or the like, for the plurality of mobile station apparatuses 5 located at different locations (for example, in an area A and an area B) in an area covered by the base station apparatus 3 which uses a plurality of transmit antennas. MU-MIMO is also referred to as SDMA (Space Division Multiple Access) because it spatially demultiplexes signals addressed to the mobile station apparatuses 5.

In MU-MIMO, the base station apparatus 3 transmits UE-specific RSs that are orthogonal between the different mobile station apparatuses 5, and also transmits signals of different second PDCCHs after spatially multiplexing the signals in a common resource. In MU-MIMO, different precoding processing is applied to the mobile station apparatuses 5 subjected to spatial multiplexing. Different precoding processing can be performed on the second PDCCH and UE-specific RS addressed to the mobile station apparatus 5 located in the area A from that performed on the second PDCCH and UE-specific RS addressed to the mobile station apparatus 5 located in the area B within the area covered by the base station apparatus 3. A region to which the second PDCCH is to be possibly mapped can be configured for the mobile station apparatus 5 located in the area A independently of the mobile station apparatus 5 located in the area B, and the precoding processing can be applied independently.

In the communication system 1, the downlink (also referred to as DL.) which is a communication direction from the base station apparatus 3 or the RRH 4 to the mobile station apparatus 5 is configured to include a downlink pilot channel, a physical downlink control channel (also referred to as PDCCH.), and a physical downlink shared channel (also referred to as PDSCH.). Coordinated communication may be or may not be applied to the PDSCH. The PDCCH includes a first PDCCH and a second PDCCH (E-PDCCH: Enhanced-PDCCH). The downlink pilot channel includes a first type reference signal (CRS described later) used for demodulation of the PDSCH and the first PDCCH, a second type reference signal (UE-specific RS described later) used for demodulation of the PDSCH and the second PDCCH, and a third type reference signal (CSI-RS described later).

From one point of view, the first PDCCH is a physical channel for which the same transmit port (antenna port or transmit antenna) as that of the first type reference signal is used. Also, the second PDCCH is a physical channel for which the same transmit port as that of the second type reference signal is used. The mobile station apparatus 5 demodulates signals mapped on the first PDCCH by using the first type reference signal, and demodulates signals mapped on the second PDCCH by using the second type reference signal. The first type reference signal is a reference signal that is used in common by all the mobile station apparatuses 5 located in the cell, that is inserted into almost all resource blocks, and that can be used by any of the mobile station apparatuses 5. Accordingly, all the mobile station apparatuses 5 are able to demodulate the first PDCCH. In contrast, the second type reference signal is a reference signal that can be basically inserted into only assigned resource blocks. Adaptive precoding processing can be applied to the second type reference signal just like data.

From one point of view, the first PDCCH is a control channel mapped to OFDM symbols to which the PDSCH is not mapped, whereas the second PDCCH is a control channel mapped to OFDM symbols to which the PDSCH is mapped. From one point of view, the first PDCCH is a control channel whose signal is basically mapped to all PRBs (PRBs of the first slot) over the downlink system band, whereas the second PDCCH is a control channel whose signal is mapped to PRB pairs (PRBs) configured by the base station apparatus 3 within the downlink system band. Although the details will be described later, different signal structures are used for the first PDCCH and the second PDCCH from one point of view. The first PDCCH employs a CCE structure described later as its signal structure, whereas the second PDCCH employs an E-CCE (Enhanced-CCE) (first element) structure described later as its signal structure. That is, the minimum unit (element) of resources used to configure one control channel differs between the first PDCCH and the second PDCCH. Each control channel is configured to include one or more corresponding minimum units.

In the communication system 1, the uplink (also referred to as UL) which is a communication direction from the mobile station apparatus 5 to the base station apparatus 3 or the RRH 4 is configured to include a physical uplink shared channel (also referred to as PUSCH.), an uplink pilot channel (uplink reference signal; UL RS: Uplink Reference Signal, SRS: Sounding Reference Signal, and DM RS: Demodulation Reference Signal), and a physical uplink control channel (also referred to as PUCCH.). A channel refers to a medium used for transmission of a signal. Channels used in the physical layer are referred to as physical channels, whereas channels used in the medium access control (MAC) layer are referred to as logical channels.

The present invention is applicable to communication systems in which, for example, coordinated communication is applied to the downlink and, for example, multi-antenna transmission is applied to the downlink. For simplicity of explanation, the case where coordinated communication is not applied to the uplink and where multi-antenna transmission is not applied to the uplink will be described; however, the present invention is not limited to such a case.

The PDSCH is a physical channel used for transmission and reception of downlink data and control information (different from control information transmitted on the PDCCH). The PDCCH is a physical channel used for transmission and reception of downlink control information (different from control information transmitted on the PDSCH). The PUSCH is a physical channel used for transmission and reception of uplink data and control information (different from control information transmitted on the downlink). The PUCCH is a physical channel used for transmission and reception of uplink control information (UCI). Types of the UCI include reception confirmation response (ACK/NACK) representing acknowledgement (ACK) or negative acknowledgement (NACK) for downlink data on the PDSCH; scheduling request (SR) representing whether or not a request for resource allocation is made; etc. Other physical channels include a synchronization channel (SCH) used to establish downlink synchronization, a physical random access channel (PRACH) used to establish uplink synchronization, a physical broadcast channel (PBCH) used for transmission of downlink system information (also referred to as SIB: System Information Block), etc. The PDSCH is also used for transmission of the downlink system information.

The mobile station apparatus 5, the base station apparatus 3, or the RRH 4 maps and transmits signals generated from control information, data, etc. on the respective physical channels. Data transmitted on the PDSCH or PUSCH is referred to as a transport block. Also, an area managed by the base station apparatus 3 or the RRH 4 is referred to as a cell.

<Structure of Downlink Time Frame>

Figure 10:
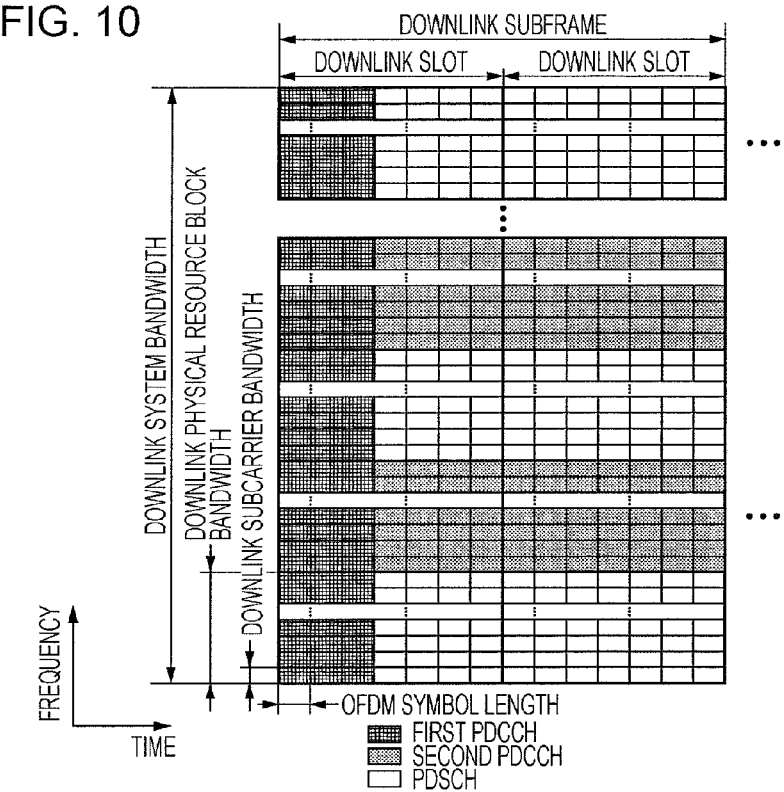
FIG. 10 is a diagram illustrating the schematic structure of a time frame for the downlink from the base station apparatus 3 or an RRH 4 to the mobile station apparatus 5 in accordance with the embodiment of the present invention.

FIG. 10 is a diagram illustrating the schematic structure of a time frame on the downlink from the base station apparatus 3 or the RRH 4 to the mobile station apparatus 5 in accordance with the embodiment of the present invention. In this figure, the horizontal axis represents the time domain and the vertical axis represents the frequency domain. A downlink time frame is constituted by a pair (referred to as a physical resource block pair; PRB pair) of resource blocks (RBs) (also referred to as physical resource blocks; PRBs.) composed of a frequency and time band of a predetermined width on the downlink. A PRB pair is a unit of resource allocation. One downlink PRB pair (referred to as downlink physical resource block pair; DL PRB pair) is constituted by two consecutive downlink PRBs (referred to as DL PBBs.) in the time domain.

Also, in this figure, one DL PRB is constituted by 12 subcarriers (referred to as downlink subcarriers) in the downlink frequency domain and by 7 OFDM (Orthogonal Frequency Division Multiplexing) symbols in the time domain. A system band on the downlink (referred to as a downlink system band) is a downlink communication band for the base station apparatus 3 or the RRH 4. For example, a system bandwidth on the downlink (referred to as a downlink system bandwidth) is formed of a frequency bandwidth of 20 MHz.

Note that a plurality of DL PRBs (DL PRB pairs) are allocated in the downlink system band in accordance with the downlink system bandwidth. For example, the downlink system band having a frequency bandwidth of 20 MHz is constituted by 110 DL PRBs (DL PRB pairs).

This figure also illustrates a slot (referred to as a downlink slot) constituted by 7 OFDM symbols and a subframe (referred to as a downlink subframe) constituted by two downlink slots in the time domain. A unit constituted by one downlink subcarrier and one OFDM symbol is referred to as a resource element (RE) (downlink resource element). In each downlink subframe, at least the PDSCH used for transmission of information data (also referred to as a transport block), and the first PDCCH and the second PDCCH used for transmission of control information regarding the PDSCH are mapped. In this figure, the first PDCCH is constituted by the first to third OFDM symbols of the downlink subframe, whereas the PDSCH and the second PDCCH are constituted by the fourth to fourteenth OFDM symbols of the downlink subframe. Note that the PDSCH and the second PDCCH are mapped to different DL PRB pairs. Also, the number of OFDM symbols constituting the first PDCCH and the number of OFDM symbols constituting the PDSCH and the second PDCCH may be changed for each downlink subframe. Alternatively, the number of OFDM symbols constituting the second PDCCH may be fixed. For example, the second PDCCH may be constituted by the fourth to fourteenth OFDM symbols in the downlink subframe regardless of the number of OFDM symbols constituting the first PDCCH and the number of OFDM symbols constituting the PDSCH.

Although not illustrated in this figure, the downlink pilot channel used for transmission of reference signals (RSs) for the downlink (referred to as downlink reference signals) is mapped to a plurality of downlink resource elements in a distributed manner. Here, the downlink reference signals include at least the first type reference signal, the second type reference signal, and the third type reference signal which are different from one another. For example, the downlink reference signals are used for estimation of channel variations of the PDSCH and the PDCCH (the first PDCCH and the second PDCCH). The first type reference signal is used for demodulation of the PDSCH and the first PDCCH and is also referred to as a cell-specific RS (CRS). The second type reference signal is used for demodulation of the PDSCH and the second PDCCH and is also referred to as a UE-specific RS. For example, the third type reference signal is used only for estimation of channel variations and is also referred to as channel state information RS (CSI-RS). The downlink reference signals are signals known in the communication system 1. Note that the number of downlink resource elements constituting the downlink reference signals may depend on the number of transmit antennas (antenna ports) used by the base station apparatus 3 or the RRH 4 to communicate with the mobile station apparatus 5. The following describes the case where the CRS, the UE-specific RS, and the CSI-RS are used as the first type reference signal, the second type reference signal, and the third type reference signal, respectively. Note that the UE-specific RS can be used for demodulation of the PDSCH to which coordinated communication is applied and the PDSCH to which coordinated communication is not applied. Also, the UE-specific RS can be used for demodulation of the second PDCCH to which coordinated communication (precoding processing) is applied and the second PDCCH to which coordinated communication is not applied.

On the PDCCH (the first PDCCH or the second PDCCH), a signal generated from control information is mapped. The control information includes information representing assignment of DL PRB pairs to the PDSCH; information representing assignment of UL PRB pairs to the PUSCH; information representing the mobile station identifier (referred to as Radio Network Temporary Identifier; RNTI.), the modulation scheme, the coding rate, retransmission parameters, the number of spatial multiplexing, the precoding matrix, and the transmit power control command (TPC command), etc. Control information contained in the PDCCH is referred to as downlink control information (DCI). The DCI containing information representing assignment of DL PRB pairs to the PDSCH is referred to as downlink assignment (also referred to as DL assignment or downlink grant.). The DCI containing information representing assignment of UL PRB pairs to the PUSCH is referred to as an uplink grant (also referred to as an UL grant.). Note that the downlink assignment contains the transmit power control command for the PUCCH. Also, the uplink assignment contains the transmit power control command for the PUSCH. One PDCCH only contains information representing resource allocation of one PDSCH or information representing resource allocation of one PUSCH, and thus does not contain information representing resource allocation of a plurality of PDSCHs or information representing resource allocation of a plurality of PUSCHs.

Further, information transmitted on the PDCCH includes a cyclic redundancy check (CRC) code. A relationship between the DCI, the RNTI, and the CRC transmitted on the PDCCH will be described in detail. A predetermined generation polynomial is used to generate the CRC code from the DCI. Exclusive-OR (also referred to as scrambling) processing is performed on the generated CRC code using the RNTI. A signal obtained by modulating bits representing the DCI and bits (referred to as CRC masked by UE ID) generated by performing the exclusive-OR processing on the CRC code using the RNTI is actually transmitted on the PDCCH.

In the time domain, resources of the PDSCH are mapped in the same downlink subframe as the downlink subframe in which resources of the PDCCH containing the downlink assignment used for resource allocation of the PDSCH are mapped.

Figure 11:
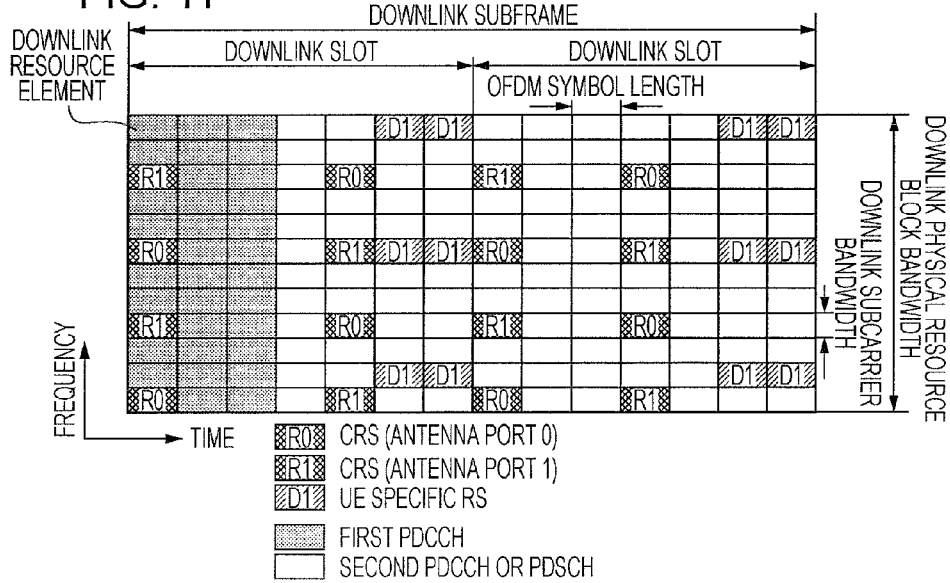
FIG. 11 is a diagram illustrating an example of how downlink reference signals are mapped in a downlink subframe in a communication system 1 in accordance with the embodiment of the present invention.

How the downlink reference signals are mapped will be described. FIG. 11 is a diagram illustrating an example of how downlink reference signals are mapped in a downlink subframe in the communication system 1 in accordance with the embodiment of the present invention. For simplicity of explanation, mapping of the downlink reference signals in one DL PRB pair will be described in FIG. 11; however, the mapping method is used in common for a plurality of DL PRB pairs in the downlink system band.

Among hatched downlink resource elements, R0 and R1 represent CRSs for antenna ports 0 and 1, respectively. Here, an antenna port refers to a logical antenna used in signal processing. One antenna port may be constituted by a plurality of physical antennas. A plurality of physical antennas constituting the same antenna port transmit the same signal. Delay diversity or CDD (Cyclic Delay Diversity) is applicable by using a plurality of physical antennas on the same antenna port; however, no other signal processing is usable. FIG. 11 illustrates the case where CRCs correspond to two antenna ports; however, the communication system according to the embodiment may handle antenna ports other than two. For example, the CRS(s) corresponding to one antenna port or four antenna ports may be mapped to downlink resources. The CRS can be mapped to all DL PRB pairs in the downlink system band.

Among the hatched downlink resource elements, D1 represents a UE-specific RS. In the case where the UE-specific RS is transmitted using a plurality of antenna ports, different codes are used for different antenna ports. That is, CDM (Code Division Multiplexing) is applied to the UE-specific RS. Here, the length of code used for CDM of the UE-specific RS or the number of downlink resource elements to which the UE-specific RS is mapped may be changed in accordance with the type of signal processing (the number of antenna ports) used for control signals and data signals mapped in the DL PRB pair. FIG. 11 illustrates an example of how the UE-specific RS is mapped in the case where the number of antenna ports used for transmission of the UE-specific RS is one (antenna port 7) or two (antenna port 7 and antenna port 8). For example, in the case where the number of antenna ports used by the base station apparatus 3 and the RRH 4 to transmit the UE-specific RS is two, a code having a code length of 2 is used to multiplex and map the US-specific RS in units (CDM units) of two downlink resource elements consecutively arranged in the time domain (OFDM symbols) in the same frequency domain (subcarrier). In other words, in this case, CDM is applied to multiplex the UE-specific RS. In FIG. 11, the UE-specific RS for antenna port 7 and antenna port 8 are multiplexed by CDM in D1.

Figure 12:
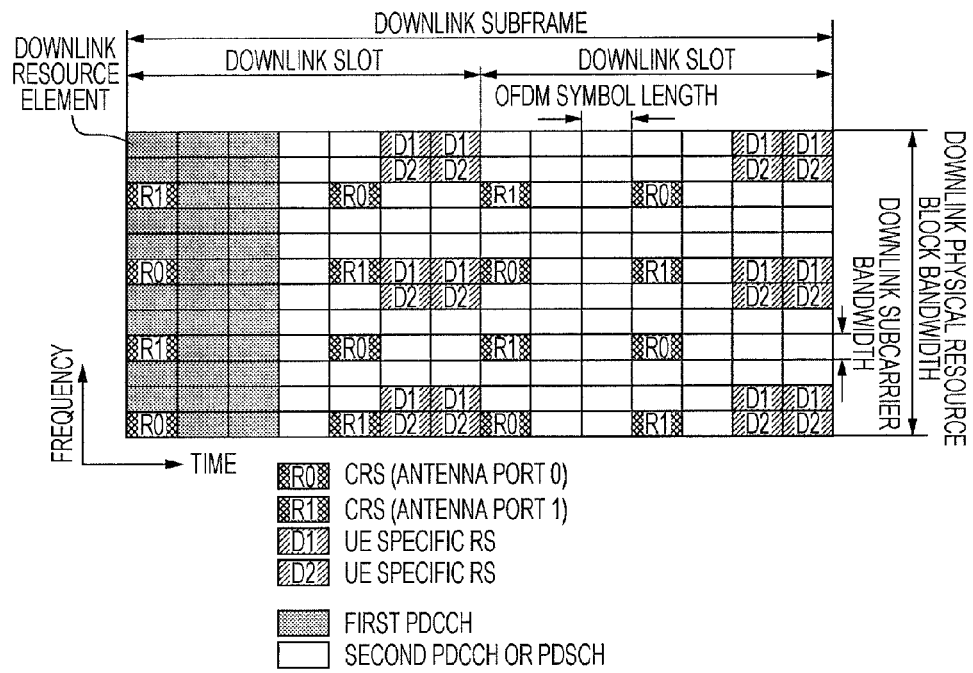
FIG. 12 is a diagram illustrating an example of how downlink reference signals are mapped in a downlink subframe in the communication system 1 in accordance with the embodiment of the present invention.

FIG. 12 is a diagram illustrating an example of how downlink reference signals are mapped in a downlink subframe in the communication system 1 in accordance with the embodiment of the present invention. Among hatched downlink resource elements, D1 and D2 represent UE-specific RSs. FIG. 12 illustrates an example of how UE-specific RSs are mapped in the case where the number of antenna ports used for transmission of the UE-specific RSs is three (antenna port 7, antenna port 8, and antenna port 9) or four (antenna port 7, antenna port 8, antenna port 9, and antenna port 10). For example, in the case where the number of antenna ports used by the base station apparatus 3 and the RRH 4 to transmit the UE-specific RSs is four, the number of downlink resource elements to which the UE-specific RSs are to be mapped is doubled. The UE-specific RSs are multiplexed and mapped on different downlink resource elements for every two antenna ports. In other words, CDM and FDM (Frequency Division Multiplexing) are applied to multiplex the UE-specific RSs. In FIG. 12, the UE-specific RS for antenna port 7 and antenna port 8 is multiplexed by CDM in D1 and the UE-specific RS for antenna port 8 and antenna port 9 is multiplexed by CDM in D2.

For example, in the case where the number of antenna ports used by the base station apparatus 3 and the RRH 4 to transmit the UE-specific RSs is eight, the number of downlink resource elements to which the UE-specific RSs are to be mapped is doubled, and the UE-specific RSs are multiplexed and mapped in units of four downlink resource elements using a code having a code length of 4. In other words, CDM of different code length is applied to multiplex the UE-specific RSs in this case.

Also, in the UE-specific RS, a scrambling code is further superimposed to the code for each antenna port. This scrambling code is generated on the basis of a cell ID and a scrambling ID that are notified by the base station apparatus 3 or the RRH 4. For example, a scrambling code is generated from a pseudo random sequence which is generated on the basis of a cell ID and a scrambling ID that are notified by the base station apparatus 3 or the RRH 4. For example, the scrambling ID is a value representing 0 or 1. Also, the scrambling ID and the antenna port to be used may be jointly coded, and information indicating these may be indexed. A parameter which each mobile station apparatus 5 is individually notified of may be used to generate the scrambling code used for the UE-specific RS. The UE-specific RS is mapped in the DL PRB pair to which the PDSCH and the second PDCCH, assigned to the mobile station apparatus 5 configured to use the UE specific RS, are mapped.

Also, the base station apparatus 3 and the RRH 4 may map the CRS signal to different downlink resource elements or may map the CRS signal to the same downlink resource element. For example, in the case where different cell IDs are notified by the base station apparatus 3 and the RRH 4, the CRS signal may be mapped to different downlink resource elements. In another example, configuration may be made such that the base station apparatus 3 alone maps the CRS signal to some of downlink resource elements and the RRH 4 does not map the CRS signal to any of downlink resource elements. For example, in the case where a cell ID is notified only by the base station apparatus 3, configuration may be made such that the base station apparatus 3 alone maps the CRS signal to some of downlink resource elements and the RRH 4 does not map the CRS signal to any of downlink resource elements as described above. In another example, the base station apparatus 3 and the RRH 4 may map the CRS signal to the same downlink resource element so that the same sequence is transmitted from the base station apparatus 3 and the RRH 4. For example, in the case where cell IDs notified by the base station apparatus 3 and the RRH 4 are the same, the CRS signal may be mapped in the above-described manner.

Figure 13:
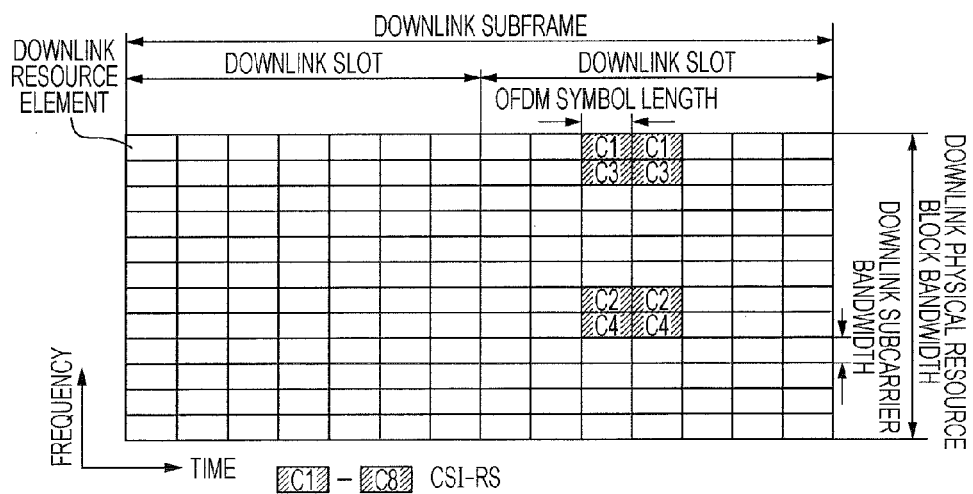
FIG. 13 is a diagram illustrating a DL PRB pair to which CSI-RSs (channel state information-reference signals) for eight antenna ports are mapped.

FIG. 13 is a diagram illustrating a DL PRB pair to which CSI-RSs (channel state information-reference signals) for eight antenna ports are mapped. FIG. 13 illustrates how CSI-RSs are mapped in the case where the number of antenna ports (the number of CSI ports) used by the base station apparatus 3 and the RRH 4 is eight. Note that FIG. 13 omits illustration of the CRS, UE-specific RS, PDCCH, PDSCH, etc. for simplicity of illustration.

In each CDM group, 2-chip orthogonal codes (Walsh codes) are used for the CSI-RS, and each orthogonal code is allocated a CSI port (CSI-RS port (antenna port, resource grid)). Code division multiplexing is performed every two CSI ports. In addition, the individual CDM groups are frequency-division multiplexed. The 8-antenna-port CSI-RS for CSI ports 1 to 8 (antenna ports 15 to 22) are mapped using four CDM groups. For example, in a CSI-RS CDM group C1, CSI-RS for CSI ports 1 and 2 (antenna ports 15 and 16) are code-division multiplexed and are mapped. In a CSI-RS CDM group C2, CSI-RS for CSI ports 3 and 4 (antenna ports 17 and 18) are code-division multiplexed and are mapped. In a CSI-RS CDM group C3, CSI-RS for CSI ports 5 and 6 (antenna ports 19 and 20) are code-division multiplexed and are mapped. In a CSI-RS CDM group C4, CSI-RS for CSI ports 7 and 8 (antenna ports 21 and 22) are code-division multiplexed and are mapped.

In the case where the number of CSI-RS antenna ports of the base station apparatus 3 and the RRH 4 is eight, the base station apparatus 3 and the RRH 4 can apply up to eight layers (rank, the number of spatial multiplexing) to the PDSCH. Also, the base station apparatus 3 and the RRH 4 can transmit CSI-RS for one, two, or four CSI-RS antenna ports. The base station apparatus 3 and the RRH 4 can transmit CSI-RS for one or two antenna ports by using the CSI-RS CDM group C1 illustrated in FIG. 13. The base station apparatus 3 and the RRH 4 can transmit CSI-RS for four antenna ports by using the CSI-RS CDM groups C1 and C2 illustrated in FIG. 13.

The base station apparatus 3 and the RRH 4 sometimes map CSI-RS signals to different downlink resource elements and sometimes map CSI-RS signals to the same downlink resource element. For example, the base station apparatus 3 and the RRH 4 allocate different downlink resource elements and/or different signal sequences to the CSI-RS. The mobile station apparatus 5 recognizes a CSI-RS transmitted from the base station apparatus 3 and a CSI-RS transmitted from the RRH 4 as CSI-RSs associated with different antenna ports. For example, there may be a case where the base station apparatus and the RRH 4 allocate the same downlink resource element to the CSI-RS so that the same sequence is transmitted from the base station apparatus 3 and the RRH 4.

The mobile station apparatus 5 is notified of a CSI-RS configuration (CSI-RS-Config-r10) by the base station apparatus 3 or the RRH 4. The CSI-RS configuration includes at least information representing the number of antenna ports configured for CSI-RSs (antennaPortsCount-r10), information representing a downlink subframe in which CSI-RSs are mapped (subframeConfig-r10), and information representing a frequency region in which CSI-RSs are mapped (ResourceConfig-r10). As the number of CSI-RS antenna ports, any of values of 1, 2, 4, and 8 is used, for example. As the information representing the frequency region in which CSI-RSs are mapped, an index is used which represents the position of the first resource element of resource elements in which CSI-RS corresponding to antenna port 15 (CSI port 1) is mapped. Once the position of the CSI-RS corresponding to antenna port 15 is decided, positions of CSI-RSs corresponding to other antenna ports are uniquely decided in accordance with a predetermined rule. As the information representing a downlink subframe in which CSI-RSs are mapped, the position and period of the downlink subframe in which CSI-RSs are mapped is represented by an index. For example, if the index of subframeConfig-r10 is 5, this index indicates that CSI-RSs are mapped every 10 subframes, and that CSI-RSs are mapped in subframe 0 (subframe number in a radio frame) in each radio frame constituted by 10 subframes. In another example, if the index of subframeConfig-r10 is 1, this index indicates that CSI-RSs are mapped every 5 subframes, and that CSI-RSs are mapped in subframes 1 and 6 in each radio frame constituted by 10 subframes.

<Structure of Uplink Time Frame>

Figure 14:
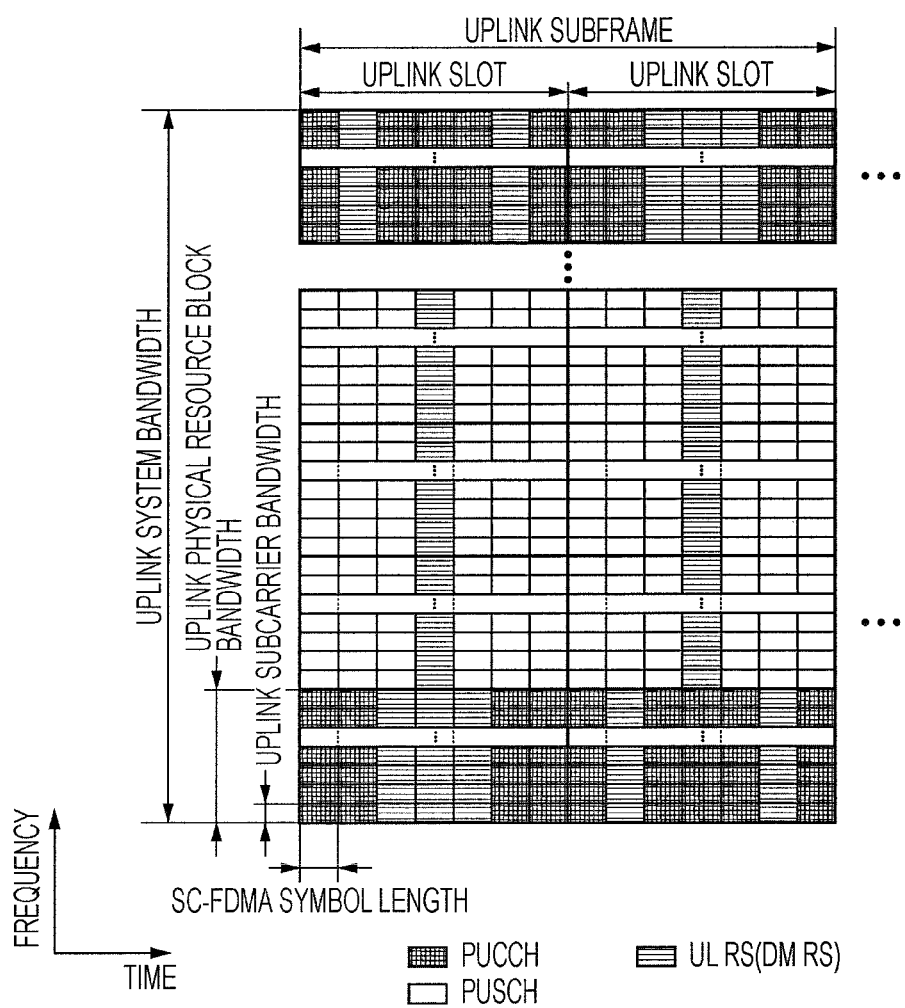
FIG. 14 is a diagram illustrating a schematic structure of a time frame for the uplink from the mobile station apparatus 5 to the base station apparatus 3 or the RRH 4 in accordance with the embodiment of the present invention.

FIG. 14 is a diagram illustrating the schematic structure of a time frame on the uplink from the mobile station apparatus 5 to the base station apparatus 3 or the RRH 4 in accordance with the embodiment of the present invention. In this figure, the horizontal axis represents the time domain, and the vertical axis represents the frequency domain. An uplink time frame is constituted by a pair (referred to as an uplink physical resource block pair; UL PRB pair) of physical resource blocks composed of a frequency and time band of a predetermined width on the uplink. A UL PRB pair is a unit of resource allocation. One UL PRB pair is constituted by two consecutive uplink PRBs (referred to as uplink PBBs; UL PRBs.) in the uplink time domain.

Also, in this figure, one UL PRB is constituted by 12 subcarriers (referred to as uplink subcarriers) in the uplink frequency domain and by 7 SC-FDMA (Single-Carrier Frequency Division Multiple Access) symbols in the time domain. A system band on the uplink (referred to as an uplink system band) is an uplink communication band to the base station apparatus 3 or the RRH 4. For example, a system bandwidth on the uplink (referred to as an uplink system bandwidth) is formed of a frequency bandwidth of 20 MHz.

Note that a plurality of UL PRB pairs are allocated in the uplink system band in accordance with the uplink system bandwidth. For example, an uplink system band having a frequency bandwidth of 20 MHz is constituted by 110 UL PRB pairs. This figure also illustrates a slot (referred to as an uplink slot) constituted by 7 SC-FDMA symbols and a subframe (referred to as an uplink subframe) constituted by two uplink slots in the time domain. A unit constituted by one uplink subcarrier and one SC-FDMA symbol is referred to as a resource element (referred to as an uplink resource element).

In each uplink subframe, at least the PUSCH used for transmission of information data, the PUCCH used for transmission of uplink control information (UCI), and UL RSs (DM RSs) used for demodulation of the PUSCH and PUCCH (estimation of channel variations) are mapped. Although not illustrated in this figure, the PRACH used to establish uplink synchronization is also mapped in any of uplink subframes. Also not illustrated in this figure, an UL RS (SRS) used for measurement of the channel quality, out-of-synchronization, etc. is mapped in any of uplink subframes. The PUCCH is used to transmit UCI (ACK/NACK) representing acknowledgement (ACK) or negative acknowledgement (NACK) for data received using the PDSCH, UCI (scheduling request; SR) at least representing whether or not a request for uplink resource allocation is made, and UCI (CQI: channel quality indicator) representing downlink reception quality (also referred to as channel quality.).

In order to notify the base station apparatus 3 that the mobile station apparatus 5 is requesting uplink resource allocation, the mobile station apparatus 5 transmits a signal on the PUCCH for SR transmission. The base station apparatus 3 recognizes that the mobile station apparatus 5 is requesting uplink resource allocation on the basis of a result of detecting the signal on a resource of the PUCCH for SR transmission. In order to notify the base station apparatus 3 that the mobile station apparatus 5 is not requesting uplink resource allocation, the mobile station apparatus 5 transmits no signal using the previously allocated resource of the PUCCH for SR transmission. The base station apparatus 3 recognizes that the mobile station apparatus 5 is not requesting uplink resource allocation on the basis of a result of detecting no signal on the resource of the PUCCH for SR transmission.

Different signal structures are used for the PUCCH in the case where UCI containing ACK/NACK is transmitted, in the case where UCI containing SR is transmitted, and in the case where UCI containing CQI is transmitted. The PUCCH used for transmission of ACK/NACK is referred to as PUCCH format 1a or PUCCH format 1b. In the PUCCH format 1a, BPSK (Binary Phase Shift Keying) is used as a modulation scheme for modulating information regarding ACK/NACK. In the PUCCH format 1a, a modulated signal represents one-bit information. In the PUCCH format 1b, QPSK (Quadrature Phase Shift Keying) is used as a modulation scheme for modulating information regarding ACK/NACK. In the PUCCH format 1b, a modulated signal represents two-bit information. The PUCCH used for transmission of SR is referred to as PUCCH format 1. The PUCCH used for transmission of CQI is referred to as PUCCH format 2. The PUCCH used for simultaneous transmission of CQI and ACK/NACK is referred to as PUCCH format 2a or PUCCH format 2b. In the PUCCH format 2a and the PUCCH format 2b, a reference signal (DM RS) on the uplink pilot channel is multiplied by a modulated signal generated from information regarding ACK/NACK. In the PUCCH format 2a, one-bit information regarding ACK/NACK and information regarding CQI are transmitted. In the PUCCH format 2b, two-bit information regarding ACK/NACK and information regarding CQI are transmitted.

Note that one PUSCH is constituted by one or more UL PRB pairs. One PUCCH is constituted by two UL PRBs which are symmetrical to each other in the frequency domain in the uplink system band and which are located in different uplink slots. One PRACH is constituted by six UL PRB pairs. For example, in FIG. 14, a UL PRB having the lowest frequency in the first uplink slot in the uplink subframe and a UL PRB having the highest frequency in the second uplink slot in the uplink subframe constitute one UL PRB pair used for the PUCCH. In the case where the mobile station apparatus 5 is configured not to perform simultaneous transmission of the PUSCH and the PUCCH, the mobile station apparatus 5 transmits signals only using resources of the PUSCH if resources of the PUCCH and resources of the PUSCH are allocated in the same uplink subframe. In the case where the mobile station apparatus 5 is configured to perform simultaneous transmission of the PUSCH and the PUCCH, the mobile station apparatus 5 can transmit signals using basically both resources of the PUCCH and resources of the PUSCH if the resources of the PUCCH and the resources of the PUSCH are allocated in the same uplink subframe.

The UL RSs are signals used on the uplink pilot channel. The UL RSs include a demodulation reference signal (DM RS) used to estimate channel variations on the PUSCH and the PUCCH, and a sounding reference signal (SRS) used to measure the channel quality for frequency scheduling and adaptive modulation on the PUSCH of the base station apparatus 3 and the RRH 4 and to measure out-of-synchronization between the mobile station apparatus 5 and the base station apparatus 3 or the RRH 4. The SRS is not illustrated in FIG. 14 for simplicity of illustration. The DM RS is mapped in different SC-FDMA symbols between the case where the DM RS is mapped in the same UL PBR as the PUSCH and the case where the DM RS is mapped in the same UL PBR as the PUCCH. The DM RS is a signal known in the communication system 1 and used to estimate channel variations on the PUSCH and the PUCCH.

In the case where the DM RS is mapped in the same UL PRB as the PUSCH, the DM RS is mapped in the fourth SC-FDMA symbol of the uplink slot. In the case where the DM RS is mapped in the same UL PRB as the PUCCH including ACK/NACK, the DM RS is mapped in the third, fourth, and fifth SC-FDMA symbols in the uplink slot. In the case where the DM RS is mapped in the same UL PBR as the PUCCH including SR, the DM RS is mapped in the third, fourth, and fifth SC-FDMA symbols in the uplink slot. In the case where the DM RS is mapped in the same UL PRE as the PUCCH including CQI, the DM RS is mapped in the second and sixth SC-FDMA symbols of the uplink slot.

The SRS is mapped in a UL PRB decided by the base station apparatus 3, and is mapped in the fourteenth SC-FDMA symbol of the uplink subframe (the seventh SC-FDMA symbol of the second uplink slot of the uplink subframe). The SRS can be mapped only in the uplink subframe (referred to as sounding reference signal subframe; SRS subframe) of a period decided by the base station apparatus 3 within the cell. The base station apparatus 3 assigns, for each mobile station apparatus 5, a period over which the SRS is to be transmitted and a UL PRB to be allocated to the SRS in the SRS subframe.

FIG. 14 illustrates the case where the PUCCH is mapped in the UL PRB located at the edge in the frequency domain of the uplink system band; however, the second or third UL PRB from the edge of the uplink system band may be used for the PUCCH.

Note that frequency-domain code multiplexing and time-domain code multiplexing are used for the PUCCH. Processing for frequency-domain code multiplexing is performed by multiplying a modulated signal obtained by modulating uplink control information, by each code of a code sequence in units of subcarriers. Processing for time-domain code multiplexing is performed by multiplying a modulated signal obtained by modulating uplink control information, by each code of a code sequence in units of SC-FDMA symbols. A plurality of PUCCHs are mapped in the same UL PRB and are assigned different codes. Code multiplexing is implemented in the frequency domain or the time domain by the assigned codes. Frequency-domain and time-domain code multiplexing is used for the PUCCH (referred to as PUCCH format 1a or PUCCH format 1b.) which is used for transmission of ACK/NACK. Frequency-domain and time-domain code multiplexing is used for the PUCCH (referred to as PUCCH format 1.) which is used for transmission of SR. Frequency-domain code multiplexing is used for the PUCCH (referred to as PUCCH format 2, PUCCH format 2a, or PUCCH format 2b.) which is used for transmission of CQI. For simplicity of explanation, a description regarding content of the code multiplexing of the PUCCH will be appropriately omitted.

Resources of the PUSCH are allocated in an uplink subframe that is behind, by a predetermined number (for example, 4) in the time domain, a downlink subframe in which resources of the PDCCH including an uplink grant used for resource allocation of the PUSCH are allocated.

Resources of the PDSCH are allocated in the same downlink subframe as the downlink subframe in which resources of the PDCCH including downlink assignment used for resource allocation of the PDSCH are allocated.

<Structure of First PDCCH>

The first PDCCH is constituted by a plurality of control channel elements (CCEs). The number of CCEs used in each downlink system band depends on the downlink system bandwidth, the number of OFDM symbols constituting the first PDCCH, and the number of downlink reference signals on the downlink pilot channel which is based on the number of transmit antennas used by the base station apparatus 3 (or the RRH 4) for communication. As described later, a CCE is constituted by a plurality of downlink resource elements.

Figure 15:
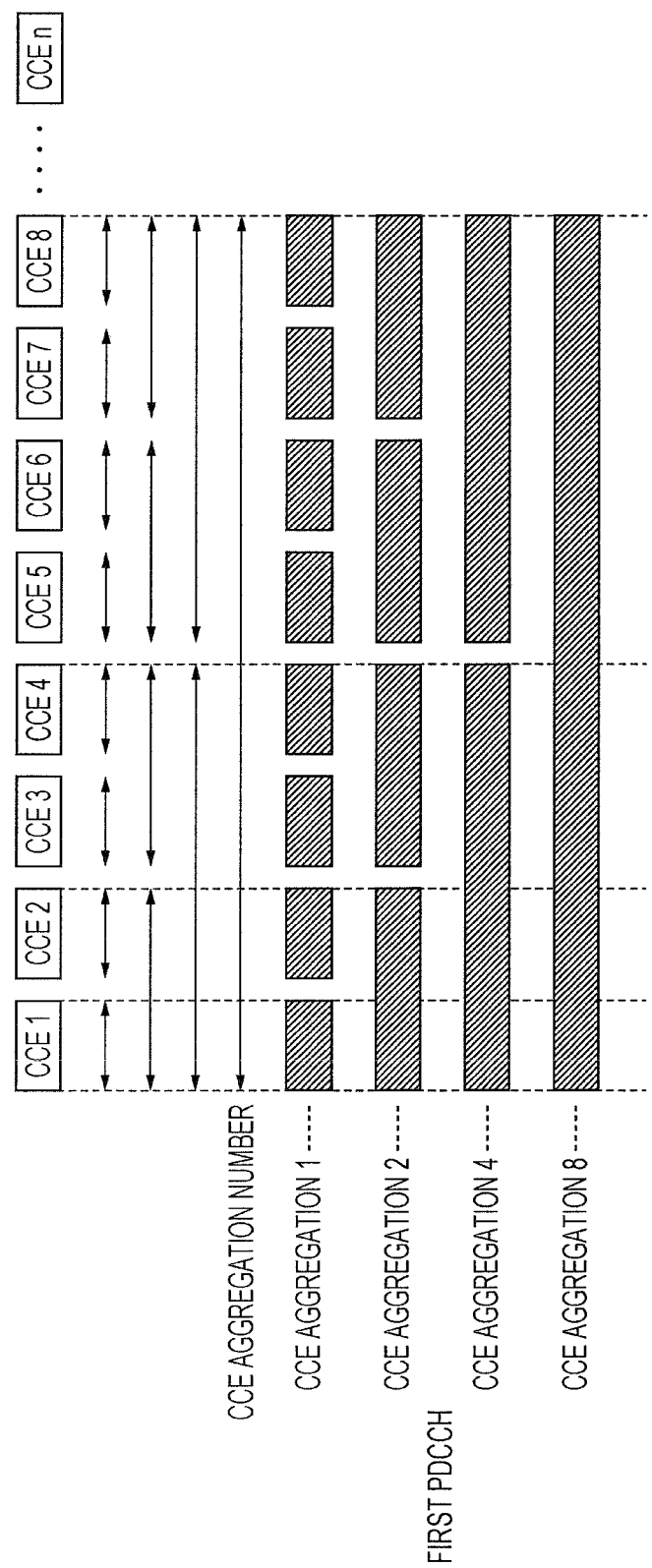
FIG. 15 is a diagram explaining a logical relationship between a first PDCCH and CCEs in the communication system 1 in accordance with the embodiment of the present invention.

FIG. 15 is a diagram explaining a logical relationship between the first PDCCH and CCEs in the communication system 1 in accordance with the embodiment of the present invention. CCEs used between the base station apparatus 3 (or the RRH 4) and the mobile station apparatus 5 are each assigned a number identifying the CCE. CCEs are numbered in accordance with a predetermined rule. Here, CCE t represents a CCE assigned the CCE number t. The first PDCCH is constituted by an aggregation of a plurality of CCEs (CCE aggregation). The number of CCEs constituting this aggregation is hereinafter referred to as "CCE aggregation number". The CCE aggregation number of the first PDCCH is set by the base station apparatus 3 in accordance with the coding rate set for the first PDCCH and the number of bits of DCI included in the first PDCCH. Also, an aggregation constituted by n CCEs is hereinafter referred to as a "CCE aggregation n".

For example, the base station apparatus 3 configures the first PDCCH by one CCE (CCE aggregation 1), configures the first PDCCH by two CCEs (CCE aggregation 2), configures the first PDCCH by four CCEs (CCE aggregation 4), or configures the first PDCCH by eight CCEs (CCE aggregation 8). For example, the base station apparatus 3 uses a CCE aggregation number indicating a small number of CCEs constituting the first PDCCH for the mobile station apparatus 3 having a good channel quality, and uses a CCE aggregation number indicating a large number of CCEs constituting the first PDCCH for the mobile station appara-tus 3 having a poor channel quality. Also, for example, the base station apparatus 3 uses a CCE aggregation number indicating a small number of CCEs constituting the first PDCCH when transmitting DCI constituted by a small number of bits, and uses a CCE aggregation number indicating a large number of CCEs constituting the first PDCCH when transmitting DCI constituted by a large number of bits.

Hatched rectangles illustrated in FIG. 15 represent candidates of the first PDCCH. Candidates of the first PDCCH (PDCCH candidates) are targets on which the mobile station apparatus 5 performs demodulation to detect the first PDCCH. The first PDCCH candidates are configured independently for each CCE aggregation number. The first PDCCH candidates configured for each CCE aggregation number are constituted by one or more different CCEs. The number of first PDCCH candidates is set independently for each CCE aggregation number. The first PDCCH candidates configured for each CCE aggregation number are constituted by CCEs assigned consecutive numbers. The mobile station apparatus 5 performs demodulation on the first PDCCH candidates, the number of which is set for each CCE aggregation number, to detect the first PDCCH. If the mobile station apparatus 5 determines that it has detected the first PDCCH addressed thereto, the mobile station apparatus 5 no longer needs to perform (may stop) demodulation on some of the configured first PDCCH candidates to detect the first PDCCH.

Figure 16:
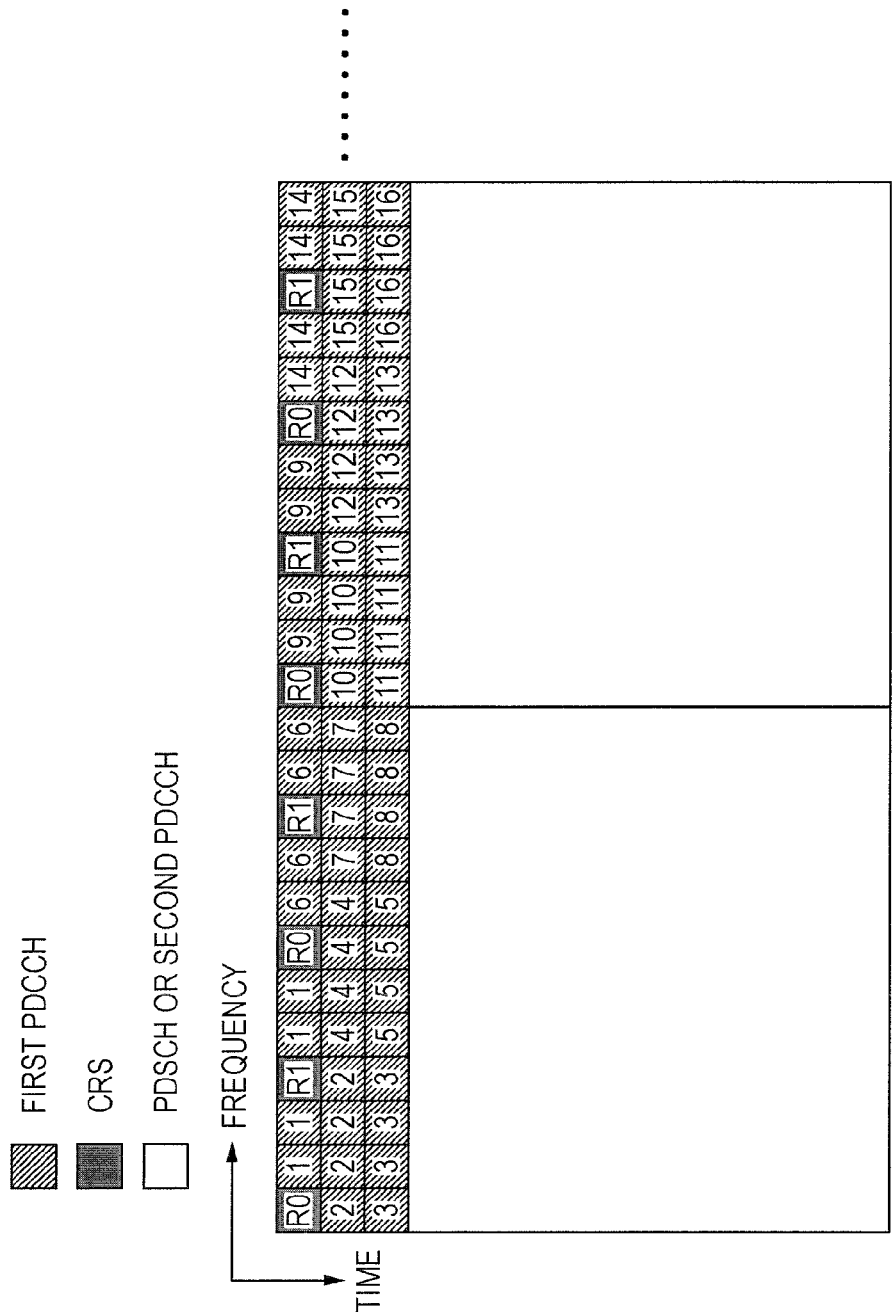
FIG. 16 is a diagram illustrating an example of how resource element groups are mapped in a downlink radio frame in the communication system 1 in accordance with the embodiment of the present invention.

A plurality of downlink resource elements constituting a CCE form a plurality of resource element groups (also referred to as REGs or mini-CCEs). A resource element group is constituted by a plurality of downlink resource elements. For example, one resource element group is constituted by four downlink resource elements. FIG. 16 is a diagram illustrating an example of how resource element groups are mapped in a downlink radio frame in the communication system 1 in accordance with the embodiment of the present invention. Here, resource element groups used for the first PDCCH are illustrated, and illustration and description of unrelated part (the PDSCH, second PDCCH, UE-specific RS, and CSI-RS) are omitted. Herein, the case is illustrated in which the first PDCCH is constituted by the first to third OFDM symbols and downlink reference signals (R0 and R1) corresponding to CRS for two transmit antennas (antenna port 0 and antenna port 1) are mapped. In this figure, the vertical axis represents the frequency domain and the horizontal axis represents the time domain.

In the mapping example illustrated in FIG. 16, one resource element group is constituted by four downlink resource elements adjacent to one another in the frequency domain. In FIG. 16, downlink resource elements of the first PDCCH that are assigned the same numeral belong to the same resource element group. Note that a resource element group is created by skipping resource elements R0 (downlink reference signals for antenna port 0) and R1 (downlink reference signals for antenna port 1) to which downlink reference signals are mapped. In FIG. 16, a number (numeral "1") is assigned to a resource element group having the lowest frequency and including the first OFDM symbols, a number (numeral "2") is then assigned to a resource element group having the lowest frequency and including the second OFDM symbols, and a number (numeral "3") is then assigned to a resource element group having the lowest frequency and including the third OFDM symbols. Also, in FIG. 16, a number (numeral "4") is then assigned to a resource element group adjacent in the frequency domain to the resource element group including the second OFDM symbols in which no downlink reference signals are mapped and which are assigned the number (numeral "2"). Then, a number (numeral "5") is assigned to a resource element group adjacent in the frequency domain to the resource element group including the third OFDM symbols in which no downlink reference signals are mapped and which are assigned the number (numeral "3"). Further, in FIG. 16, a number (numeral "6") is assigned to a resource element group adjacent in the frequency domain to the resource element group including the first OFDM symbols assigned the number (numeral "1"). Then, a number (numeral "7") is assigned to a resource element group adjacent in the frequency domain to the resource element group including the second OFDM symbols assigned the number (numeral "4"). Then, a number (numeral "8") is assigned to a resource element group adjacent in the frequency domain to the resource element group including the third OFDM symbols assigned the number (numeral "5"). Subsequent resource element groups are numbered in the same manner.

A CCE is constituted by a plurality of resource element groups illustrated in FIG. 16. For example, one CCE is constituted by nine different resource element groups distributed in the frequency and time domain. Specifically, in a CCE used for the first PDCCH, interleaving is performed in units of resource element groups on all the resource element groups numbered as illustrated in FIG. 16 using a block interleaver within the entire downlink system band, and nine interleaved resource element groups assigned consecutive numbers constitute one CCE.

<Structure of Second PDCCH>

Figure 17:
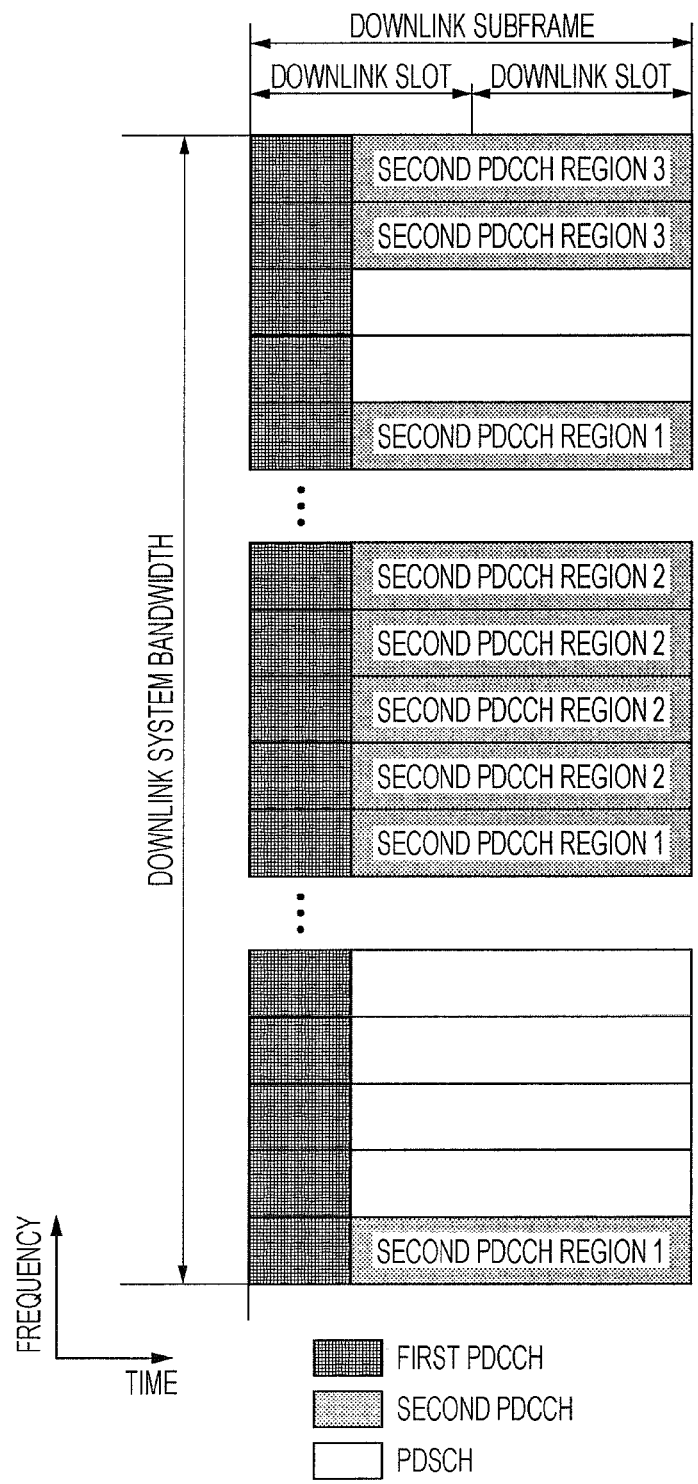
FIG. 17 is a diagram illustrating an example of schematic structures of regions to which second PDCCHs are to be possibly mapped in the communication system 1 in accordance with the embodiment of the present invention.

FIG. 17 is a diagram illustrating an example of schematic structures of regions (for simplicity of explanation, hereinafter referred to as second PDCCH regions) to which the second PDCCHs are to be possibly mapped in the communication system 1 in accordance with the embodiment of the present invention. The base station apparatus 3 can configure (set and map) a plurality of second PDCCH regions (a second PDCCH region 1, a second PDCCH region 2, and a second PDCCH region 3) in the downlink system band. One second PDCCH region is constituted by one or more DL PRB pairs. In the case where one second PDCCH region is constituted by a plurality of DL PRB pairs, the second PDCCH region may be constituted by DL PRB pairs distributed in the frequency domain or by DL PRB pairs contiguously arranged in the frequency domain. For example, the base station apparatus 3 can configure the second PDCCH region for each of the plurality of mobile station apparatuses 5.

Different transmission schemes are set for signals mapped to different second PDCCH regions. For example, precoding processing is applied to signals mapped to a certain second PDCCH region. For example, precoding processing is not applied to signals mapped to a certain second PDCCH region. Note that in the second PDCCH region in which precoding processing is applied to mapped signals, the same precoding processing can be applied to the second PDCCH and the UE-specific RS in the DL PRB pairs. Alternatively, in the second PDCCH region in which precoding processing is applied to mapped signals, as for precoding processing applied to the second PDCCH and the UE-specific RS, different types of precoding processing (with different precoding vectors applied) (with different precoding matrices applied) may be applied to different DL PRB pairs.

Figure 18:
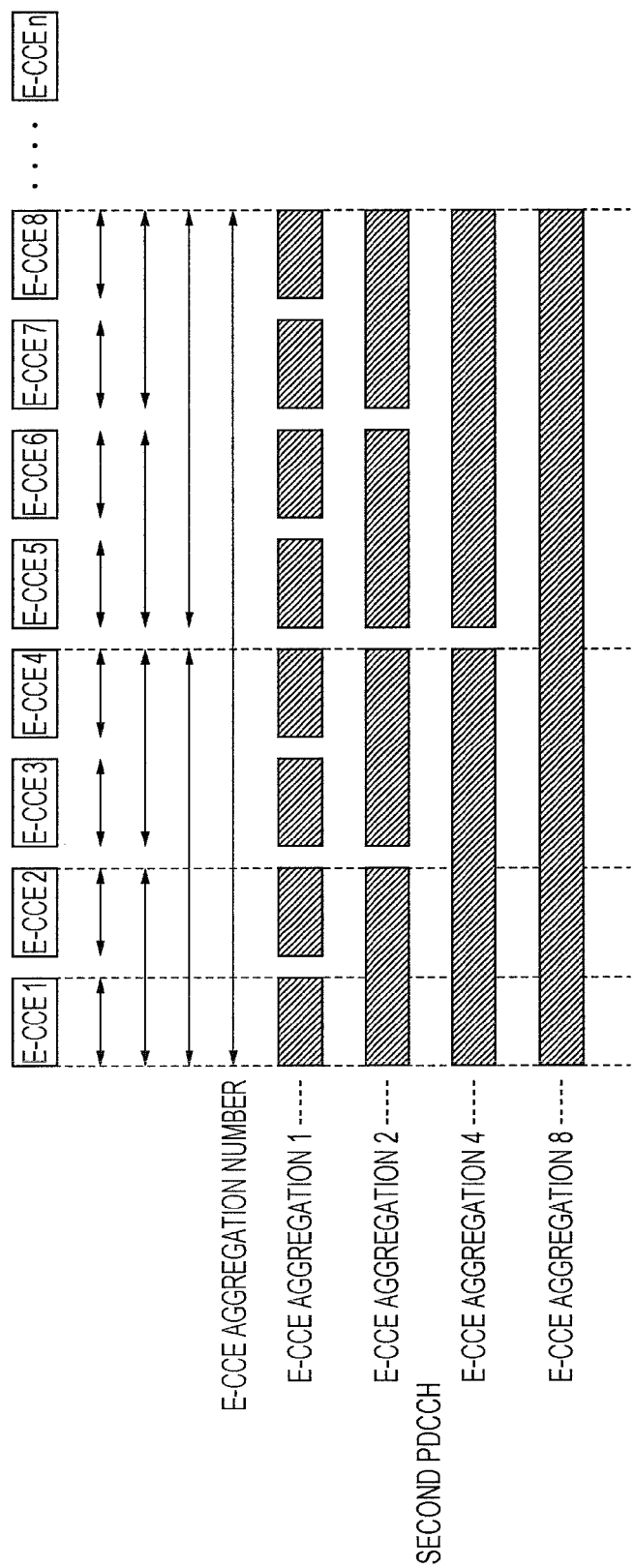
FIG. 18 is a diagram explaining a logical relationship between a second PDCCH and E-CCEs in the communication system 1 in accordance with the embodiment of the present invention.

One second PDCCH is constituted by one or more E-CCEs (first elements). FIG. 18 is a diagram explaining a logical relationship between the second PDCCH and E-CCEs in the communication system 1 in accordance with the embodiment of the present invention. E-CCEs used between the base station apparatus 3 (or the RRH 4) and the mobile station apparatus 5 are each assigned a number identifying the E-CCE. E-CCEs are numbered in accordance with a predetermined rule. Here, an E-CCE t represents an E-CCE assigned the E-CCE number t. The second PDCCH is constituted by an aggregation of a plurality of E-CCEs (E-CCE aggregation). The number of E-CCEs constituting this aggregation is hereinafter referred to as "E-CCE aggregation number". The E-CCE aggregation number of the second PDCCH is set by the base station apparatus 3 in accordance with the coding rate set for the second PDCCH and the number of bits of DCI included in the second PDCCH. Also, an aggregation constituted by n E-CCEs is hereinafter referred to as an "E-CCE aggregation n".

For example, the base station apparatus 3 configures the second PDCCH by one E-CCE (E-CCE aggregation 1), configures the second PDCCH by two E-CCEs (E-CCE aggregation 2), configures the second PDCCH by four E-CCEs (E-CCE aggregation 4), or configures the second PDCCH by eight E-CCEs (E-CCE aggregation 8). For example, the base station apparatus 3 uses an E-CCE aggregation number indicating a small number of E-CCEs constituting the second PDCCH for the mobile station apparatus 3 having a good channel quality, and uses an E-CCE aggregation number indicating a large number of E-CCEs constituting the second PDCCH for the mobile station apparatus 3 having a poor channel quality. Also, for example, the base station apparatus 3 uses an E-CCE aggregation number indicating a small number of E-CCEs constituting the second PDCCH when transmitting DCI constituted by a small number of bits, and uses an E-CCE aggregation number indicating a large number of E-CCEs constituting the second PDCCH when transmitting DCI constituted by a large number of bits.

Hatched rectangles illustrated in FIG. 18 represent the second PDCCH candidates. The second PDCCH candidates (E-PDCCH candidates) are targets on which the mobile station apparatus 5 performs demodulation to detect the second PDCCH. The second PDCCH candidates are configured independently for each E-CCE aggregation number. The second PDCCH candidates configured for each E-CCE aggregation number are constituted by one or more different E-CCEs. The number of second PDCCH candidates is set independently for each E-CCE aggregation number. The second PDCCH candidates configured for each E-CCE aggregation number are constituted by E-CCEs assigned consecutive numbers or by E-CCEs assigned non-consecutive numbers. The mobile station apparatus 5 performs demodulation on the second PDCCH candidates, the number of which is set for each E-CCE aggregation number, to detect the second PDCCH. If the mobile station apparatus 5 determines that it has detected the second PDCCH addressed thereto, the mobile station apparatus 5 no longer needs to perform (may stop) demodulation on some of the configured second PDCCH candidates to detect the second PDCCH.

The number of E-CCEs configured in the second PDCCH region depends on the number of DL PRB pairs constituting the second PDCCH region. For example, an amount of resource (the number of resource elements) corresponding to one E-CCE is substantially equal to a quarter of an amount of resource that can be used for signals of the second PDCCH in one DL PRB pair (excluding resource elements used for the downlink reference signals and the first PDCCH). Also, one second PDCCH region may be constituted only by a plurality of PRBs in one of the slots of the downlink subframe. Alternatively, the second PDCCH region may be configured independently in the first slot and in the second slot of the downlink subframe. Note that in the embodiment of the present invention, the case will be mainly described in which the second PDCCH region is constituted by a plurality of DL PRB pairs in the downlink subframe for simplicity of explanation; however, the present invention is not limited to such a case.

Figure 19:
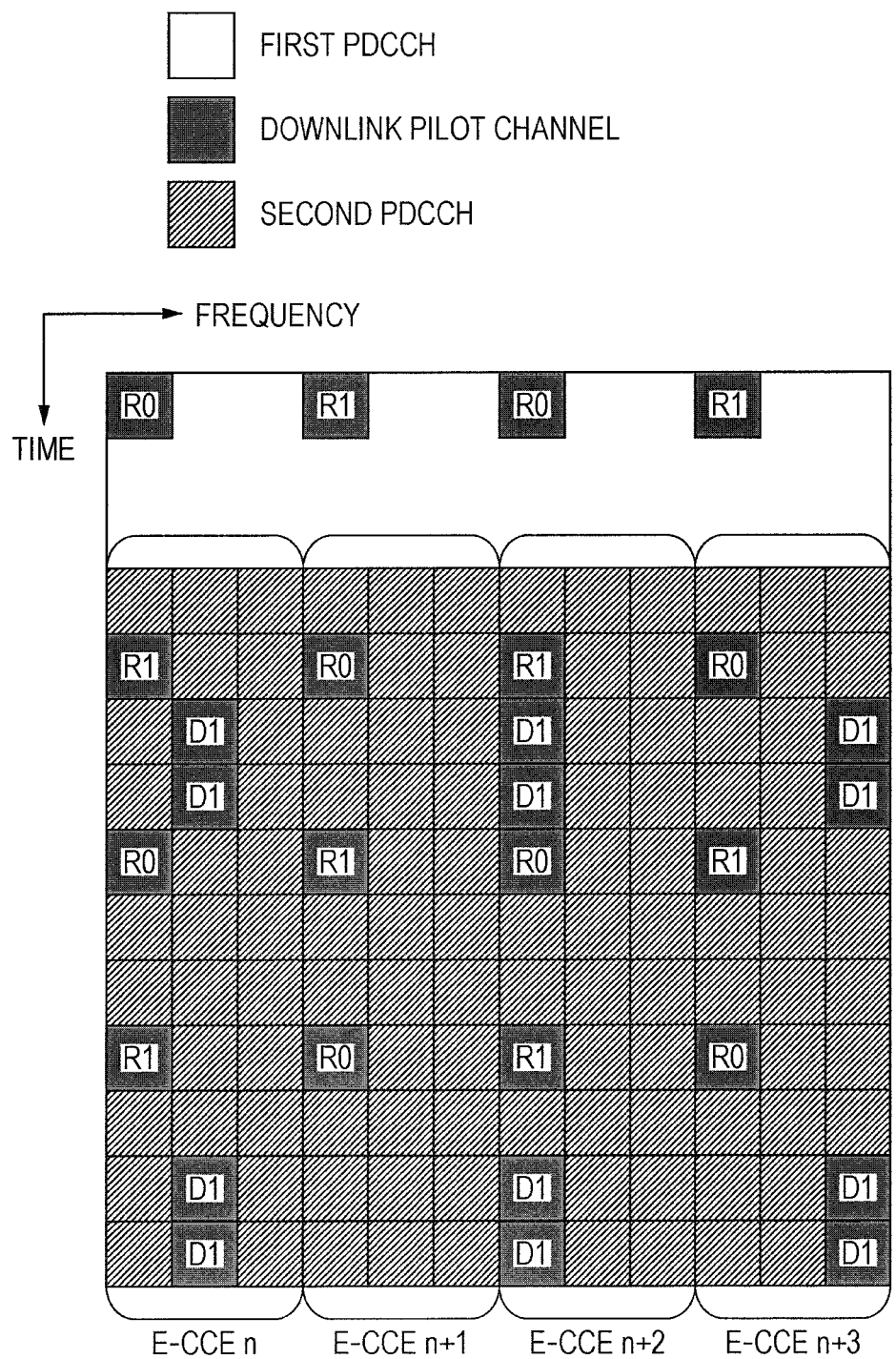
FIG. 19 is a diagram illustrating an example of the structure of E-CCEs in accordance with the embodiment of the present invention.

FIG. 19 is a diagram illustrating an example of the structure of E-CCEs in accordance of the embodiment of the present invention. Here, resources constituting the E-CCEs are illustrated, and illustration and description of unrelated part (the PDSCH and first PDCCH) are omitted. Here, one DL PRB pair is illustrated. Here, the case is illustrated in which the second PDCCH is constituted by the fourth to fourteenth OFDM symbols of the downlink subframe, and CRSs (R0 and R1) for two transmit antennas (antenna port 0 and antenna port 1) and a UE-specific RS (D1) for one or two transmit antennas (antenna port 7, antenna port 8, not illustrated) are mapped. In this figure, the vertical axis represents the frequency domain and the horizontal axis represents the time domain. A quarter of a resource that can be used for signals of the second PDCCH in the DL PRB pair is configured as one E-CCE. For example, a quarter of a resource of the DL PRB pair in the frequency domain is configured as one E-CCE. Specifically, a resource obtained by dividing the resource of the DL PRB pair in units of three subcarriers is configured as one E-CCE. For example, E-CCEs included in the DL PRB pair are numbered in ascending order from the E-CCE including low subcarriers in the frequency domain.

Figure 20:
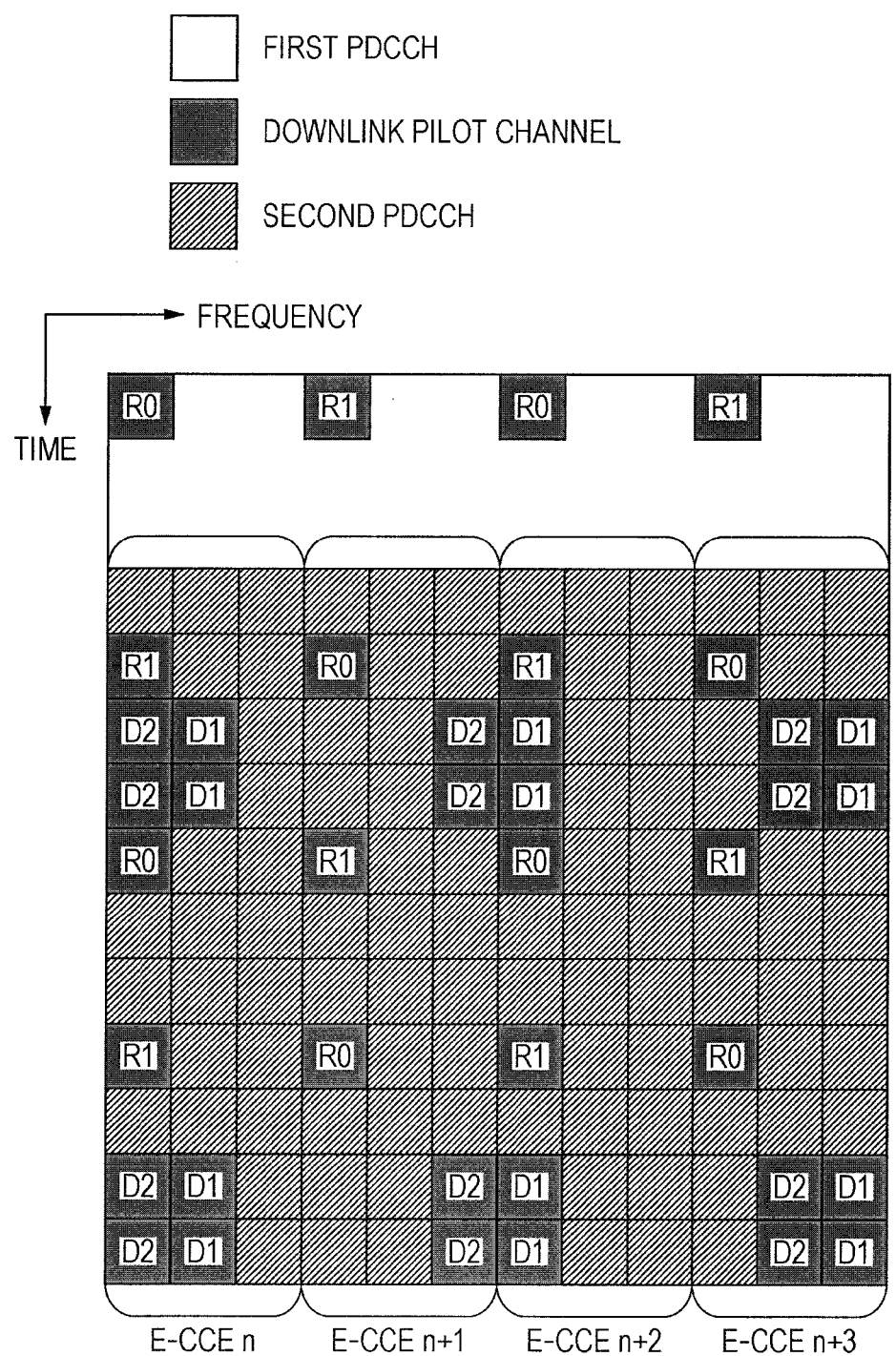
FIG. 20 is a diagram illustrating an example of the structure of E-CCEs in accordance with the embodiment of the present invention.

FIG. 20 is a diagram illustrating an example of the structure of E-CCEs in accordance with the embodiment of the present invention. Compared with the example illustrated in FIG. 19, the number of antenna ports for UE-specific RS differs and the case is illustrated in which UE-specific RSs (D1, D2) for three or four transmit antennas (antenna port 7, antenna port 8, antenna port 9, and antenna port 10, not illustrated) are mapped.

Different physical resource mapping (first physical resource mapping or second physical resource mapping) is applied to different second PDCCH regions. Specifically, the structure (aggregation method) of E-CCEs constituting each second PDCCH differs. For example, a second PDCCH to which the first physical resource mapping is applied is referred to as a localized E-PDCCH. For example, a second PDCCH to which the second physical resource mapping is applied is referred to as a distributed E-PDCCH. For example, a localized E-PDCCH is constituted by one E-CCE (E-CCE aggregation 1), is constituted by two E-CCEs (E-CCE aggregation 2), or is constituted by four E-CCEs (E-CCE aggregation 4). A localized E-PDCCH assigned the E-CCE aggregation number of 2 or larger is constituted by a plurality of E-CCEs assigned consecutive E-CCE numbers (contiguously arranged in the frequency domain). For example, a distributed E-PDCCH is constituted by four E-CCEs (E-CCE aggregation 4) or is constituted by eight E-CCEs (E-CCE aggregation 8). A distributed E-PDCCH is constituted by a plurality of E-CCEs assigned non-consecutive E-CCE numbers (non-contiguously arranged in the frequency domain). For example, four E-CCEs constituting a distributed E-PDCCH of E-CCE aggregation 4 are E-CCEs included in different DL PRB pairs. Also, eight E-CCEs constituting a distributed E-PDCCH of E-CCE aggregation 8 may be E-CCEs included in different DL PRB pairs or some of the plurality of E-CCEs may be E-CCEs included in the same DL PRB pair. For example, a plurality of E-CCEs used for one localized E-PDCCH are E-CCEs included in one DL PRB pair, and a plurality of E-CCEs used for one distributed E-PDCCH are E-CCEs included in a plurality of DL PRB pairs.

Figure 21:
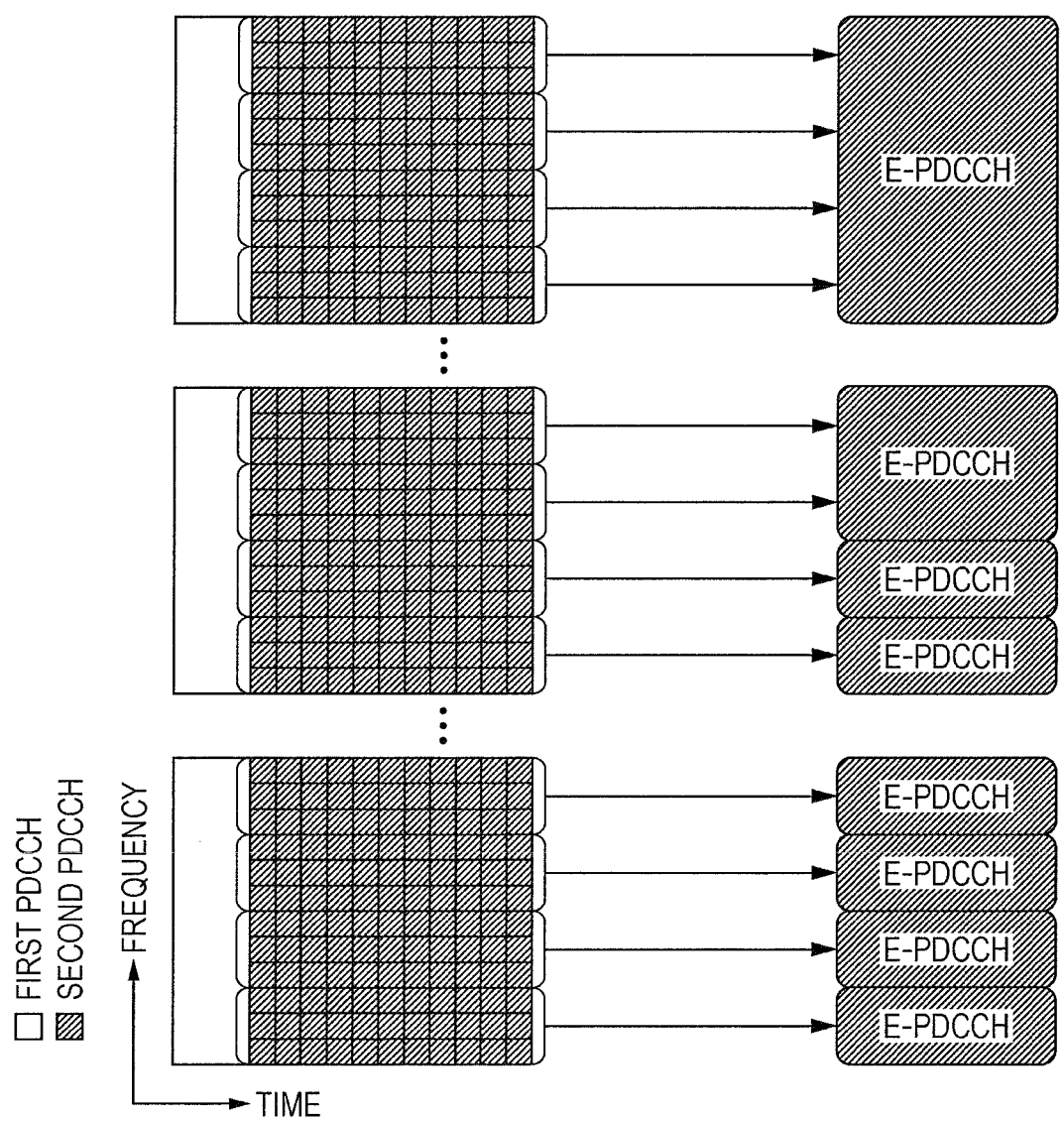
FIG. 21 is a diagram illustrating an example of the structures of E-CCEs and localized E-PDCCHs.

FIG. 21 is a diagram illustrating an example of the structures of E-CCEs and localized E-PDCCHs. Here, the case is illustrated in which each second PDCCH is constituted by the fourth to fourteenth OFDM symbols of the downlink subframe. In this figure, the vertical axis represents the frequency domain and the horizontal axis represents the time domain. For example, a localized E-PDCCH of E-CCE aggregation 2 is constituted by two E-CCEs having the smallest E-CCE numbers (lowest in the frequency domain) in a DL PRB pair or two E-CCEs having the largest E-CCE numbers (highest in the frequency domain) in a DL PRB pair. For example, a localized E-PDCCH of E-CCE aggregation 4 is constituted by four E-CCEs included in a DL PRB pair. For example, in a DL PRB pair, different E-CCEs individually constitute different localized E-PDCCHs (of E-CCE aggregation 1). For example, in a DL PRB pair, two E-CCEs individually constitute different localized E-PDCCHs (of E-CCE aggregation 1) and two different E-CCEs constitute one localized E-PDCCH (of E-CCE aggregation 2).

Figure 22:
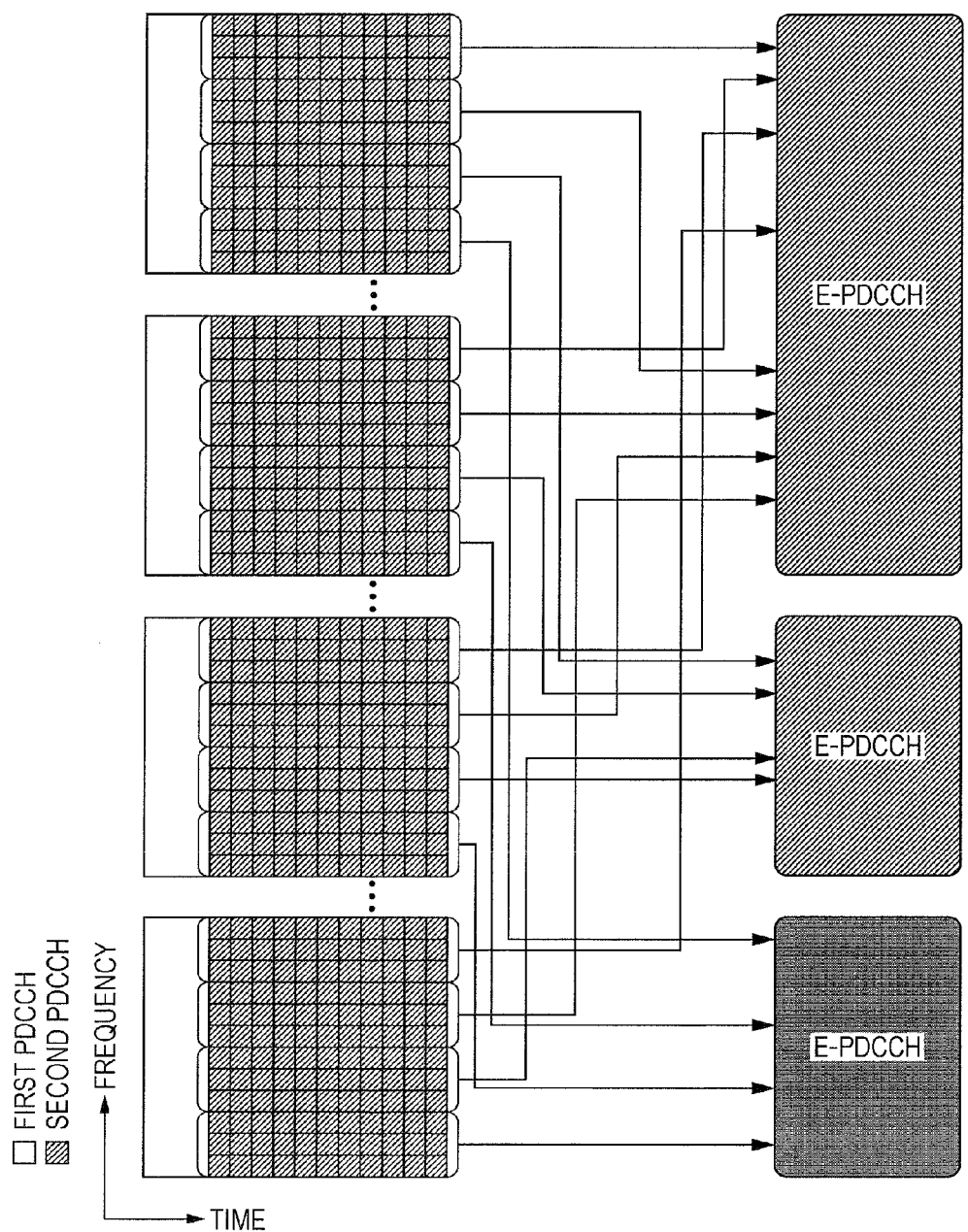
FIG. 22 is a diagram illustrating an example of the structures of E-CCEs and distributed E-PDCCHs.

FIG. 22 is a diagram illustrating an example of the structures of E-CCEs and distributed E-PDCCHs. Here, the case is illustrated in which each second PDCCH is constituted by the fourth to fourteenth OFDM symbols of the downlink subframe. In this figure, the vertical axis represents the frequency domain and the horizontal axis represents the time domain. For example, a distributed E-PDCCH of E-CCE aggregation 4 is constituted by four E-CCEs included in four different DL PRB pairs. For example, a distributed E-PDCCH of E-CCE aggregation 4 is constituted by E-CCEs each assigned the smallest E-CCE number (lowest in the frequency domain) in a corresponding DL PRB pair. For example, a distributed E-PDCCH of E-CCE aggregation 4 is constituted by E-CCEs each assigned the second smallest E-CCE number (second lowest in the frequency domain) in a corresponding DL PRB pair. For example, a distributed E-PDCCH of E-CCE aggregation 8 is constituted by a plurality of E-CCEs included in four DL PRB pairs, specifically two E-CCEs from each DL PRB pair. For example, a distributed E-PDCCH of E-CCE aggregation 8 is constituted by E-CCEs each assigned the largest E-CCE number (highest in the frequency domain) and E-CCEs each assigned the second largest E-CCE number (second highest in the frequency domain) in a corresponding DL PRB pair.

As for E-CCEs constituting one distributed E-PDCCH, the second physical resource mapping permits a distributed E-PDCCH to be constituted by E-CCEs assigned different E-CCE numbers (located at different frequency positions) in respective DL PRB pairs. For example, one distributed E-PDCCH may be constituted by an E-CCE assigned the smallest E-CCE number (lowest in the frequency domain) in a DL PRB pair, an E-CCE assigned the second smallest E-CCE number (second lowest in the frequency domain) in a DL PRB pair, an E-CCE assigned the third smallest E-CCE number (third lowest in the frequency domain) in a DL PRB pair, and an E-CCE assigned the fourth smallest E-CCE number (fourth lowest in the frequency domain) (the largest E-CCE number) (highest in the frequency domain) in a DL PRB pair.

Also, the present invention is applicable to the cases where one second PDCCH is constituted by one or more DL PRBs. That is, the present invention is applicable to the case where one second PDCCH region is constituted by a plurality of DL PRBs each in the first slot of the corresponding downlink subframe and the case where one second PDCCH region is constituted by a plurality of DL PRBs each in the second slot of the corresponding downlink subframe. In a DL PRB pair constituting the second PDCCH region, all the resources (downlink resource elements) excluding those for the first PDCCH and the downlink reference signals are not necessarily used for signals of the second PDCCH; instead, no signal (null) may be mapped to some of the resources (downlink resource elements).

In general, the first physical resource mapping can be applied to second PDCCH regions to which precoding processing is applied, and the second physical resource mapping can be applied to second PDCCH regions to which precoding processing is not applied. In the second physical resource mapping, one E-PDCCH is constituted by resources non-contiguously arranged in the frequency domain. Thus, frequency diversity can be obtained.

One or more second PDCCH regions are configured for the mobile station apparatus 5 by the base station apparatus 3. For example, two second PDCCH regions, i.e., a second PDCCH region to which the first physical resource mapping is applied and precoding processing is applied and a second PDCCH region to which the second physical resource mapping is applied and precoding processing is not applied, are configured for the mobile station apparatus 5. For example, only second PDCCH regions to which the second physical resource mapping is applied and precoding processing is not applied are configured for the mobile station apparatus 5. The mobile station apparatus 5 is specified (set or configured) to perform processing (monitoring) for detecting the second PDCCH in each second PDCCH region configured by the base station apparatus 3. Monitoring of the second PDCCH may be specified automatically (implicitly) through configuration of the second PDCCH regions for the mobile station apparatus 5 or specified through signaling different from signaling indicating configuration of the second PDCCH regions. The same second PDCCH region may be specified for the plurality of mobile station apparatuses 5 by the base station apparatus 3.

Information indicating configuration (specifying and setting) of the second PDCCH regions is exchanged between the base station apparatus 3 and the mobile station apparatus 5 before communication using the second PDCCH is started. For example, the information is exchanged using RRC (Radio Resource Control) signaling. Specifically, the mobile station apparatus 5 receives, from the base station apparatus 3, information representing positions (assignment) of DL PRB pairs of the second PDCCH regions. Also, the mobile station apparatus 5 is notified, for each second PDCCH region, by the base station apparatus 3, of information representing the type of physical resource mapping (the first physical resource mapping or the second physical resource mapping) applied to the second PDCCH. Alternatively, the mobile station apparatus 5 may be notified by the base station apparatus 3 of information other than the information explicitly representing the type of physical resource mapping applied to the second PDCCH, and the mobile station apparatus 5 may tacitly recognize the type of the physical resource mapping applied to the second PDCCH on the basis of the information. For example, the mobile station apparatus 5 is notified by the base station apparatus 3 of information representing a transmission scheme of the second PDCCH in each second PDCCH region. If the information represents a transmission scheme that employs precoding processing, the mobile station apparatus 5 recognizes that the physical resource mapping applied to the second PDCCH region is the first physical resource mapping. If the information represents a transmission scheme that does not employ precoding processing, the mobile station apparatus 5 recognizes that the physical resource mapping applied to the second PDCCH region is the second physical resource mapping. Alternatively, in the case where one of the types of physical resource mapping to be applied to second PDCCHs is set in advance for second PDCCH regions by default, only when physical resource mapping different from the setting is used, the mobile station apparatus 5 may be notified by the base station apparatus 3 of information representing the changed setting. The mobile station apparatus 5 uses the UE-specific RS received in the second PDCCH region set by the base station apparatus 3 to demodulate signals of the second PDCCH and detect the second PDCCH addressed thereto. For example, the mobile station apparatus 5 demodulates signals of the second PDCCH using the UE-specific RS included in a DL PRB pair to which to-be-demodulated resources belong.

Candidates (a combination of candidates) (a set of candidates) of the E-CCE aggregation number of a localized E-PDCCH in a second PDCCH region to which the first physical resource mapping is applied may be set (configured) for the mobile station apparatus 5 by the base station apparatus 3. For example, E-CCE aggregation 1, E-CCE aggregation 2, and E-CCE aggregation 4 may be set for a given mobile station apparatus 5 as candidates of the E-CCE aggregation number of a localized E-PDCCH in a second PDCCH region to which the first physical resource mapping is applied. For example, E-CCE aggregation 2 and E-CCE aggregation 4 may be set for a given mobile station apparatus 5 as candidates of the E-CCE aggregation number of a localized E-PDCCH in a second PDCCH region to which the first physical resource mapping is applied.

First Embodiment

Two types (a first correspondence and a second correspondence) are used to indicate correspondences between individual E-CCEs in a DL PRB pair and antenna ports (transmit antennas) associated with the individual E-CCEs. The first correspondence implies that different E-CCEs in a DL PRB pair are transmitted from different antenna ports. The second correspondence implies that signals are transmitted from different antenna ports on some E-CCEs and from the same antenna port on some E-CCEs among individual E-CCEs included in a DL PRB pair. A plurality of E-CCEs included in a DL PRB pair are classified into a plurality of groups (sets), for example, two groups. In the second correspondence, E-CCEs of the same group are transmitted from a common antenna port and E-CCEs of different groups are transmitted from different antenna ports.

In a second PDCCH region for which E-CCE aggregation 1, E-CCE aggregation 2, and E-CCE aggregation 4 are set as candidates of the E-CCE aggregation number of a localized E-PDCCH, UE-specific RSs (D1 and D2) for four transmit antennas (antenna port 7, antenna port 8, antenna port 9, and antenna port 10) (antenna port 107, antenna port 108, antenna port 109, and antenna port 110) are mapped as illustrated in FIG. 20. In this case, the first correspondence is used to indicate correspondences between individual E-CCEs in a DL PRB pair and antenna ports (transmit antenna) associated with the individual E-CCEs. In FIG. 20, a signal of the second PDCCH of an E-CCE n is transmitted from antenna port 7 (antenna port 107), a signal of the second PDCCH of an E-CCE n+1 is transmitted from antenna port 8 (antenna port 108), a signal of the second PDCCH of an E-CCE n+2 is transmitted from antenna port 9 (antenna port 109), and a signal of the second PDCCH of an E-CCE n+3 is transmitted from antenna port 10 (antenna port 110). The base station apparatus 3 transmits the signals mapped to the individual E-CCEs in the DL PRB pair from the respective transmit antennas. The mobile station apparatus 5 demodulates the signals mapped to the individual E-CCEs in the DL PRB pair by using the UE-specific RSs transmitted from the respective transmit antennas.

In a second PDCCH region for which E-CCE aggregation 2 and E-CCE aggregation 4 are set as candidates of the E-CCE aggregation number of a localized E-PDCCH, a UE-specific RS (D1) for two transmit antennas (antenna port 7 and antenna port 8) (antenna port 107 and antenna port 108) is mapped as illustrated in FIG. 19 or UE-specific RSs (D1 and D2) for four transmit antennas (antenna port 7, antenna port 8, antenna port 9, and antenna port 10) (antenna port 7, antenna port 8, antenna port 9, and antenna port 10) are mapped as illustrated in FIG. 20. In this case, the second correspondence is used to indicate correspondences between individual E-CCEs in a DL PRB pair and antenna ports (transmit antennas) associated with the individual E-CCEs. The following describes the case where a UE-specific RS for two transmit antennas is mapped in the second PDCCH region and the case where UE specific RSs for four transmit antennas are mapped in the second PDCCH region in detail.

A description will be given of the case where a UE-specific RS (D1) for two transmit antennas (antenna port 7 and antenna port 8) (antenna port 107 and antenna port 108) is mapped. In FIG. 19, a signal of the second PDCCH of the E-CCE n is transmitted from antenna port 7 (antenna port 107), a signal of the second PDCCH of the E-CCE n+1 is transmitted from antenna port 7 (antenna port 107), a signal of the second PDCCH of the E-CCE n+2 is transmitted from antenna port 8 (antenna port 108), and a signal of the second PDCCH of the E-CCE n+3 is transmitted from antenna port 8 (antenna port 108). That is, the E-CCE n and the E-CCE n+1 constitute one group, and the E-CCE n+2 and the E-CCE n+3 constitute another group. The base station apparatus 3 transmits the signals mapped to the individual E-CCEs in the DL PRB pair from the corresponding transmit antennas. The mobile station apparatus 5 demodulates the signals mapped to the individual E-CCEs in the DL PRB pair by using the UE-specific RS transmitted from the corresponding transmit antennas. In this case, signals of the second PDCCH are mapped to downlink resource elements to which the UE-specific RS (D2) for antenna port 9 and antenna port 10 is mapped in FIG. 20.

A description will be given of the case where UE-specific RSs (D1 and D2) for four transmit antennas (antenna port 7, antenna port 8, antenna port 9, and antenna port 10) (antenna port 107, antenna port 108, antenna port 109, and antenna port 110) are mapped. In FIG. 20, in a second PDCCH region, a signal of the second PDCCH of the E-CCE n is transmitted from antenna port 7 (antenna port 107), a signal of the second PDCCH of the E-CCE n+1 is transmitted from antenna port 7 (antenna port 107), a signal of the second PDCCH of the E-CCE n+2 is transmitted from antenna port 8 (antenna port 108), and a signal of the second PDCCH of the E-CCE n+3 is transmitted from antenna port 8 (antenna port 108). In FIG. 20, in another second PDCCH region, a signal of the second PDCCH of the E-CCE n is transmitted from antenna port 9 (antenna port 109), a signal of the second PDCCH of the E-CCE n+1 is transmitted from antenna port 9 (antenna port 109), a signal of the second PDCCH of the E-CCE n+2 is transmitted from antenna port 10 (antenna port 110), and a signal of the second PDCCH of the E-CCE n+3 is transmitted from antenna port 10 (antenna port 110). That is, the E-CCE n and the E-CCE n+1 constitute one group, and the E-CCE n+2 and the E-CCE n+3 constitute another group.

For each mobile station apparatus 5, one antenna-port set from among two antenna-port sets (a first antenna-port set and a second antenna-port set) is set for the second PDCCH region by the base station apparatus 3. For example, the first antenna-port set includes antenna port 7 (antenna port 107) and antenna port 8 (antenna port 108), whereas the second antenna-port set includes antenna port 9 (antenna port 109) and antenna port 10 (antenna port 110). The base station apparatus 3 transmits signals mapped to individual E-CCEs in a DL PRB pair from corresponding transmit antennas. The mobile station apparatus 5 demodulates the signals mapped to the individual E-CCEs in the DL PRB pair by using UE-specific RSs transmitted from the corresponding transmit antennas. The mobile station apparatus 5 is notified by the base station apparatus 3 of information representing the antenna-port set through RRC signaling.

In this case, the mobile station apparatus 5 for which antenna port 7 (antenna port 107) and antenna port 8 (antenna port 108) are set for the second PDCCH region does not use downlink resource elements to which the UE-specific RS (D2) for antenna port 9 (antenna port 109) and antenna port 10 (antenna port 110) is mapped in FIG. 20. The mobile station apparatus 5 does not perform demodulation processing and demapping processing on signals of the second PDCCH mapped to these downlink resource elements. Also, in this case, the mobile station apparatus 5 for which antenna port 9 (antenna port 109) and antenna port 10 (antenna port 110) are set for the second PDCCH region does not use downlink resource elements to which the UE-specific RS (D1) for antenna port 7 (antenna port 107) and antenna port 8 (antenna port 108) is mapped in FIG. 20. That is, MU-MIMO is implemented between the second PDCCH regions that use different antenna-port sets. For example, second PDCCH regions constituted by the same DL PRB pair are configured for two mobile station apparatuses 5, the first antenna-port set (antenna port 7 and antenna port 8) (antenna port 107 and antenna port 108) is set for one of the mobile station apparatuses 5, and the second antenna-port set (antenna port 9 and antenna port 10) (antenna port 109 and antenna port 110) is set for the other of the mobile station apparatuses 5.

As described above, in the embodiment of the present invention, in a second PDCCH region in which UE-specific RSs (D1 and D2) for four transmit antennas (antenna port 7, antenna port 8, antenna port 9, and antenna port 10) (antenna port 107, antenna port 108, antenna port 109, and antenna port 110) are mapped, the first correspondence or the second correspondence is used to indicate correspondences between individual E-CCEs in a DL PRB pair and antenna ports (transmit antennas) associated with the individual E-CCEs. The first correspondence implies that different E-CCEs in a DL PRB pair are transmitted from different antenna ports. The second correspondence implies that signals are transmitted from different antenna ports on some E-CCEs and from the same antenna port on some E-CCEs among individual E-CCEs in a DL PRB pair. A plurality of E-CCEs included in a DL PRB pair are classified into a plurality of groups (sets), for example, two groups. For a given mobile station apparatus 5, the first antenna-port set or the second antenna-port set is used to indicate antenna ports used for transmission of signals mapped to E-CCEs, for a second PDCCH region to which the second correspondence is used. The mobile station apparatus 5 is notified by the base station apparatus 3 of information representing the first correspondence or the second correspondence through RRC signaling.

For example, in the case where the base station apparatus 3 determines that the present state is suitable for MU-MIMO, the base station apparatus 3 configures a second PDCCH region that employs the second correspondence for the mobile station apparatus 5. In the case where the base station apparatus 3 determines that the present state is not suitable for MU-MIMO, the base station apparatus 3 configures a second PDCCH region that employs the first correspondence for the mobile station apparatus 5. For example, the state suitable for MU-MIMO is a state in which the base station apparatus 3 can apply beamforming (precoding processing) on signals addressed to different mobile station apparatuses 5 without causing large interference and there are requests for transmitting signals of the second PDCCH to individual mobile station apparatuses 5 of the plurality of geographically separated mobile station apparatuses 5. For example, it is difficult to apply beamforming to signals addressed to individual mobile station apparatuses 5 of the plurality of mobile station apparatuses 5 located at geographically close locations without causing large interference. Thus, the base station apparatus 3 does not apply MU-MIMO to signals of the second PDCCH addressed to these mobile station apparatuses 5.

The present invention is applicable to the case where the number of antennas for UE-specific RSs is fixed to four for a second PDCCH region to which the first physical resource mapping is applied. Also, candidates (combination of candidates) of the E-CCE aggregation number of a second PDCCH region may be implicitly recognized through setting of correspondences between individual E-CCEs in a DL PRB pair and antenna ports (transmit antennas) associated with the individual E-CCEs for the second PDCCH region. In this case, information representing candidates (combination of candidates) of the E-CCE aggregation number of the second PDCCH region need not be notified explicitly through signaling.

In a second PDCCH region to which the second physical resource mapping is applied, only a UE-specific RS for a single transmit antenna (antenna port 7) (antenna port 107) may be mapped. In a second PDCCH region to which the second physical resource mapping is applied, a third correspondence may be used to indicate correspondences between individual E-CCEs in a DL PRB pair and antenna ports (transmit antennas) associated with the individual E-CCEs. The third correspondence implies that individual E-CCEs in a DL PRB pair are transmitted from the same (common) antenna port. The base station apparatus 3 transmits signals of individual E-CCEs in a DL PRB pair of a second PDCCH region to which the second physical resource mapping is applied, from antenna port 7 (antenna port 107). The mobile station apparatus 5 demodulates the signals mapped to the individual E-CCEs in the DL PRB pair of the second PDCCH region to which the second physical resource mapping is applied, by using the UE-specific RS associated with antenna port 7 (antenna port 107) in the same DL PRB pair.

The following describes control signals mapped to the second PDCCH. Control signals mapped to the second PDCCH are processed for each mobile station apparatus 5. Like data signals, control signals can be subjected to scrambling processing, modulation processing, layer mapping processing, precoding processing, etc. Here, layer mapping processing refers to part of MIMO signal processing which is performed when multi-antenna transmission is applied to the second PDCCH. For example, layer mapping processing is performed on the second PDCCH to which precoding processing is applied and the second PDCCH to which precoding processing is not applied but transmit diversity is applied. Also, control signals mapped to the second PDCCH can be subjected to the same precoding processing as that performed on the UE-specific RS. At this time, it is preferable that precoding processing be performed using a precoding weight suitable for each mobile station apparatus 5.

Also, the UE-specific RS is multiplexed by the base station apparatus 3 in a DL PRB pair to which the second PDCCH is mapped. The mobile station apparatus 5 performs demodulation processing on signals of the second PDCCH by using the UE-specific RS. As for correspondences between the UE-specific RSs used for demodulation of the second PDCCH and antenna ports used for E-CCEs in a DL PRB pair, different correspondences may be set for each second PDCCH region. In a second PDCCH region to which the first physical resource mapping is applied, UE-specific RSs for a plurality of transmit antennas (antenna port 7, antenna port 8, antenna port 9, and antenna port 10) (antenna port 107, antenna port 108, antenna port 109, and antenna port 110) (antenna port 7 and antenna port 8) (antenna port 107 and antenna port 108) are mapped. In a second PDCCH region to which the second physical resource mapping is applied, a UE specific RS for a single transmit antenna (antenna port 7) (antenna port 107) is mapped. In the case where transmit diversity such as SFBC (Space Frequency Block Coding) or the like is applied to a distributed E-PDCCH, a UE-specific RS for two transmit antennas (antenna port 7 and antenna port 8) (antenna port 107 and antenna port 108) may be mapped in a second PDCCH region to which the second physical resource mapping is applied.

The mobile station apparatus 5 demodulates the signals of the individual E-CCEs in the DL PRB pair by using the UE-specific RSs of the corresponding transmit antennas. As for the relationship between signals of E-CCEs in a DL PRB pair and transmit antennas, the first correspondence, the second correspondence, or the third correspondence is used. In a second PDCCH region to which the first physical resource mapping is applied, the first correspondence or the second correspondence is used. In a second PDCCH region to which the second physical resource mapping is applied, the third correspondence is used. As for the first correspondence, individual E-CCEs in a DL PRB pair are associated with different transmit antennas, and signals are transmitted from the corresponding transmit antennas. As for the second correspondence, among individual E-CCEs in a DL PRB pair, some E-CCEs are associated with different antenna transmit antennas and some E-CCEs are associated with the same transmit antenna, and signals are transmitted from the corresponding transmit antennas. A plurality of E-CCEs included in a DL PRB pair are classified into a plurality of groups (sets), for example, two groups. As for the second correspondence, individual E-CCEs of the same group are associated with a common transmit antenna and E-CCEs of different groups are associated with different transmit antennas, and signals are transmitted from the corresponding transmit antennas. For the third correspondence, individual E-CCEs in a DL PRB pair are associated with the same (common) transmit antenna, and signals are transmitted from the corresponding transmit antenna.

Note that a predefined scrambling ID may be used to generate the UE-specific RS mapped in the second PDCCH region. For example, any of values of 0 to 3 may be defined as a scrambling ID used for the UE-specific RS.

Figure 23:
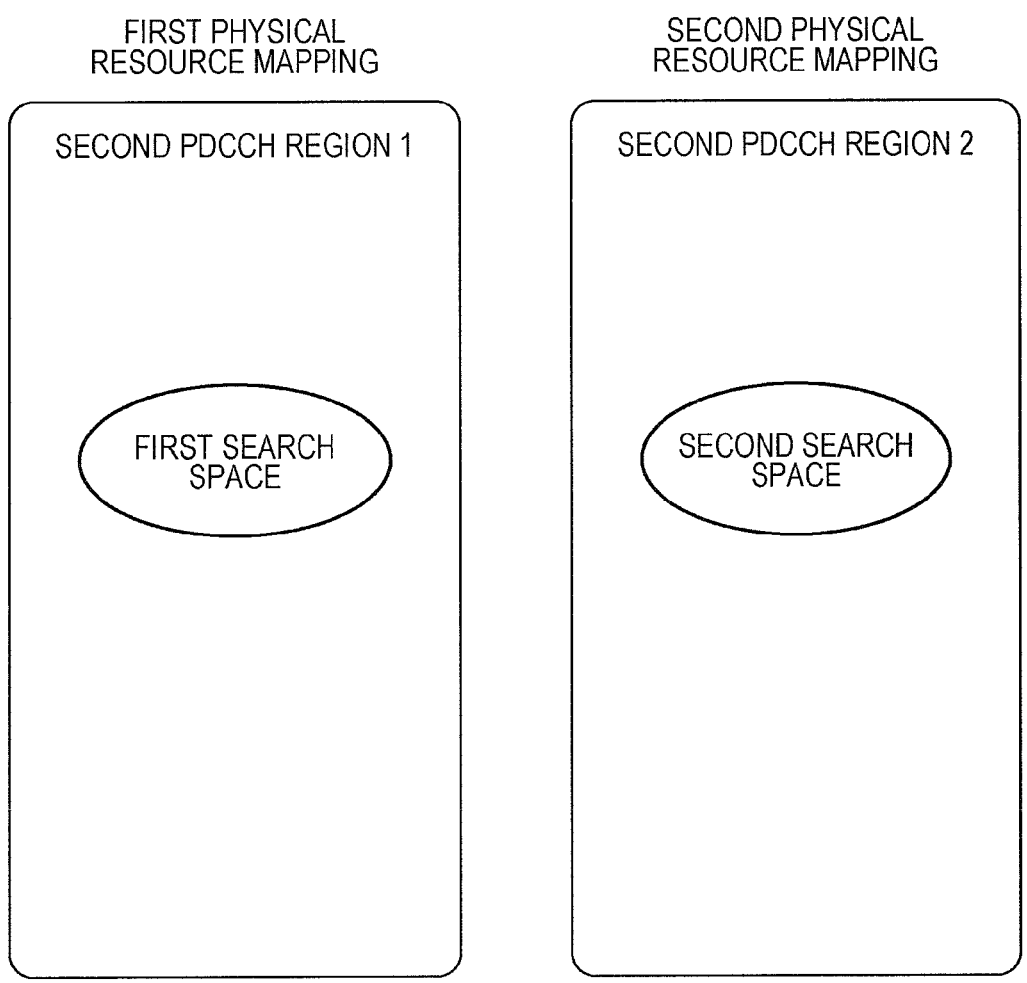
FIG. 23 is a diagram explaining how the mobile station apparatus 5 performs monitoring of the second PDCCH in accordance with the embodiment of the present invention.

FIG. 23 is a diagram explaining how the mobile station apparatus 5 performs monitoring of the second PDCCH in accordance with the embodiment of the present invention. A plurality of second PDCCH regions (a second PDCCH region 1 and a second PDCCH region 2) are configured for the mobile station apparatus 5. A search space is set in each of the second PDCCH regions for the mobile station apparatus 5. A search space refers to a logical space in the second PDCCH region in which the mobile station apparatus 5 performs demodulation to detect the second PDCCH. A search space is constituted by a plurality of second PDCCH candidates. A second PDCCH candidate is a target on which the mobile station apparatus 5 performs demodulation to detect the second PDCCH. For each E-CCE aggregation number, different second PDCCH candidates are constituted by different E-CCEs (including one E-CCE and a plurality of E-CCEs). E-CCEs constituting a plurality of second PDCCH candidates of a search space set in a second PDCCH region to which the first physical resource mapping is applied are a plurality of E-CCEs assigned consecutive E-CCE numbers. E-CCEs constituting a plurality of second PDCCH candidates of a search space set in a second PDCCH region to which the second physical resource mapping is applied are a plurality of E-CCEs assigned non-consecutive E-CCE numbers. The first E-CCE number used in a search space in a second PDCCH region is set for each mobile station apparatus 5. For example, the first E-CCE number used in a search space is set by a random function which uses an identifier (mobile station identifier) assigned to the mobile station apparatus 5. For example, the base station apparatus 3 notifies the mobile station apparatus 5 of the first E-CCE number used in a search space through RRC signaling.

A plurality of search spaces (a first search space and a second search space) are set for the mobile station apparatus 5 for which a plurality of second PDCCH regions are configured. The first physical resource mapping is applied to some second PDCCH regions (second PDCCH regions 1) among the plurality of second PDCCH regions configured for the mobile station apparatus 5, and the second physical resource mapping is applied to some other second PDCCH regions (second PDCCH regions 2).

The number of second PDCCH candidates of the first space may differ from the number of second PDCCH candidates of the second search space. For example, the number of second PDCCH candidates of the first search space may be set larger than the number of second PDCCH candidates of the second search space in order to perform control so that the second PDCCH to which precoding processing is applied is used generally and, in the case where some kind of situation makes it difficult for the base station apparatus 3 to achieve suitable precoding processing, the second PDCCH to which precoding processing is not applied but having frequency diversity effect is used.

Also, for a certain E-CCE aggregation number, the number of second PDCCH candidates of the first search space may be the same as the number of second PDCCH candidates of the second search space; whereas for another E-CCE aggregation number, the number of second PDCCH candidates of the first search space may be different from the number of second PDCCH candidates of the second search space. Also, for a certain E-CCE aggregation number, the number of second PDCCH candidates of the first search space may be set larger than the number of second PDCCH candidates of the second search space; whereas for another E-CCE aggregation number, the number of second PDCCH candidates of the first search space may be set smaller than the number of second PDCCH candidates of the second search space.

Also, the second PDCCH candidate of a given E-CCE aggregation number may be set for a search space of one second PDCCH region, and may be unset for a search space of another second PDCCH region.

Also, the number of second PDCCH candidates of a search space in one second PDCCH region may be set to vary depending on the number of second PDCCH regions configured for the mobile station apparatus 5. For example, as the number of second PDCCH regions configured for the mobile station apparatus 5 increases, the number of second PDCCH candidates of a search space in one second PDCCH region is decreased.

<Overall Configuration of Base Station Apparatus 3>

Figure 1:
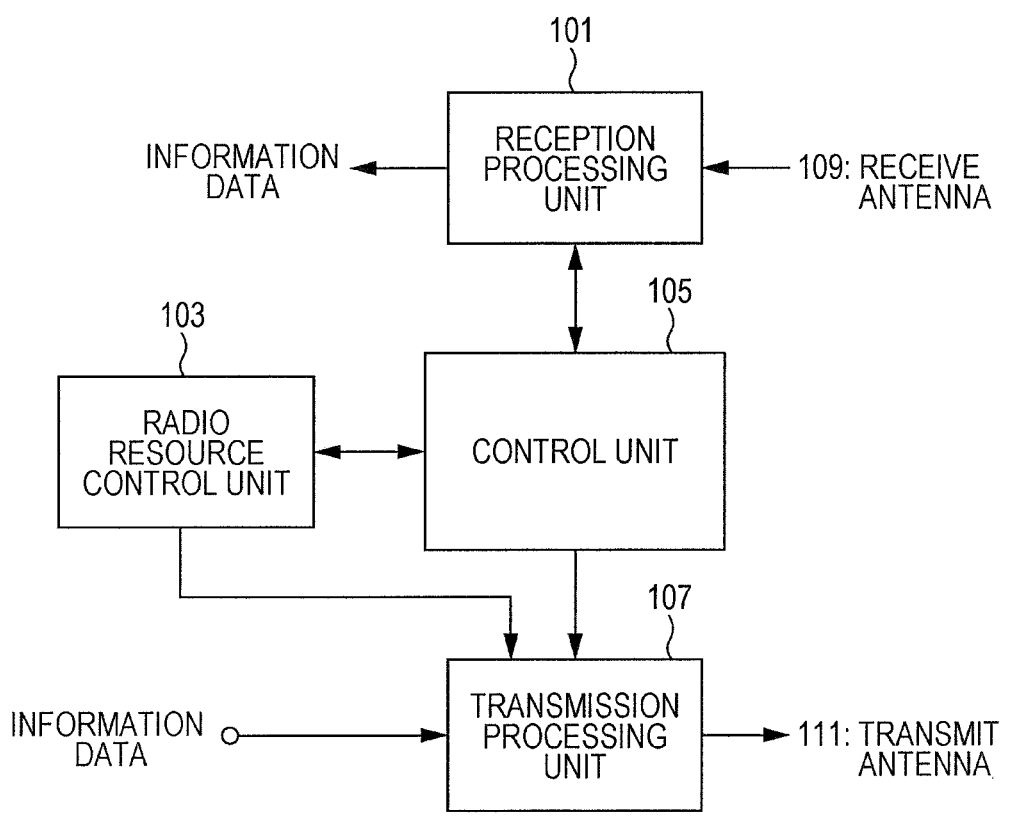
FIG. 1 is a schematic block diagram illustrating the configuration of a base station apparatus 3 according to an embodiment of the present invention.
Figure 2:
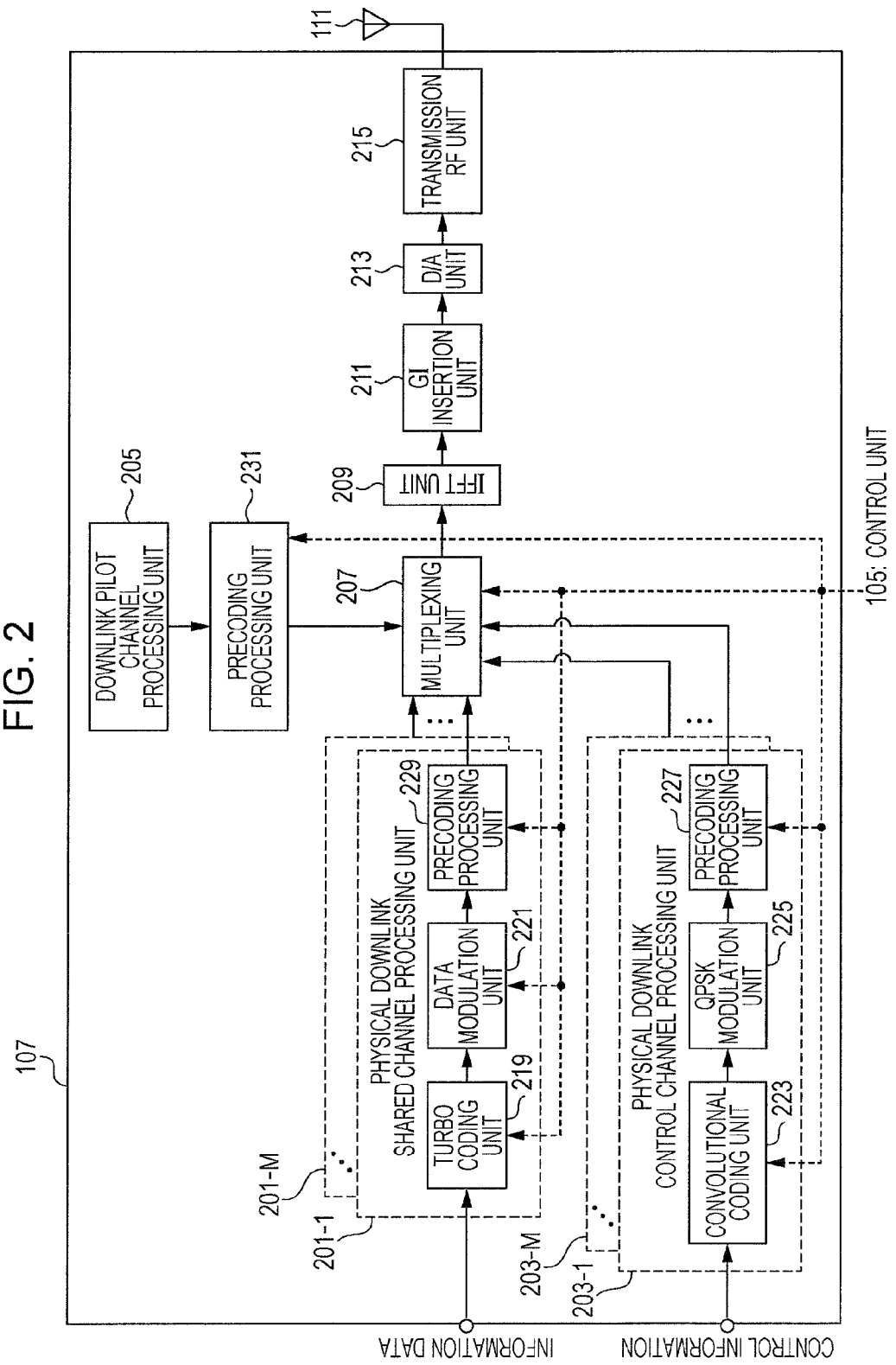
FIG. 2 is a schematic block diagram illustrating the configuration of a transmission processing unit 107 of the base station apparatus 3 according to the embodiment of the present invention.
Figure 3:
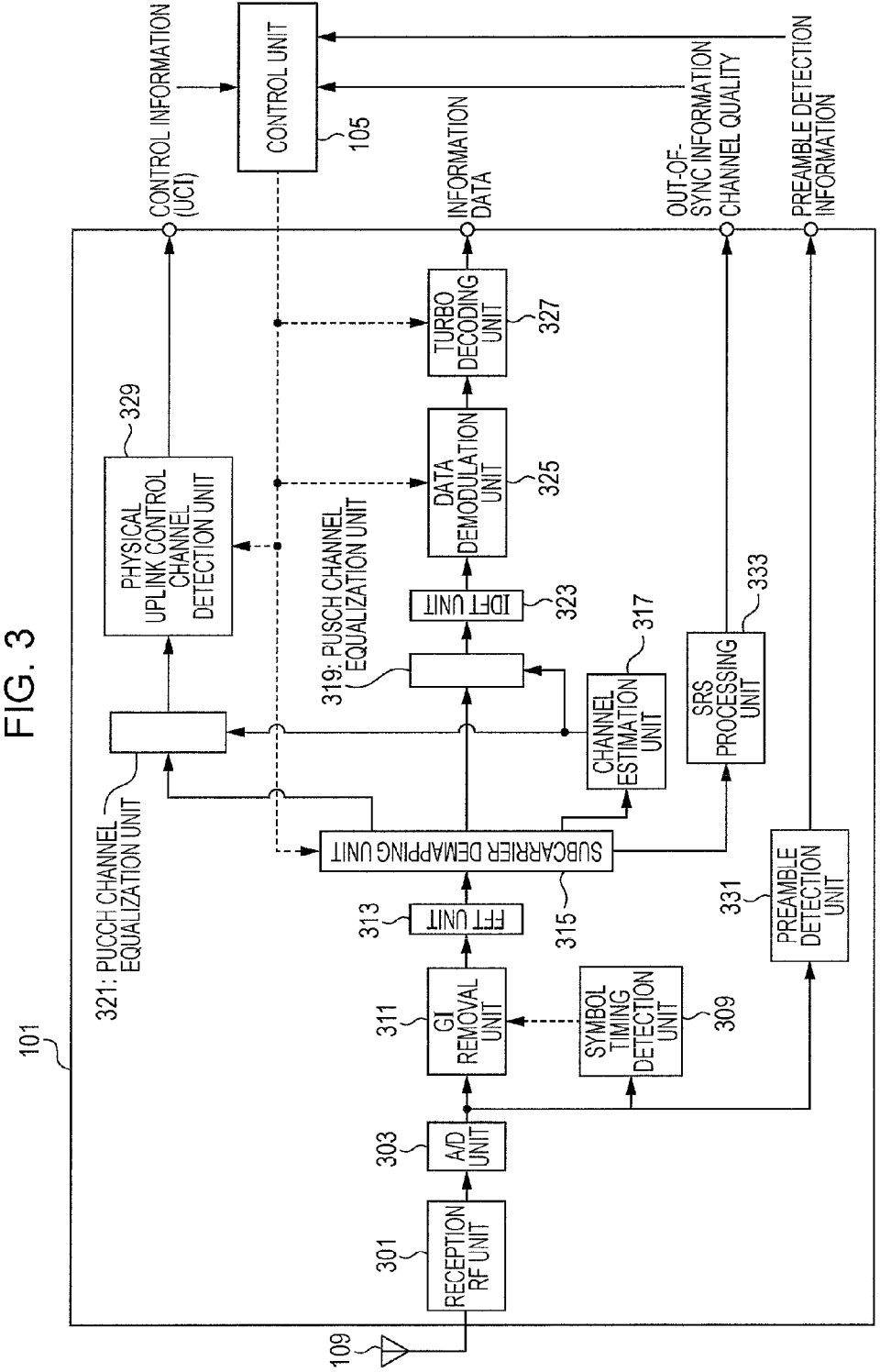
FIG. 3 is a schematic block diagram illustrating the configuration of a reception processing unit 101 of the base station apparatus 3 according to the embodiment of the present invention.

The following describes the configuration of the base station apparatus 3 according to the embodiment by using FIGS. 1, 2, and 3. FIG. 1 is a schematic block diagram illustrating the configuration of the base station apparatus 3 according to the embodiment of the present invention. As illustrated in this figure, the base station apparatus 3 includes a reception processing unit (second reception processing unit) 101, a radio resource control unit (second radio resource control unit) 103, a control unit (second control unit) 105, and a transmission processing unit (second transmission processing unit) 107.

In accordance with an instruction given by the control unit 105, the reception processing unit 101 demodulates received signals of the PUCCH and the PUSCH received from the mobile station apparatus 5 with a receive antenna 109, by using UL RSs; and decodes the resulting signals so as to extract control information and information data. The reception processing unit 101 performs processing for extracting UCI on UL PRBs of an uplink subframe in which the base station apparatus 3 has allocated PUCCH resources for the mobile station apparatus 5. The reception processing unit 101 is given by the control unit 105 an instruction as to which processing is to be performed on which UL PRB of which uplink subframe. For example, the reception processing unit 101 is given by the control unit 105 an instruction to perform detection processing in which a signal of the PUCCH for ACK/NACK (PUCCH format 1a or PUCCH format 1b) is multiplied by and combined with a time-domain code sequence and is multiplied by and combined with a frequency-domain code sequence. Also, the reception processing unit 101 is given by the control unit 105 an instruction regarding the frequency-domain code sequence and/or the time-domain code sequence used in processing for detecting the UCI from the PUCCH. The reception processing unit 101 outputs the extracted UCI to the control unit 105, and outputs the information data to a higher layer. Details about the reception processing unit 101 will be described later.

In accordance with an instruction given by the control unit 105, the reception processing unit 101 detects (receives) a preamble sequence from a received signal of the PRACH received from the mobile station apparatus 5 with the receive antenna 109. In addition to detection of the preamble sequence, the reception processing unit 101 also estimates an arrival timing (reception timing). The reception processing unit 101 performs processing for detecting a preamble sequence in a UL PRB pair of an uplink subframe in which the base station apparatus 3 has allocated PRACH resources. The reception processing unit 101 outputs information regarding the estimated arrival timing to the control unit 105.

The reception processing unit 101 also measures a channel quality within one or more UL PRBs (UL PRB pairs) by using the SRS received from the mobile station apparatus 5.

The reception processing unit 101 also detects (calculates, measures) uplink out-of-synchronization using the SRS received from the mobile station apparatus 5. The reception processing unit 101 is given by the control unit 105 an instruction as to which processing is to be performed on which UL PRB (UL PRB pair) of which uplink subframe. The reception processing unit 101 outputs information regarding the measured channel quality and the detected uplink out-of-synchronization to the control unit 105. Details about the reception processing unit 101 will be described later.

The radio resource control unit 103 sets resource allocation of the PDCCH (the first PDCCH and the second PDCCH); resource allocation of the PUCCH; assignment of DL PRB pairs to the PDSCH; assignment of UL PRB pairs to the PUSCH; resource allocation of the PRACH; resource allocation of the SRS; a modulation scheme, a coding rate, a transmit power control value, and an amount of phase rotation (weight value) used in precoding processing for various channels; an amount of phase rotation (weight value) used in precoding processing of the UE-specific RS, etc. The radio resource control unit 103 also sets a frequency-domain code sequence and a time-domain code sequence applied to the PUCCH. In addition, the radio resource control unit 103 sets a plurality of second PDCCH regions and configures DL PRB pairs used for the individual second PDCCH regions. Also, the radio resource control unit 103 sets the physical resource mapping used for each second PDCCH region. For each second PDCCH region, the radio resource control unit 103 also sets correspondences between individual E-CCEs in a DL PRB pair and antenna ports (transmit antennas) associated with the individual E-CCEs. Specifically, the radio resource control unit 103 sets transmit antennas that transmit signals of the individual E-CCEs in the DL PRB pair. In addition, the radio resource control unit 103 sets candidates (combination of candidates) (set of candidates) of the E-CCE aggregation number. The radio resource control unit 103 sets, for the second PDCCH region, the number of transmit antennas used for transmission of the UE-specific RS mapped in each DL PRB pair. The mobile station apparatus 5 is notified via the transmission processing unit 107 of part of the information set by the radio resource control unit 103. For example, the mobile station apparatus 5 is notified of information representing DL PRB pairs of the second PDCCH region, information representing the physical resource mapping (information indicating the first physical resource mapping or the second physical resource mapping) applied to the second PDCCH region, information representing the correspondences (the first correspondence or the second correspondence) between individual E-CCEs in each DL PRB pair and antenna ports (transmit antennas) associated with the individual E-CCEs, information representing candidates of the E-CCE aggregation number, and information representing the number of transmit antennas used for transmission of the UE-specific RS set for the second PDCCH region.

The information (the first correspondence or the second correspondence) representing correspondences between individual E-CCEs in a DL PRB pair of the second PDCCH region and antenna ports (transmit antennas) associated with the individual E-CCEs can include information representing the antenna-port set which is set when the second correspondence is used.

In addition, the radio resource control unit 103 sets radio resource allocation of the PDSCH on the basis of the UCI acquired by the reception processing unit 101 using the PUCCH and input thereto via the control unit 105. For example, when ACK/NACK acquired using the PUCCH is input thereto, the radio resource control unit 103 allocates resources of the PDSCH for which NACK is indicated by ACK/NACK to the mobile station apparatus 5.

The radio resource control unit 103 outputs various control signals to the control unit 105. For example, the control signals include a control signal representing physical resource mapping of the second PDCCH region, a control signal representing transmit antennas that transmit signals of individual E-CCEs in each DL PRB pair of the second PDCCH region, a control signal representing the number of transmit antennas that transmit the UE-specific RS in the second PDCCH region, a control signal representing resource allocation of the second PDCCH, and a control signal representing an amount of phase rotation used in precoding processing.

Based on the control signals input from the radio resource control unit 103, the control unit 105 performs, on the transmission processing unit 107, control related to assignment of DL PRB pairs to the PDSCH, resource allocation of the PDCCH, setting of a modulation scheme applied to the PDSCH, setting of a coding rate applied to the PDSCH and the PDCCH (E-CCE aggregation number of the second PDCCH), setting of the UE-specific RS in the second PDCCH region, setting of transmit antennas that transmit signals of E-CCEs, and setting of precoding processing applied to the PDSCH, the PDCCH, and the UE-specific RS. Also, based on the control signals input from the radio resource control unit 103, the control unit 105 generates DCI to be transmitted using the PDCCH, and outputs the DCI to the transmission processing unit 107. The DCI to be transmitted using the PDCCH may be a downlink assignment and an uplink grant. In addition, the control unit 105 performs control so that information, such as information representing the second PDCCH region, information representing physical resource mapping of the second PDCCH region, information (the first correspondence or the second correspondence) representing correspondences between individual E-CCEs in a DL PRB pair and antenna ports (transmit antennas) associated with the individual E-CCEs, information representing candidates of the E-CCE aggregation number (the E-CCE aggregation number set for a search space), and information representing the number of transmit antennas that transmit the UE-specific RSs in the second PDCCH region, is to be transmitted to the mobile station apparatus 5 via the transmission processing unit 107 using the PDSCH.

Based on the control signals input from the radio resource control unit 103, the control unit 105 performs, on the reception processing unit 101, control related to assignment of UL PRB pairs to the PUSCH, resource allocation of the PUCCH, setting of a modulation scheme applied to the PUSCH and the PUCCH, setting of a coding rate of the PUSCH, detection processing performed on the PUCCH, setting of a code sequence used for the PUCCH, resource allocation of the PRACH, and resource allocation of the SRS. UCI transmitted by the mobile station apparatus 5 using the PUCCH is input to the control unit 105 via the reception processing unit 101, and the control unit 105 outputs the input UCI to the radio resource control unit 103.

Also, the information representing the arrival timing of the detected preamble sequence and the information representing the uplink out-of-synchronization detected from the received SRS are input to the control unit 105 by the reception processing unit 101. The control unit 105 calculates an uplink transmission timing adjustment value (TA: Timing Advance, Timing Adjustment, Timing Alignment) (TA value). The mobile station apparatus 5 is notified, via the transmission processing unit 107, of information (TA command) representing the calculated uplink transmission timing adjustment value.

Based on the control signals input from the control unit 105, the transmission processing unit 107 generates signals to be transmitted using the PDCCH and the PDSCH, and transmits the signals via a transmit antenna 111. The transmission processing unit 107 transmits, to the mobile station apparatus 5 using the PDSCH, the information input from the radio resource control unit 103 such as information representing the second PDCCH region, information representing physical resource mapping of the second PDCCH region, information (the first correspondence or the second correspondence) representing correspondences between individual E-CCEs in a DL PRB pair and antenna ports (transmit antennas) associated with the individual E-CCEs, information representing candidates of the E-CCE aggregation number, information representing the number of transmit antennas that transmit the UE-specific RS in the second PDCCH region, and information data input from a higher layer. The transmission processing unit 107 also transmits the DCI input from the control unit 105 to the mobile station apparatus 5 using the PDCCH (the first PDCCH and the second PDCCH). In addition, the transmission processing unit 107 transmits the CRS, the UE-specific RS, and the CSI-RS. For simplicity of explanation, it is assumed hereinafter that information data contains several pieces of control information. Details about the transmission processing unit 107 will be described later.

<Configuration of Transmission Processing Unit 107 of Base Station Apparatus 3>

The following describes details about the transmission processing unit 107 of the base station apparatus 3. FIG. 2 is a schematic block diagram illustrating the configuration of the transmission processing unit 107 of the base station apparatus 3 according to the embodiment of the present invention. As illustrated in this figure, the transmission processing unit 107 includes a plurality of physical downlink shared channel processing units 201-1 to 201-M (hereinafter, the physical downlink shared channel processing units 201-1 to 201-M are collectively referred to as physical downlink shared channel processing units 201), a plurality of physical downlink control channel processing units 203-1 to 203-M (hereinafter, the physical downlink control channel processing units 203-1 to 203-M are collectively referred to as physical downlink control channel processing units 203), a downlink pilot channel processing unit 205, a precoding processing unit 231, a multiplexing unit 207, an IFFT (Inverse Fast Fourier Transform) unit 209, a GI (Guard Interval) insertion unit 211, a D/A (Digital/Analog converter) unit 213, a transmission RF (Radio Frequency) unit 215, and the transmit antenna 111. Because the physical downlink shared channel processing units 201 have the same configuration and functions and the physical downlink control channel processing units 203 have the same configuration and functions, one of them will be described. Note that, for simplicity of explanation, it is assumed that the transmit antenna 111 includes a plurality of antenna ports (antenna ports 0 to 22).

As illustrated in this figure, the physical downlink shared channel processing units 201 each include a turbo coding unit 219, a data modulation unit 221, and a precoding processing unit 229. Also, as illustrated in this figure, the physical downlink control channel processing units 203 each include a convolutional coding unit 223, a QPSK modulation unit 225, and a precoding processing unit 227. The physical downlink shared channel processing units 201 each perform baseband signal processing in order to transmit information data to the mobile station apparatus 5 using the OFDM scheme. The turbo coding unit 219 performs turbo coding on the input information data at the coding rate input from the control unit 105 so as to increase tolerance of data against errors, and outputs the resulting information data to the data modulation unit 221. The data modulation unit 221 modulates the data coded by the turbo coding unit 219, by using the modulation scheme input from the control unit 105, for example, a modulation scheme such as QPSK (Quadrature Phase Shift Keying), 16QAM (16 Quadrature Amplitude Modulation), or 64QAM (64 Quadrature Amplitude Modulation), so as to generate a signal sequence of modulation symbols. The data modulation unit 221 outputs the generated signal sequence to the precoding processing unit 229. The precoding processing unit 229 performs precoding processing (beamforming processing) on the signal input from the data modulation unit 221, and outputs the resulting signal to the multiplexing unit 207. Here, it is preferable that precoding processing such as phase rotation be performed on the generated signal so as to enable efficient reception at the mobile station apparatus 5 (for example, so as to maximize the receive power and minimize the interference). In the case where precoding processing is not to be performed on the signal input from the data modulation unit 221, the precoding processing unit 229 outputs the signal input from the data modulation unit 221 to the multiplexing unit 207 without processing the signal.

The physical downlink control channel processing units 203 each perform baseband signal processing on the DCI input from the control unit 105 in order to transmit the DCI using the OFDM scheme. The convolutional coding unit 223 performs convolutional coding on the basis of the coding rate input from the control unit 105 so as to increase tolerance of the DCI against errors. Here, the DCI is controlled in units of bits. Note that the coding rate of the DCI transmitted on the second PDCCH relates to the set E-CCE aggregation number. The convolutional coding unit 223 also performs rate matching on the bits that have undergone the convolutional coding based on the coding rate input from the control unit 105 so as to adjust the number of output bits. The convolutional coding unit 223 outputs the coded DCI to the QPSK modulation unit 225. The QPSK modulation unit 225 uses the QPSK modulation scheme to modulate the DCI coded by the convolutional coding unit 223, and outputs a signal sequence of modulated modulation symbols to the precoding processing unit 227. The precoding processing unit 227 performs precoding processing on the signal input from the QPSK modulation unit 225, and outputs the resulting signal to the multiplexing unit 207. Note that the precoding processing unit 227 is capable of outputting the signal input from the QPSK modulation unit 225 to the multiplexing unit 207 without performing precoding processing on the signal.

The downlink pilot channel processing unit 205 generates downlink reference signals (CRS, UE-specific RS, and CSI-RS) which are signals known to the mobile station apparatus 5, and outputs the generated downlink reference signals to the precoding processing unit 231. The precoding processing unit 231 outputs, to the multiplexing unit 207, the CRS, CSI-RS, and some UE-specific RSs input from the downlink pilot channel processing unit 205 without performing precoding processing thereon. For example, the UE-specific RS on which precoding processing is not performed by the precoding processing unit 231 is a UE-specific RS mapped in a DL PRB pair used as the second PDCCH in a second PDCCH region to which the second physical resource mapping is applied. The precoding processing unit 231 performs precoding processing on some of UE-specific RSs input from the downlink pilot channel processing unit 205, and outputs the precoded UE-specific RSs to the multiplexing unit 207. For example, the UE-specific RS on which precoding processing is performed by the precoding processing unit 231 is a UE-specific RS mapped in a DL PRB pair used as the second PDCCH in a second PDCCH region to which the first physical resource mapping is applied. The precoding processing unit 231 performs, on some UE-specific RSs, processing that is similar to the processing performed on the PDSCH by the precoding processing unit 229 and/or the processing performed on the second PDCCH by the precoding processing unit 227. More specifically, the precoding processing unit 231 performs precoding processing on a signal of a certain E-CCE and performs the similar precoding processing on the UE-specific RS associated with an antenna port corresponding to the E-CCE. Accordingly, when the mobile station apparatus 5 demodulates the signal of the second PDCCH to which the precoding processing has been applied, the UE-specific RS can be used to estimate an equalized channel of downlink channel variations and phase rotation applied by the precoding processing unit 227. That is, the mobile station apparatus 5 can demodulate signals that have been subjected to precoding processing without requiring the base station apparatus 3 to notify the mobile station apparatus 5 of information (amount of phase rotation) regarding the precoding processing performed by the precoding processing unit 227.

For example, in the case where the first correspondence is used to indicate correspondences between individual E-CCEs in a DL PRB pair and antenna ports (transmit antennas) associated with the individual E-CCEs, the base station apparatus 3 can perform precoding processing independently on a signal of each E-CCE in the DL PRB pair. For example, in the case where the second correspondence is used to indicate correspondences between individual E-CCEs in a DL PRB pair and antenna ports (transmit antennas) associated with the individual E-CCEs, the base station apparatus 3 can perform precoding processing independently on signals of every two E-CCEs in the DL PRB pair. Also, in the case where the second correspondence is used to indicate correspondences between individual E-CCEs in a DL PRB pair and antenna ports (transmit antennas) associated with the individual E-CCEs, the base station apparatus 3 can perform spatial multiplexing (MU-MIMO) on signals of the second PDCCHs addressed to different mobile station apparatuses 5 in units of two E-CCEs in the DL PRB pair. Here, as for antenna ports that can be used for E-CCEs of the second PDCCH region, different antenna-port sets can be configured for the different mobile station apparatuses 5.

In the case where precoding processing is not applied to the PDSCH and the second PDCCH on which demodulation processing such as channel compensation is to be performed using the UE-specific RS, the precoding processing unit 231 outputs the UE-specific RS to the multiplexing unit 207 without performing the precoding processing thereon.

In accordance with an instruction given by the control unit 105, the multiplexing unit 207 multiplexes the signals input from the downlink pilot channel processing unit 205, the signals input from the physical downlink shared channel processing units 201, and the signals input from the physical downlink control channel processing units 203 in a downlink subframe. Control signals regarding assignment of DL PRB pairs to the PDSCH, resource allocation of the PDCCH (the first PDCCH and the second PDCCH), and physical resource mapping of the second PDCCH region that have been set by the radio resource control unit 103 are input to the control unit 105. Based on these control signals, the control unit 105 controls the processing performed by the multiplexing unit 207. For example, the multiplexing unit 207 multiplexes signals of the second PDCCH in downlink resources in accordance with the E-CCE aggregation number set by the radio resource control unit 103. The multiplexing unit 207 outputs the signal obtained by multiplexing to the IFFT unit 209.

The IFFT unit 209 performs inverse fast Fourier transform on the multiplexed signal obtained by the multiplexing unit 207 and performs modulation based on the OFDM scheme. The IFFT unit 209 outputs the resulting signal to the GI insertion unit 211. The GI insertion unit 211 inserts guard intervals to the signal obtained by the IFFT unit 209 by performing modulation based on the OFDM scheme so as to generate a baseband digital signal including OFDM symbols. It is well known that the guard interval is generated by copying the beginning or end part of an OFDM symbol to be transmitted. The GI insertion unit 211 outputs the generated baseband digital signal to the D/A unit 213. The D/A unit 213 converts the baseband digital signal input from the GI insertion unit 211 into an analog signal, and outputs the analog signal to the transmission RF unit 215. The transmission RF unit 215 generates an in-phase component and an orthogonal component of the intermediate frequency from the analog signal input from the D/A unit 213, and removes extra frequency components for the intermediate frequency band. Then, the transmission RF unit 215 converts (up-converts) the signal of the intermediate frequency into a signal of a high frequency, removes extra frequency components, amplifies the power, and transmits the resulting signal to the mobile station apparatus 5 via the transmit antenna 111.

<Configuration of Reception Processing Unit 101 of Base Station Apparatus 3>

The following describes details about the reception processing unit 101 of the base station apparatus 3. FIG. 3 is a schematic block diagram illustrating the configuration of the reception processing unit 101 of the base station apparatus 3 according to the embodiment of the present invention. As illustrated in this figure, the reception processing unit 101 includes a reception RF unit 301, an A/D (Analog/Digital converter) unit 303, a symbol timing detection unit 309, a GI removal unit 311, an FFT unit 313, a subcarrier demapping unit 315, a channel estimation unit 317, a PUSCH channel equalization unit 319, a PUCCH channel equalization unit 321, an IDFT unit 323, a data demodulation unit 325, a turbo decoding unit 327, a physical uplink control channel detection unit 329, a preamble detection unit 331, and an SRS processing unit 333.

The reception RF unit 301 appropriately amplifies a signal received by a receive antenna 109, converts (down-converts) the amplified signal into a signal of an intermediate frequency, removes extra frequency components, and performs orthogonal demodulation on the basis of the in-phase component and the orthogonal component of the received signal while controlling an amplification level so that the signal level is appropriately maintained. The reception RF unit 301 outputs the analog signal resulting from orthogonal demodulation to the A/D unit 303. The A/D unit 303 converts the analog signal obtained by the reception RF unit 301 by performing orthogonal demodulation into a digital signal, and outputs the resulting digital signal to the symbol timing detection unit 309 and the GI removal unit 311.

The symbol timing detection unit 309 detects timings of symbols on the basis of the signal input from the A/D unit 303, and outputs a control signal representing the detected timings of symbol boundaries to the GI removal unit 311. Based on the control signal supplied from the symbol timing detection unit 309, the GI removal unit 311 removes parts equivalent to the guard interval from the signal input from the A/D unit 303, and outputs the remaining signal to the FFT unit 313. The FFT unit 313 performs fast Fourier transform on the signal input from the GI removal unit 311, performs demodulation based on the DFT-Spread-OFDM scheme, and outputs the resulting signal to the subcarrier demapping unit 315. The number of points in the FFT unit 313 is equal to the number of points in an IFFT unit of the mobile station apparatus 5 described later.

Based on a control signal input from the control unit 105, the subcarrier demapping unit 315 demaps the signal demodulated by the FFT unit 313 into the DM RS, the SRS, the PUSCH signal, and the PUCCH signal. The subcarrier demapping unit 315 outputs the separated DM RS to the channel estimation unit 317, outputs the separated SRS to the SRS processing unit 333, outputs the separated PUSCH signal to the PUSCH channel equalization unit 319, and outputs the separated PUCCH signal to the PUCCH channel equalization unit 321.

The channel estimation unit 317 estimates channel variations using the DM RS separated by the subcarrier demapping unit 315 and a known signal. The channel estimation unit 317 outputs the estimated channel estimate value to the PUSCH channel equalization unit 319 and the PUCCH channel equalization unit 321. The PUSCH channel equalization unit 319 equalizes the amplitude and phase of the PUSCH signal separated by the subcarrier demapping unit 315, on the basis of the channel estimate value input from the channel estimation unit 317. Here, equalization refers to processing for removing channel variations applied to the signal during wireless communication. The PUSCH channel equalization unit 319 outputs the adjusted signal to the IDFT unit 323.

The IDFT unit 323 performs inverse discrete Fourier transform on the signal input from the PUSCH channel equalization unit 319, and outputs the resulting signal to the data demodulation unit 325. The data demodulation unit 325 demodulates the converted PUSCH signal obtained by the IDFT unit 323, and outputs the demodulated PUSCH signal to the turbo decoding unit 327. This demodulation is demodulation corresponding to the modulation scheme used by the data modulation unit of the mobile station apparatus 5. The modulation scheme is input by the control unit 105. The turbo decoding unit 327 decodes the demodulated PUSCH signal input from the data demodulation unit 325 to obtain information data. The coding rate is input by the control unit 105.

The PUCCH channel equalization unit 321 equalizes the amplitude and phase of the PUCCH signal separated by the subcarrier demapping unit 315, on the basis of the channel estimate value input from the channel estimation unit 317. The PUCCH channel equalization unit 321 outputs the equalized signal to the physical uplink control channel detection unit 329.

The physical uplink control channel detection unit 329 demodulates and decodes the signal input from the PUCCH channel equalization unit 321 so as to detect the UCI. The physical uplink control channel detection unit 329 performs processing for demultiplexing a signal that has undergone code multiplexing in the frequency domain and/or the time domain. The physical uplink control channel detection unit 329 performs processing for detecting ACK/NACK, SR, and CQI from the PUCCH signal that has undergone code multiplexing in the frequency domain and/or the time domain, by using a code sequence used at the transmission side. Specifically, as detection processing using the frequency-domain code sequence, that is, processing for demultiplexing the signal that has undergone code multiplexing in the frequency domain, the physical uplink control channel detection unit 329 multiplies the signal of each subcarrier on the PUCCH by a corresponding code of the code sequence, and combines the signals multiplied by the codes. Specifically, as detection processing using the time-domain code sequence, that is, processing for demultiplexing the signal that has undergone code multiplexing in the time domain, the physical uplink control channel detection unit 329 multiplies the signal of each SC-FDMA symbol on the PUCCH by a corresponding code of the code sequence and combines the signals multiplied by the codes. Note that the physical uplink control channel detection unit 329 sets the detection processing to be performed on the PUCCH signal, on the basis of the control signal from the control unit 105.

The SRS processing unit 333 measures a channel quality using the SRS input from the subcarrier demapping unit 315, and outputs the measurement result of the channel quality in the UL PRB (UL PRB pair) to the control unit 105. The SRS processing unit 333 is given by the control unit 105 an instruction as to in which UL PRB (UL PRB pair) of which uplink subframe it performs measurement on the signal to determine the channel quality for the mobile station apparatus 5. Also, the SRS processing unit 333 detects uplink out-of-synchronization using the SRS input from the subcarrier demapping unit 315, and outputs information (out-of-sync information) representing uplink out-of-synchronization to the control unit 105. The SRS processing unit 333 may perform processing for detecting uplink out-of-synchronization from the received signal in the time domain. As for specific processing, processing similar to processing performed by the preamble detection unit 331 described later may be performed.

The preamble detection unit 331 performs processing for detecting (receiving) a transmitted preamble on a received signal equivalent to the PRACH, on the basis of the signal input from the A/D unit 303. Specifically, the preamble detection unit 331 performs correlation processing on received signals of various timings within the guard time using replica signals generated using individual preamble sequences that are possibly transmitted. For example, if a correlation value is higher than a preset threshold, the preamble detection unit 331 determines that the same signal as the preamble sequence used to generate the replica signal used in the correlation processing has been transmitted by the mobile station apparatus 5. Then, the preamble detection unit 331 determines a timing corresponding to the highest correlation value as the arrival timing of the preamble sequence. The preamble detection unit 331 generates preamble detection information which includes at least information representing the detected preamble sequence and information repressing the arrival timing, and outputs the preamble detection information to the control unit 105.

Based on the control information (DCI) which has been transmitted using the PDCCH and control information (RRC signaling) which has been transmitted using the PDSCH by the base station apparatus 3 to the mobile station apparatus 5, the control unit 105 controls the subcarrier demapping unit 315, the data demodulation unit 325, the turbo decoding unit 327, the channel estimation unit 317, and the physical uplink control channel detection unit 329. Also, based on the control information that has been transmitted by the base station apparatus 3 to the mobile station apparatus 5, the control unit 105 grasps by which resources (uplink subframes, UL PRBs (UL PRB pairs), frequency-domain code sequence, and time-domain code sequence) the PRACH, PUSCH, PUCCH, and SRS transmitted (possibly transmitted) by each mobile station apparatus 5 are configured.

<Overall Configuration of Mobile Station Apparatus 5>

Figure 4:
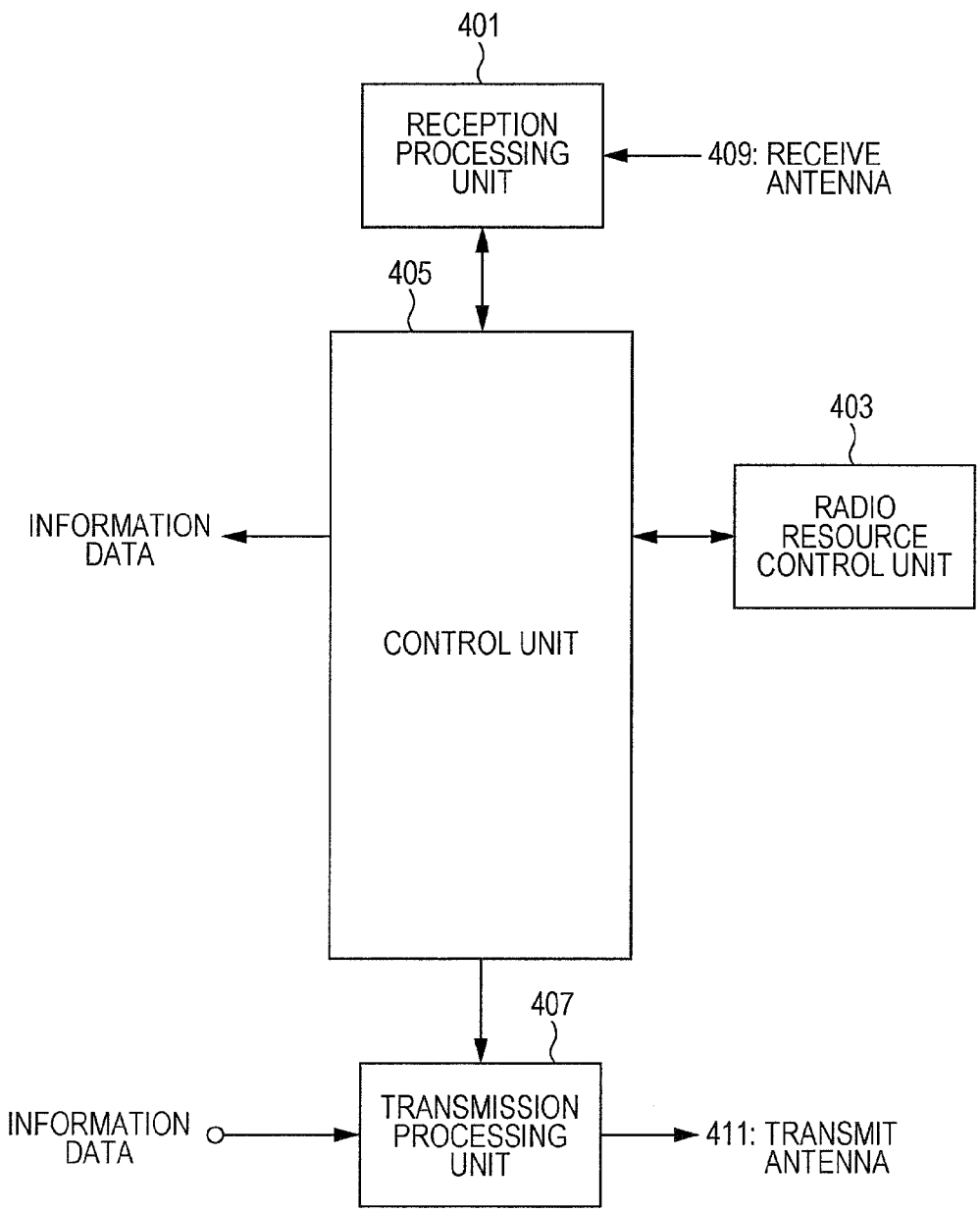
FIG. 4 is a schematic block diagram illustrating the configuration of a mobile station apparatus 5 according to the embodiment of the present invention.
Figure 5:
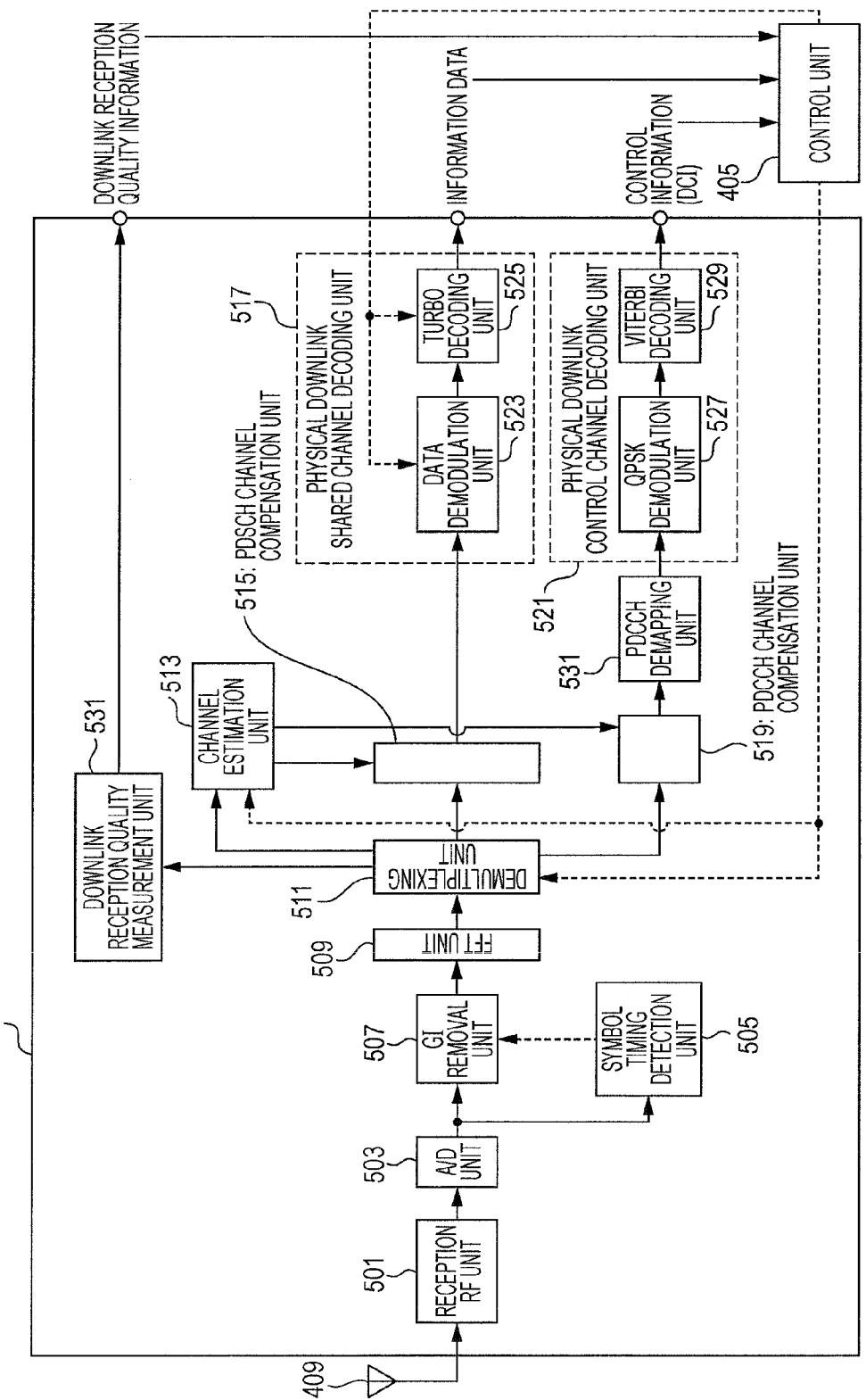
FIG. 5 is a schematic block diagram illustrating the configuration of a reception processing unit 401 of the mobile station apparatus 5 according to the embodiment of the present invention.
Figure 6:
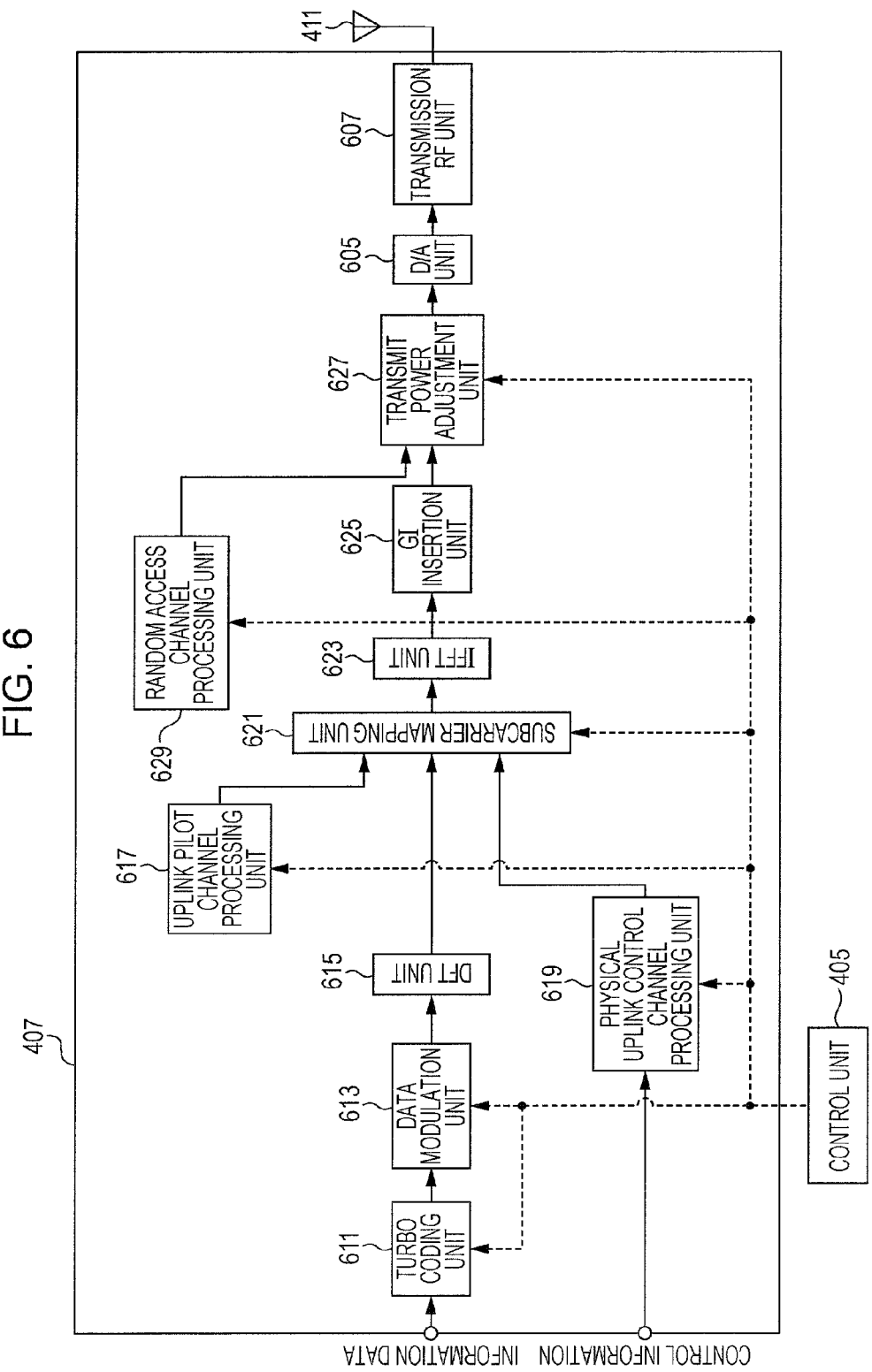
FIG. 6 is a schematic block diagram illustrating the configuration of a transmission processing unit 407 of the mobile station apparatus 5 according to the embodiment of the present invention.

The following describes the configuration of the mobile station apparatus 5 according to the embodiment by using FIGS. 4, 5, and 6. FIG. 4 is a schematic block diagram illustrating the configuration of the mobile station apparatus 5 according to the embodiment of the present invention. As illustrated in this figure, the mobile station apparatus 5 includes a reception processing unit (first reception processing unit) 401, a radio resource control unit (first radio resource control unit) 403, a control unit (first control unit) 405, and a transmission processing unit (first transmission processing unit) 407.

The reception processing unit 401 receives a signal from the base station apparatus 3, and demodulates and decodes the received signal in accordance with an instruction given by the control unit 405. In the case where the reception processing unit 401 has detected a signal of the PDCCH (the first PDCCH and the second PDCCH) addressed to the mobile station apparatus 5, the reception processing unit 401 outputs DCI obtained by decoding the PDCCH signal to the control unit 405. For example, the reception processing unit 401 performs processing for detecting the second PDCCH addressed to the mobile station apparatus 5 in a search space of the second PDCCH region specified by the base station apparatus 3. For example, the reception processing unit 401 performs processing for detecting the second PDCCH addressed to the mobile station apparatus 5 by setting search spaces for candidates of the E-CCE aggregation number set by the base station apparatus 3. For example, the reception processing unit 401 performs processing for estimating the channel by using the UE-specific RS included in the second PDCCH region specified by the base station apparatus 3, demodulating the signal of the second PDCCH, and detecting a signal containing control information addressed to the mobile station apparatus 5. For example, the reception processing unit 401 performs processing for recognizing, in accordance with correspondences between individual E-CCEs in a DL PRB pair of the second PDCCH region and antenna ports (transmit antennas) associated with the individual E-CCEs notified by the base station apparatus 3, the transmit antenna (antenna port) corresponding to the UE-specific RS used for demodulation of a signal of each E-CCE in the DL PRB pair of the second PDCCH region and detecting a signal containing control information addressed to the mobile station apparatus 5. For example, the reception processing unit 401 performs processing for recognizing, in accordance with the number of UE-specific RSs included in the second PDCCH region notified by the base station apparatus 3, downlink resource elements to which signals of the second PDCCH are to be possibly mapped in an E-CCE, and detecting a signal containing control information addressed to the mobile station apparatus 5.

Also, based on an instruction given by the control unit 405 after the reception processing unit 401 has output the DCI contained in the PDCCH to the control unit 405, the reception processing unit 401 outputs information data obtained by decoding the PDSCH addressed to the mobile station apparatus 5 to a higher layer via the control unit 405. Downlink assignment of the DCI contained in the PDCCH includes information representing resource allocation of the PDSCH. In addition, the reception processing unit 401 outputs control information that has been generated by the radio resource control unit 103 of the base station apparatus 3 and that is obtained by decoding the PDSCH to the control unit 405, and to the radio resource control unit 403 of the mobile station apparatus 5 via the control unit 405. For example, the control information that has been generated by the radio resource control unit 103 of the base station apparatus 3 includes information representing a DL PRB pair of the second PDCCH region, information representing physical resource mapping (information representing the first physical resource mapping or the second physical resource mapping) applied to the second PDCCH region, information (the first correspondence or the second correspondence) representing correspondences between individual E-CCEs in the DL PRB pair of the second PDCCH, region and antenna ports (transmit antennas) associated with the individual E-CCEs, information representing candidates of the E-CCE aggregation number of the second PDCCH region, and information representing the number of transmit antennas used for the UE-specific RSs that are to be possibly mapped in the second PDCCH region.

The information (the first correspondence or the second correspondence) representing correspondences between individual E-CCEs in the DL PRB pair of the second PDCCH region and antenna ports (transmit antennas) associated with the individual E-CCEs can include information representing an antenna-port set configured when the second correspondence is used.

The reception processing unit 401 also outputs a cyclic redundancy check (CRC) code contained in the PDSCH to the control unit 405. The transmission processing unit 107 of the base station apparatus 3 generates a CRC code from information data, and transmits the information data and the CRC code on the PDSCH although this is not described in the description of the base station apparatus 3. A CRC code is used to determine whether data contained in the PDSCH is incorrect or correct. For example, if information generated from the data by using a predetermined generation polynomial by the mobile station apparatus 5 is the same as the CRC code which has been generated by the base station apparatus 3 and transmitted on the PDSCH, it is determined that data is correct. If information generated from the data by using a predetermined generation polynomial by the mobile station apparatus 5 is different from the CRC code which has been generated by the base station apparatus 3 and transmitted on the PDSCH, it is determined that the data is incorrect.

The reception processing unit 401 also measures a downlink reception quality (RSRP: Reference Signal Received Power), and outputs the measurement result to the control unit 405. The reception processing unit 401 measures (calculates) the RSRP from the CRS or CSI-RS in accordance with an instruction given by the control unit 405. Details about the reception processing unit 401 will be described in detail.

The control unit 405 checks the data that has been transmitted by the base station apparatus 3 using the PDSCH and input thereto by the reception processing unit 401, outputs information data contained in the data to a higher layer, and controls the reception processing unit 401 and the transmission processing unit 407 on the basis of control information that has been generated by the radio resource control unit 103 of the base station apparatus 3 and is contained in the data. Also, the control unit 405 controls the reception processing unit 401 and the transmission processing unit 407 in accordance with an instruction given by the radio resource control unit 403. For example, the control unit 405 controls the reception processing unit 401 so that the reception processing unit 401 performs processing for detecting the second PDCCH on signals contained in the DL PRB pair of the second PDCCH region specified by the radio resource control unit 403. For example, the control unit 405 controls the reception processing unit 401 so that the reception processing unit 401 performs demapping of physical resources of the second PDCCH region on the basis of the information representing physical resource mapping of the second PDCCH region specified by the radio resource control unit 403. Here, demapping of physical resources of the second PDCCH region refers to processing for configuring (forming, constructing, creating) the second PDCCH candidates for which detection processing is performed on signals in the second PDCCH region as illustrated in FIGS. 21 and 22. The control unit 405 also controls the region on which the reception processing unit 401 performs processing for detecting the second PDCCH in the second PDCCH region. Specifically, the control unit 405 gives, to the reception processing unit 401, for each E-CCE aggregation number, an instruction (setting) regarding the E-CCE aggregation number for setting a search space in each second PDCCH region, the first E-CCE number from which the processing for detecting the second PDCCH is to be performed in the second PDCCH region, and the number of second PDCCH candidates. The control unit 405 also controls the reception processing unit 401 in accordance with correspondences between individual E-CCEs in the DL PRB pair and transmit antennas (antenna ports) used for corresponding UE-specific RSs so that the reception processing unit 401 uses the UE-specific RS on the corresponding transmit antenna (antenna port) to decode a signal of the E-CCE.

The control unit 405 also controls the reception processing unit 401 and the transmission processing unit 407 on the basis of the DCI which has been transmitted by the base station apparatus 3 using the PDCCH and is input thereto by the reception processing unit 401. Specifically, the control unit 405 controls the reception processing unit 401 on the basis mainly of the detected downlink assignment, and controls the transmission processing unit 407 on the basis mainly of the detected uplink grant. The control unit 405 also controls the transmission processing unit 407 on the basis of control information representing a PUCCH transmit power control command contained in the downlink assignment. The control unit 405 compares information generated from the data input thereto by the reception processing unit 401 by using a predetermined generation polynomial, with the CRC code input thereto by the reception processing unit 401 so as to determine whether or not the data is incorrect, and generates the ACK/NACK. The control unit 405 also generates the SR and CQI in accordance with an instruction given by the radio resource control unit 403. The control unit 405 also controls a timing at which the transmission processing unit 407 transmits a signal, on the basis of the uplink transmission timing adjustment value or the like notified by the base station apparatus 3. The control unit 405 also controls the transmission processing unit 407 so that the transmission processing unit 407 transmits information representing the downlink reception quality (RSRP) input thereto by the reception processing unit 401. The base station apparatus 3 may set candidates of the E-CCE aggregation number for the mobile station apparatus 5 on the basis of the downlink reception quality (RSRP) or the like which the base station apparatus 3 is notified of by the mobile station apparatus 5 although this is not described in the description of the base station apparatus 3. For example, the base station apparatus 3 may set, as candidates of the E-CCE aggregation number of a localized E-PDCCH, E-CCE aggregation 1, E-CCE aggregation 2, and E-CCE aggregation 4 for the mobile station apparatus 5 having a good downlink reception quality (mobile station apparatus located near the center of the cell). For example, the base station apparatus 3 may set, as candidates of the E-CCE aggregation number of a localized E-PDCCH, E-CCE aggregation 2 and E-CCE aggregation 4 for the mobile station apparatus 5 having a poor downlink reception quality (mobile station apparatus located near the cell edge).

The radio resource control unit 403 stores and holds control information which has been generated by the radio resource control unit 103 of the base station apparatus 3 and notified by the base station apparatus 3. The radio resource control unit 403 also controls the reception processing unit 401 and the transmission processing unit 407 via the control unit 405. That is, the radio resource control unit 403 includes a function of a memory that holds various parameters and so forth. For example, the radio resource control unit 403 holds information regarding a DL PRB pair of a second PDCCH region, information regarding physical resource mapping of the second PDCCH region, information regarding candidates of the E-CCE aggregation number of the second PDCCH region (the second PDCCH region to which the first physical resource mapping is applied), information regarding the number of transmit antennas (antenna ports) used for UE-specific RSs possibly mapped in the second PDCCH region, and information regarding correspondences between individual E-CCEs in the DL PRB pair of the second PDCCH region and transmit antennas (antenna ports) of corresponding UE-specific RSs; and outputs various pieces of control information to the control unit 405. Note that the information regarding correspondences between individual E-CCEs in the DL PRB pair of the second PDCCH region and transmit antennas (antenna ports) of corresponding UE-specific RSs contains information representing an antenna-port set. The radio resource control unit 403 sets, via the control unit 405, the antenna-port set set by the base station apparatus 3 in the reception processing unit 401. The radio resource control unit 403 holds parameters related to transmit powers of the PDSCH, PUCCH, SRS, and PRACH; and outputs control signals to the control unit 405 so that the parameters notified by the base station apparatus 3 are used.

The radio resource control unit 403 sets values of the parameters related to transmit powers of the PUCCH, the PUSCH, the SRS, the PRACH, etc. The transmit power values set by the radio resource control unit 403 are output to the transmission processing unit 407 via the control unit 405. Note that the same transmit power control as that for the PUCCH is performed on the DM RS configured by resources of a UL PRB including the PUCCH. Also, the same transmit power control as that for the PUSCH is performed on the DM RS configured by resources of a UL PRB including the PUSCH. The radio resource control unit 403 sets, for the PUSCH, values of a parameter based on the number of UL PRB pairs allocated to the PUSCH, of cell-specific and UE-specific parameters notified in advance by the base station apparatus 3, of a parameter based on the modulation scheme used for the PUSCH, of a parameter based on the estimated path loss value, of a parameter based on the transmit power control command notified by the base station apparatus 3, etc. The radio resource control unit 403 sets, for the PUCCH, values of a parameter based on the signal configuration of the PUCCH, of cell-specific and UE-specific parameters notified in advance by the base station apparatus 3, of a parameter based on the estimated path loss value, of a parameter based on the notified transmit power control command, etc.

Note that the mobile station apparatus 5 is notified of the cell-specific and UE-specific parameters serving as the parameters related to transmit power by the base station apparatus 3 using the PDSCH, and is notified of the transmit power control command by the base station apparatus 3 using the PDCCH. The transmit power control command for the PUSCH is contained in the uplink grant, and the transmit power control command for the PUCCH is contained in the downlink assignment. Various parameters related to transmit power which the mobile station apparatus 5 is notified of by the base station apparatus 3 are appropriately stored in the radio resource control unit 403, and the stored values are input to the control unit 405.

In accordance with an instruction given by the control unit 405, the transmission processing unit 407 transmits a signal obtained by coding and modulating the information data and the UCI to the base station apparatus 3 via a transmit antenna 411 using resources of the PUSCH and the PUCCH. In accordance with an instruction given by the control unit 405, the transmission processing unit 407 also sets transmit powers of the PUSCH, the PUCCH, the SRS, the DM RS, and the PRACH. Details about the transmission processing unit 407 will be described later.

<Reception Processing Unit 401 of Mobile Station Apparatus 5>

The following describes details about the reception processing unit 401 of the mobile station apparatus 5. FIG. 5 is a schematic block diagram illustrating the configuration of the reception processing unit 401 of the mobile station apparatus 5 according to the embodiment of the present invention. As illustrated in this figure, the reception processing unit 401 includes a reception RF unit 501, an A/D unit 503, a symbol timing detection unit 505, a GI removal unit 507, an FFT unit 509, a demultiplexing unit 511, a channel estimation unit 513, a PDSCH channel compensation unit 515, a physical downlink shared channel decoding unit 517, a PDCCH channel compensation unit 519, a physical downlink control channel decoding unit 521, a downlink reception quality measurement unit 531, and a PDCCH demapping unit 533. Also, as illustrated in this figure, the physical downlink shared channel decoding unit 517 includes a data demodulation unit 523 and a turbo decoding unit 525. Further, as illustrated in this figure, the physical downlink control channel decoding unit 521 includes a QPSK demodulation unit 527 and a Viterbi decoding unit 529.

The reception RF unit 501 appropriately amplifies a signal received by a receive antenna 409, converts (down-converts) the amplified signal into a signal of an intermediate frequency, removes extra frequency components, and performs orthogonal demodulation on the basis of the in-phase component and the orthogonal component of the received signal while controlling an amplification level so that the signal level is appropriately maintained. The reception RF unit 501 outputs the analog signal resulting from orthogonal demodulation to the A/D unit 503.

The A/D unit 503 converts the analog signal obtained by the reception RF unit 501 by performing orthogonal demodulation into a digital signal, and outputs the resulting digital signal to the symbol timing detection unit 505 and the GI removal unit 507. The symbol timing detection unit 505 detects timings of symbols on the basis of the digital signal obtained by the A/D unit 503, and outputs a control signal representing the detected timings of symbol boundaries to the GI removal unit 507. Based on the control signal supplied from the symbol timing detection unit 505, the GI removal unit 507 removes parts equivalent to the guard interval from the digital signal output by the A/D unit 503, and outputs the remaining signal to the FFT unit 509. The FFT unit 509 performs fast Fourier transform on the signal input from the GI removal unit 507, performs demodulation based on the OFDM scheme, and outputs the resulting signal to the demultiplexing unit 511.

Based on the control signal input from the control unit 405, the demultiplexing unit 511 demultiplexes the demodulated signal obtained by the FFT unit 509 into a signal of the PDCCH (the first PDCCH and the second PDCCH) and a signal of the PDSCH. The demultiplexing unit 511 outputs the separated PDSCH signal to the PDSCH channel compensation unit 515 and outputs the separated PDCCH signal to the PDCCH channel compensation unit 519. For example, the demultiplexing unit 511 outputs a signal of the second PDCCH mapped in the second PDCCH region specified for the mobile station apparatus 5 to the PDCCH channel compensation unit 519. The demultiplexing unit 511 also demultiplexes downlink resource elements to which the downlink reference signals are mapped, and outputs the downlink reference signals (the CRS and the UE-specific RS) to the channel estimation unit 513. For example, the demultiplexing unit 511 outputs the UE-specific RS mapped in the second PDCCH region specified for the mobile station apparatus 5 to the channel estimation unit 513. The demultiplexing unit 511 also outputs the downlink reference signals (the CRS and the CSI-RS) to the downlink reception quality measurement unit 531.

The channel estimation unit 513 estimates channel variations using the downlink reference signals separated by the demultiplexing unit 511 and a known signal. The channel estimation unit 513 outputs channel compensation values used for adjustment of the amplitude and phase to the PDSCH channel compensation unit 515 and the PDCCH channel compensation unit 519 so as to compensate for the channel variations. The channel estimation unit 513 estimates channel variations separately using the CRS and using the UE-specific RS, and outputs the resulting channel compensation values. For example, the channel estimation unit 513 generates a channel compensation value from a channel estimate value estimated using the UE-specific RS mapped in a plurality of PRB pairs of the second PDCCH region specified for the mobile station apparatus 5, and outputs the channel compensation value to the PDCCH channel compensation unit 519. Note that the channel estimation unit 513 estimates the channel and generates the channel compensation value using the UE-specific RS associated with a corresponding transmit antenna (antenna port) specified by the control unit 405. For example, the channel estimation unit 513 generates a channel compensation value from a channel estimate value estimated using the UE-specific RS mapped in a plurality of DL PRB pairs allocated to the PDSCH and assigned to the mobile station apparatus 5, and outputs the channel compensation value to the PDSCH channel compensation unit 515. For example, the channel estimation unit 513 generates a channel compensation value from a channel estimate value estimated using the CRS, and outputs the channel compensation value to the PDCCH channel compensation unit 519. For example, the channel estimation unit 513 generates a channel compensation value from a channel estimate value estimated using the CRS, and outputs the channel compensation value to the PDSCH channel compensation unit 515.

The PDSCH channel compensation unit 515 adjusts the amplitude and phase of the PDSCH signal separated by the demultiplexing unit 511, in accordance with the channel compensation value input thereto by the channel estimation unit 513. For example, the PDSCH channel compensation unit 515 adjusts the PDSCH signal in accordance with the channel compensation value generated by the channel estimation unit 513 on the basis of the UE-specific RS, and adjusts another PDSCH signal in accordance with the channel compensation value generated by the channel estimation unit 513 on the basis of the CRS. The PDSCH channel compensation unit 515 outputs the signal that has been adjusted based on the channel to the data demodulation unit 523 of the physical downlink shared channel decoding unit 517.

In accordance with an instruction given by the control unit 405, the physical downlink shared channel decoding unit 517 demodulates and decodes the PDSCH so as to detect information data. The data demodulation unit 523 demodulates the PDSCH signal input from the channel compensation unit 515, and outputs the demodulated PDSCH signal to the turbo decoding unit 525. The demodulation performed here is demodulation corresponding to the modulation scheme used by the data modulation unit 221 of the base station apparatus 3. The turbo decoding unit 525 decodes the demodulated PDSCH signal input from the data demodulation unit 523 so as to obtain information data, and outputs the information data to a higher layer via the control unit 405. Note that information such as control information that has been generated by the radio resource control unit 103 of the base station apparatus 3 and has been transmitted using the PDSCH is also output to the control unit 405, and then to the radio resource control unit 403 via the control unit 405. Note that the CRC code contained in the PDSCH is also output to the control unit 405.

The PDCCH channel compensation unit 519 adjusts the amplitude and phase of the PDCCH signal separated by the demultiplexing unit 511, in accordance with the channel compensation value input thereto by the channel estimation unit 513. For example, the PDCCH channel compensation unit 519 adjusts a signal of the second PDCCH in accordance with the channel compensation value generated by the channel estimation unit 513 on the basis of the UE-specific RS, and adjusts a signal of the first PDCCH in accordance with the channel compensation value generated by the channel estimation unit 513 on the basis of the CRS. For example, the PDCCH channel compensation unit 519 adjusts a signal of each E-CCE in a DL PRB pair of the second PDCCH region in accordance with the channel compensation value generated on the basis of the UE-specific RS on a transmit antenna (antenna port) corresponding to the E-CCE and specified by the control unit 405. The PDCCH channel compensation unit 519 outputs the adjusted signal to the PDCCH demapping unit 533.

The PDCCH demapping unit 533 performs demapping of the first PDCCH or demapping of the second PDCCH on the signal input thereto by the PDCCH channel compensation unit 519. Also, the PDCCH demapping unit 533 performs demapping based on the first physical resource mapping or demapping based on the second physical resource mapping on the signal of the second PDCCH input thereto by the PDCCH channel compensation unit 519. The PDCCH demapping unit 533 converts an input signal of the first PDCCH into signals of CCE units as described using FIG. 16 so as to allow the physical downlink control channel decoding unit 521 to perform processing on the input signal of the first PDCCH in units of CCEs illustrated in FIG. 15.

The PDCCH demapping unit 533 converts an input signal of the second PDCCH into signals of E-CCE units so as to allow the physical downlink control channel decoding unit 521 to perform processing on the input signal of the second PDCCH in units of E-CCEs illustrated in FIG. 18. The PDCCH demapping unit 533 converts an input signal of the second PDCCH of the second PDCCH region to which the first physical resource mapping is applied into signals of E-CCE units as described using FIG. 21. The PDCCH demapping unit 533 converts an input signal of the second PDCCH of the second PDCCH region to which the second physical resource mapping is applied into signals of E-CCE units as described using FIG. 22. The PDCCH demapping unit 533 outputs the resulting signals to the QPSK demodulation unit 527 of the physical downlink control channel decoding unit 521.

The physical downlink control channel decoding unit 521 demodulates and decodes the signal input from the PDCCH channel compensation unit 519 so as to detect control data in the following manner. The QPSK demodulation unit 527 performs QPSK demodulation on the PDCCH signal, and outputs the resulting signal to the Viterbi decoding unit 529. The Viterbi decoding unit 529 decodes the demodulated signal obtained by the QPSK demodulation unit 527, and outputs the decoded DCI to the control unit 405. This signal is represented in units of bits. The Viterbi decoding unit 529 also performs rate dematching on the input bits in order to adjust the number of bits subjected to Viterbi decoding processing.

First PDCCH detection processing will be described first. The mobile station apparatus 5 performs processing for detecting the DCI addressed to the mobile station apparatus 5 by assuming a plurality of CCE aggregation numbers. The mobile station apparatus 5 performs different decoding processing on the signal of the first PDCCH for different CCE aggregation numbers (coding rates) assumed, and obtains the DCI contained in the first PDCCH for which no error has been detected using the CRC code attached to the first PDCCH along with the DCI. Such processing is referred to as blind decoding. Note that the mobile station apparatus 5 need not perform blind decoding on signals (received signals) mapped to all CCEs (REGs) in the downlink system band by assuming the first PDCCH, and may perform blind decoding only on some of the CCEs. Some of the CCEs subjected to blind decoding are referred to as a search space (first PDCCH search space). Different search spaces (first PDCCH search spaces) are defined for different CCE aggregation numbers. In the communication system 1 according to the embodiment of the present invention, different search spaces (first PDCCH search spaces) for the first PDCCH are set for the mobile station apparatus 5. Here, the search space for the first PDCCH (first PDCCH search space) of each mobile station apparatus 5 may be constituted by totally different CCEs or the same CCEs, or may be constituted by partially overlapping CCEs.

Next, second PDCCH detection processing will be described. The mobile station apparatus 5 performs processing for detecting the DCI addressed to the mobile station apparatus 5 by assuming a plurality of E-CCE aggregation numbers. Candidates of the E-CCE aggregation number possibly used for the second PDCCH region to which the first physical resource mapping is applied can be set by the base station apparatus 3 for the mobile station apparatus 5. The mobile station apparatus 5 performs different decoding processing on the signal of the second PDCCH for different E-CCE aggregation numbers (coding rates) assumed, and obtains the DCI contained in the second PDCCH for which no error has been detected using the CRC code attached to the second PDCCH along with the DCI. Such processing is referred to as blind decoding. Note that the mobile station apparatus 5 need not perform, by assuming the second PDCCH, blind decoding on signals (received signals) mapped to all E-CCEs in the second PDCCH region configured by the base station apparatus 3, and may perform blind decoding only on some of the E-CCEs. Some of the E-CCEs subjected to blind decoding are referred to as a search space (second PDCCH search space). Different search spaces (second PDCCH search spaces) are defined for different E-CCE aggregation numbers. For the mobile station apparatus 5 for which a plurality of second PDCCH regions are configured, the search spaces are set (configured, defined) in the individual configured second PDCCH regions. The search spaces are set for the mobile station apparatus 5 separately in the second PDCCH region to which the first physical resource mapping is applied and in the second PDCCH region to which the second physical resource mapping is applied. For the mobile station apparatus 5 for which a plurality of second PDCCH regions are configured, a plurality of search spaces are set simultaneously in a certain downlink subframe.

In the communication system 1 according to the embodiment of the present invention, different search spaces (second PDCCH search spaces) are set for the second PDCCH in the mobile station apparatus 5. Here, the search spaces for the second PDCCH (second PDCCH search spaces) of the mobile station apparatuses 5 for which the same second PDCCH region is configured may be constituted by totally different E-CCEs, may be constituted by totally the same E-CCEs, or may be constituted by partially overlapping E-CCEs.

For the mobile station apparatus 5 for which a plurality of second PDCCH regions are configured, the search space (second PDCCH search space) is set in each of the second PDCCH regions. A search space (second PDCCH search space) refers to a logical space in which the mobile station apparatus 5 performs decoding in the second PDCCH region so as to detect the second PDCCH. A search space (second PDCCH search space) is constituted by a plurality of second PDCCH candidates. A second PDCCH candidate is a target on which the mobile station apparatus 5 performs decoding so as to detect the second PDCCH. For each E-CCE aggregation number, different sets of second PDCCH candidates are constituted by different E-CCEs (including one E-CCE and a plurality of E-CCEs). E-CCEs constituting a plurality of second PDCCH candidates of a search space (second PDCCH search space) of a second PDCCH region to which the first physical resource mapping is applied are a plurality of E-CCEs assigned consecutive E-CCE numbers. The first E-CCE number used in the search space (second PDCCH search space) in the second PDCCH region is set for each mobile station apparatus 5. E-CCEs constituting a plurality of second PDCCH candidates of a search space (second PDCCH search space) of a second PDCCH region to which the second physical resource mapping is applied are a plurality of E-CCEs assigned non-consecutive E-CCE numbers. For each second PDCCH region, the first E-CCE number used in the search space (second PDCCH search space) in the second PDCCH region is set for each mobile station apparatus 5. For example, the first E-CCE number used in the search space (second PDCCH search space) is set by a random function which uses an identifier (mobile station identifier) assigned to the mobile station apparatus 5. For example, the base station apparatus 3 notifies the mobile station apparatus 5 of the first E-CCE number used in the search space through RRC signaling.

The number of second PDCCH candidates may differ between search spaces (second PDCCH search spaces) in a plurality of second PDCCH regions. For example, the number of second PDCCH candidates constituting a search space (second PDCCH search space) in a second PDCCH region to which the first physical resource mapping is applied may be set larger than the number of second PDCCH candidates constituting a search space (second PDCCH search space) in a second PDCCH region to which the second physical resource mapping is applied.

Also, for a certain E-CCE aggregation number, the number of second PDCCH candidates constituting a search space (second PDCCH search space) in a second PDCCH region to which the first physical resource mapping is applied may be the same as the number of second PDCCH candidates constituting a search space (second PDCCH search space) in a second PDCCH region to which the second physical resource mapping is applied. For another E-CCE aggregation number, the number of second PDCCH candidates constituting a search space (second PDCCH search space) in a second PDCCH region to which the first physical resource mapping is applied may be different from the number of second PDCCH candidates constituting a search space (second PDCCH search space) in a second PDCCH region to which the second physical resource mapping is applied.

Also, the second PDCCH candidates for a given E-CCE aggregation number can be set for a search space (second PDCCH search space) in one second PDCCH region, and may not be set for a search space (second PDCCH search space) in another second PDCCH region.

Also, the number of second PDCCH candidates constituting a search space (second PDCCH search space) in one second PDCCH region may vary depending on the number of second PDCCH regions configured for the mobile station apparatus 5. For example, as the number of second PDCCH regions configured for the mobile station apparatus 5 increases, the number of second PDCCH candidates constituting a search space (second PDCCH search space) in one second PDCCH region is decreased.

The mobile station apparatus 5 sets search spaces corresponding to candidates of the E-CCE aggregation number notified by the base station apparatus 3, in second PDCCH regions to which the first physical resource mapping is applied. In accordance with correspondences, notified by the base station apparatus 3, between individual E-CCEs in a DL PRB pair of a second PDCCH region and antenna ports (transmit antennas) associated with the individual E-CCEs, the mobile station apparatus 5 recognizes transmit antennas (antenna ports) used to transmit signals mapped to the individual E-CCEs in the DL PRB pair of the second PDCCH region. Note that the mobile station apparatus 5 may be notified by the base station apparatus 3 of only information (the first correspondence or the second correspondence) representing correspondences between individual E-CCEs in the DL PRB pair of the second PDCCH region and antenna ports (transmit antennas) associated with the individual E-CCEs, and the mobile station apparatus 5 may implicitly recognize a set of candidates of the E-CCE aggregation number of the second PDCCH region on the basis of the notified information so as to recognize the E-CCE aggregation numbers used to set search spaces in the second PDCCH region.

The control unit 405 determines whether the DCI input thereto by the Viterbi decoding unit 529 is correct and whether the DCI is addressed to the mobile station apparatus 5. If it is determined that the DCI is correct and addressed to the mobile station apparatus 5, the control unit 405 controls the demultiplexing unit 511, the data demodulation unit 523, the turbo decoding unit 525, and the transmission processing unit 407 on the basis of the DCI. For example, if the DCI is a downlink assignment, the control unit 405 performs control so that the reception processing unit 401 decodes the PDSCH signal. Note that the PDCCH also contains the CRC code just like the PDSCH. The control unit 405 determines whether or not the DCI contained in the PDCCH is incorrect using the CRC code.

The downlink reception quality measurement unit 531 measures a downlink reception quality (RSRP) in the cell using the downlink reference signals (CRS and CSI-RS), and outputs information of the measured downlink reception quality to the control unit 405. The downlink reception quality measurement unit 531 also measures an instantaneous channel quality used for generation of the CQI which the mobile station apparatus 5 notifies the base station apparatus 3 of. The downlink reception quality measurement unit 531 outputs information such as the measured RSRP to the control unit 405.

<Transmission Processing Unit 407 of Mobile Station Apparatus 5>

FIG. 6 is a schematic block diagram illustrating the configuration of the transmission processing unit 407 of the mobile station apparatus 5 according to the embodiment of the present invention. As illustrated in this figure, the transmission processing unit 407 includes a turbo coding unit 611, a data modulation unit 613, a DFT unit 615, an uplink pilot channel processing unit 617, a physical uplink control channel processing unit 619, a subcarrier mapping unit 621, an IFFT unit 623, a GI insertion unit 625, a transmit power adjustment unit 627, a random access channel processing unit 629, a D/A unit 605, a transmission RF unit 607, and the transmit antenna 411. The transmission processing unit 407 encodes and modulates information data and UCI so as to generate signals to be transmitted using the PUSCH and the PUCCH, and adjusts transmit powers of the PUSCH and the PUCCH. The transmission processing unit 407 generates a signal to be transmitted using the PRACH, and adjusts transmit power of the PRACH. The transmission processing unit 407 generates the DM RS and the SRS, and adjusts transmit powers of the DM RS and the SRS.

The turbo coding unit 611 performs turbo coding on the input information data at the coding rate specified by the control unit 405 so as to increase tolerance of the data against errors, and outputs the resulting information data to the data modulation unit 613. The data modulation unit 613 modulates the data coded by the turbo coding unit 611 by using the modulation scheme specified by the control unit 405, for example, QPSK, 16QAM, or 64QAM, so as to generate a signal sequence of modulation symbols. The data modulation unit 613 outputs the generated signal sequence of modulation symbols to the DFT unit 615. The DFT unit 615 performs discrete Fourier transform on the signal output by the data modulation unit 613, and outputs the resulting signal to the subcarrier mapping unit 621.

The physical uplink control channel processing unit 619 performs baseband signal processing so as to transmit the UCI input from the control unit 405. The UCI input to the physical uplink control channel processing unit 619 includes ACK/NACK, SR, and CQI. The physical uplink control channel processing unit 619 performs baseband signal processing, and outputs the resulting signal to the subcarrier mapping unit 621. The physical uplink control channel processing unit 619 encodes information bits of the UCI so as to generate a signal.

The physical uplink control channel processing unit 619 performs signal processing related to frequency-domain code multiplexing and/or time-domain code multiplexing on the signal generated from the UCI. The physical uplink control channel processing unit 619 multiplies the PUCCH signal, which has been generated from information bits of ACK/NACK, information bits of SR, or information bits of CQI, by a code sequence specified by the control unit 405 so as to realize frequency-domain code multiplexing. The physical uplink control channel processing unit 619 multiplies the PUCCH signal, which has been generated from information bits of ACK/NACK or information bits of SR, by a code sequence specified by the control unit 405 so as to realize time-domain code multiplexing.

Based on an instruction given by the control unit 405, the uplink pilot channel processing unit 617 generates the SRS and the DM RS which are signals known to the base station apparatus 3, and outputs the SRS and the DM RS to the subcarrier mapping unit 621.

The subcarrier mapping unit 621 maps the signals input from the uplink pilot channel processing unit 617, the signal input from the DFT unit 615, and the signal input from the physical uplink control channel processing unit 619 to subcarriers in accordance with an instruction given by the control unit 405, and outputs the resulting signal to the IFFT unit 623.

The IFFT unit 623 performs inverse fast Fourier transform on the signal output by the subcarrier mapping unit 621, and outputs the resulting signal to the GI insertion unit 625. Here, the number of points in the IFFT unit 623 is larger than the number of points in the DFT unit 615. The mobile station apparatus 5 performs DFT-Spread-OFDM modulation on the signals to be transmitted using the PUSCH, by using the DFT unit 615, the subcarrier mapping unit 621, and the IFFT unit 623. The GI insertion unit 625 inserts guard intervals to the signal input from the IFFT unit 623, and outputs the resulting signal to the transmit power adjustment unit 627.

The random access channel processing unit 629 generates a signal to be transmitted on the PRACH by using a preamble sequence specified by the control unit 405, and outputs the generated signal to the transmit power adjustment unit 627.

Based on the control signal supplied from the control unit 405, the transmit power adjustment unit 627 adjusts transmit powers of the signal input from the GI insertion unit 625 or the signal input from the random access channel processing unit 629, and outputs the resulting signal to the D/A unit 605. Note that the transmit power adjustment unit 627 controls, for each uplink subframe, the average transmit power of the PUSCH, PUCCH, DM RS, SRS, and PRACH.

The D/A unit 605 converts the baseband digital signal input from the transmit power adjustment unit 627 into an analog signal, and outputs the analog signal to the transmission RF unit 607. The transmission RF unit 607 generates an in-phase component and an orthogonal component of an intermediate frequency from the analog signal input from the D/A unit 605, and removes extra frequency components for the intermediate frequency band. Then, the transmission RF unit 607 converts (up-converts) the signal of the intermediate frequency into a signal of a high frequency, removes extra frequency components, amplifies the power, and transmits the resulting signal to the base station apparatus 3 via the transmit antenna 411.

FIG. 7 is a flowchart illustrating an example of processing related to setting of the UE-specific RS used for demodulation of individual E-CCEs in a DL PRB pair of a second PDCCH region performed by the mobile station apparatus 5 in accordance with the first embodiment of the present invention. Here, a description will be given of an example of processing performed for a second PDCCH region to which the first physical resource mapping is applied.

Based on information (RRC signaling) received from the base station apparatus 3, the mobile station apparatus 5 determines whether or not correspondences between individual E-CCEs in the DL PRB pair of the second PDCCH region and antenna ports (transmit antennas) associated with the individual E-CCEs are indicated by the first correspondence (step S101). If it is determined that the correspondences between individual E-CCEs in the DL PRB pair of the second PDCCH region and antenna ports (transmit antennas) associated with the individual E-CCEs are indicated by the first correspondence (step S101: YES), the mobile station apparatus 5 sets a setting so that signals of different E-CCEs in the DL PRB pair are to be demodulated using the UE-specific RSs associated with different transmit antennas (step S102). If it is determined that the correspondences between individual E-CCEs in the DL PRB pair of the second PDCCH region and antenna ports (transmit antennas) associated with the individual E-CCEs are not indicated by the first correspondence (step S101: NO), that is, if it is determined that the correspondences between individual E-CCEs in the DL PRB pair of the second PDCCH region and antenna ports (transmit antennas) associated with the individual E-CCEs are indicated by the second correspondence, the mobile station apparatus 5 sets a setting so that signals of the individual E-CCEs in the DL PRB pair are classified into a plurality of groups, signals of E-CCEs of the same group are to be demodulated using a UE-specific RS associated with a common transmit antenna, and signals of E-CCEs of different groups are to be demodulated using UE-specific RSs associated with different transmit antennas (step S103).

FIG. 8 is a flowchart illustrating an example of processing related to setting of transmit antennas (antenna ports) used for transmission of individual E-CCEs in a DL PRB pair of a second PDCCH region performed by the base station apparatus 3 in accordance with the first embodiment of the present invention. Here, a description will be given of an example of processing performed for a second PDCCH region to which the first physical resource mapping is applied.

Based on the location state or the like of the mobile station apparatus 5 within a cell (based on a result of determination as to whether MU-MIMO is to be applied), the base station apparatus 3 determines whether or not to use the first correspondence for the mobile station apparatus 5 so as to indicate correspondences between individual E-CCEs in the DL PRB pair of the second PDCCH region and antenna ports (transmit antennas) associated with the individual E-CCEs (step T101). If it is determined that the first correspondence is to be used to indicate the correspondences between individual E-CCEs in the DL PRB pair of the second PDCCH region and antenna ports (transmit antennas) associated with the individual E-CCEs (step T101: YES), the base station apparatus 3 sets a setting so that signals of different E-CCEs in the DL PRB pair are to be transmitted using different transmit antennas (T102). If it is determined that the first correspondence is not to be used to indicate the correspondences between individual E-CCEs in the DL PRB pair of the second PDCCH region and antenna ports (transmit antennas) associated with the individual E-CCEs (step T101: NO), that is, if it is determined the second correspondence is to be used to indicate the correspondences between individual E-CCEs in the DL PRB pair of the second PDCCH region and antenna ports (transmit antennas) associated with the individual E-CCEs, the base station apparatus 3 sets a setting so that signals of the individual E-CCEs in the DL PRB pair are classified into a plurality of groups, signals of E-CCEs of the same group are to be transmitted using a common transmit antenna, and signals of E-CCEs of different groups are to be transmitted using different transmit antennas (step T103).

As described above, in the communication system 1 according to the first embodiment of the present invention, a plurality of physical resource block pairs (PRB pairs) are configured as a control channel region (a second PDCCH region) (a second PDCCH region to which the first physical resource mapping is applied) which is a region to which a control channel (a second PDCCH) is to be possibly mapped. Resources obtained by dividing one physical resource block pair (a PRB pair) constitute a first element (an E-CCE). The control channel (the second PDCCH) (a localized E-PDCCH) is constituted by an aggregation (an E-CCE aggregation) of one or more first elements. The communication system 1 includes a plurality of mobile station apparatuses 5 and a base station apparatus 3 configured to perform communication with the plurality of mobile station apparatuses 5 using the control channels (the second PDCCHs). The base station apparatus 3 controls an antenna port used for transmission of a signal of a corresponding first element (E-CCE) in the physical resource block pair (PRB pair), and the mobile station apparatus 5 controls an antenna port associated with a reference signal (a UE-specific RS) used for demodulation of a signal mapped to a corresponding first element (E-CCE) in the physical resource block pair (PRB pair). In this way, the base station apparatus 3 can efficiently control an improvement of the overall capacity of control channels through spatial multiplexing of the second PDCCH using MU-MIMO and control an improvement of the overall capacity of control channels by improving performances on the second PDCCH using beamforming instead of MU-MIMO.

As described above, in the communication system 1 according to the first embodiment of the present invention, the base station apparatus 3 sets, for the control channel region (the second PDCCH region) either the first correspondence or the second correspondence to represent correspondences between signals of individual first elements (E-CCEs) in the physical resource block pair (PRB pair) and associated antenna ports. In the case where the first correspondence is set, the base station apparatus 3 performs control so that the signals of different first elements (E-CCEs) in the physical resource block pair (PRB pair) are to be transmitted using different antenna ports. In the case where the second correspondence is set, the base station apparatus 3 performs control so that the signals of the individual first elements (E-CCEs) in the physical resource block pair (PRB pair) are classified into a plurality of groups, signals of first elements (E-CCEs) of the same group are transmitted using a common antenna port, and signals of first elements (E-CCEs) of different groups are transmitted using different antenna ports. The mobile station apparatus 5 sets, for the control channel region (second PDCCH region), either the first correspondence or the second correspondence to indicate correspondences between signals of individual first elements (E-CCEs) in the physical resource block pair (PRB pair) and associated antenna ports. In the case where the first correspondence is set, the mobile station apparatus 5 performs control so that the signals of different first elements (E-CCEs) in the physical resource block pair (PRB pair) are demodulated using reference signals (UE-specific RSs) associated with different antenna ports. In the case where the second correspondence is set, the mobile station apparatus 5 performs control so that the signals of the individual first elements (E-CCEs) in the physical resource block pair (PRB pair) are classified into a plurality of groups, the signals of first elements (E-CCEs) of the same group are demodulated using a reference signal (UE-specific RS) associated with a common antenna port, and the signals of first elements (E-CCEs) of different groups are demodulated using reference signals (UE-specific RSs) associated with different antenna ports. In this way, the base station apparatus 3 can configure the second PDCCH region that employs the second correspondence for the mobile station apparatus 5 in the case where it is determined that the current state is suitable for MU-MIMO, and can configure the second PDCCH region that employs the first correspondence for the mobile station apparatus 5 in the case where it is determined that the current state is not suitable for MU-MIMO. For example, the state suitable for MU-MIMO is a state in which the base station apparatus 3 can apply beamforming (precoding processing) to signals addressed to different mobile station apparatuses 5 without causing large interference and there are requests for transmitting the second PDCCH signals to individual mobile station apparatuses 5 of the plurality of geographically separated mobile station apparatuses 5. For example, it is difficult to apply beamforming to signals addressed to individual mobile station apparatuses 5 of a plurality of mobile station apparatuses 5 located at geographically close locations without causing large interference. Thus, the base station apparatus 3 does not apply MU-MIMO to the second PDCCH signals addressed to these mobile station apparatuses 5. Accordingly, the base station apparatus 3 can efficiently control an improvement of the overall capacity of control channels through spatial multiplexing of second PDCCHs using MU-MIMO and control an improvement of the overall capacity of control channels by improving performances on second PDCCHs using beamforming instead of MU-MIMO.

As described above, in the communication system 1 according to the first embodiment of the present invention, in the case where the second correspondence is set, the base station apparatus 3 sets one antenna-port set from among a plurality of antenna-port sets each constituted by a plurality of different antenna ports. In the case where the second correspondence is set, the mobile station apparatus 5 sets the one antenna-port set from among a plurality of antenna-port sets each constituted by a plurality of different antenna ports, in accordance with an instruction given by the base station apparatus 3. In this way, in the case where it is determined that the current state is suitable for MU-MIMO, the base station apparatus 3 configures the second PDCCH region that employs the second correspondence by using a common DL PRB pair for a plurality of mobile station apparatuses 5, applies MU-MIMO to second PDCCHs addressed to the plurality of mobile station apparatuses 5 for which different antenna-port sets are set, thereby being able to improve the overall capacity of control channels.

Second Embodiment

A second embodiment of the present invention is different from the first embodiment in terms of how EECs and corresponding antenna ports are controlled. A description regarding part of the second embodiment similar to the first embodiment is appropriately omitted, and part different from the first embodiment will be mainly described. As for correspondences between individual E-CCEs in a DL PRB pair and antenna ports (transmit antennas) associated with the individual E-CCEs, different E-CCEs in the DL PRB pair are transmitted from different antenna ports.

In a second PDCCH region in which a localized E-PDCCH is mapped, UE-specific RSs (D1 and D2) for four transmit antennas (antenna port 7, antenna port 8, antenna port 9, and antenna port 10) (antenna port 107, antenna port 108, antenna port 109, and antenna port 110) can be mapped as illustrated in FIG. 20. A plurality of combinations are each used to indicate combinations of individual E-CCEs in a DL PRB pair and corresponding antenna ports. Antenna ports associated with individual E-CCEs in a DL PRB pair are different between the combinations. Signals of individual E-CCEs in a DL PRB pair are transmitted from corresponding antenna ports. A common antenna port is used for a signal of an ECCE and for transmission of a UE-specific RS. For example, four combinations (a first combination, a second combination, a third combination, and a fourth combination) can be used to indicate combinations of individual E-CCEs in a DL PRB pair and corresponding antenna ports. In the first combination, referring to FIG. 20, a signal of the second PDCCH of the E-CCE n is transmitted from antenna port 7 (antenna port 107), a signal of the second PDCCH of the E-CCE n+1 is transmitted from antenna port 8 (antenna port 108), a signal of the second PDCCH of the E-CCE n+2 is transmitted from antenna port 9 (antenna port 109), and a signal of the second PDCCH of the E-CCE n+3 is transmitted from antenna port 10 (antenna port 110). In the second combination, referring to FIG. 20, a signal of the second PDCCH of the E-CCE n is transmitted from antenna port 8 (antenna port 108), a signal of the second PDCCH of the E-CCE n+1 is transmitted from antenna port 9 (antenna port 109), a signal of the second PDCCH of the E-CCE n+2 is transmitted from antenna port 10 (antenna port 110), and a signal of the second PDCCH of the E-CCE n+3 is transmitted from antenna port 11 (antenna port 110). In the third combination, referring to FIG. 20, a signal of the second PDCCH of the E-CCE n is transmitted from antenna port 9 (antenna port 109), a signal of the second PDCCH of the E-CCE n+1 is transmitted from antenna port 10 (antenna port 110), a signal of the second PDCCH of the E-CCE n+2 is transmitted from antenna port 7 (antenna port 107), and a signal of the second PDCCH of the E-CCE n+3 is transmitted from antenna port 8 (antenna port 108). In the fourth combination, referring to FIG. 20, a signal of the second PDCCH of the E-CCE n is transmitted from antenna port 10 (antenna port 110), a signal of the second PDCCH of the E-CCE n+1 is transmitted from antenna port 7 (antenna port 107), a signal of the second PDCCH of the E-CCE n+2 is transmitted from antenna port 8 (antenna port 108), and a signal of the second PDCCH of the E-CCE n+3 is transmitted from antenna port 9 (antenna port 109).

Either combination is set, for each mobile station apparatus 5 by the base station apparatus 3, to indicate combinations of individual E-CCEs in a DL PRB pair and corresponding antenna ports. For example, this setting is performed through RRC signaling. The base station apparatus 3 transmits signals of individual E-CCEs in a DL PRB pair from corresponding transmission antennas. That is, the base station apparatus controls antenna ports used for transmission of signals of individual E-CCEs depending on which mobile station apparatus 5 the signals of the individual E-CCEs in the DL PRB pair are to be transmitted to.

The mobile station apparatus 5 demodulates the signal of each E-CCE in the DL PRB pair, by using the US-specific RS transmitted from the corresponding transmit antenna.

For example, as for combinations of individual E-CCEs in a DL PRB pair and corresponding antenna ports, the base station apparatus 3 sets different combinations for second PDCCH regions configured for different mobile station apparatuses 5, in the case where it is determined that the current state is suitable for MU-MIMO. For example, the state suitable for MU-MIMO is a state in which the base station apparatus 3 can apply beamforming (precoding processing) on signals addressed to different mobile station apparatuses 5 without causing large interference and there are requests for transmitting signals of the second PDCCHs to the individual mobile station apparatuses 5 of the plurality of geographically separated mobile station apparatuses 5. For example, it is difficult to apply beamforming to signals addressed to the individual mobile station apparatuses 5 of the plurality of mobile station apparatuses 5 located at geographically close locations without causing large interference. Thus, the base station apparatus 3 does not apply MU-MIMO to signals of the second PDCCHs addressed to these mobile station apparatuses 5. Also, common beamforming (precoding) suitable to achieve performance of transmitted and received signals is used for the plurality of mobile station apparatuses 5 located at geographically close locations. For example, as for combinations of individual E-CCEs in a DL PRB pair and corresponding antenna ports, the base station apparatus 3 sets the same (common) combination for the second PDCCH regions configured for the different mobile station apparatuses 5 in the case where it is determined that the current state is not suitable for MU-MIMO.

A description will be given of processing performed in the case where the base station apparatus 3 has determined that the current state is suitable for MU-MIMO. For example, the description will be given of the case where two mobile station apparatuses 5 are located at different locations (for example, in an area A and an area B) of an area covered by the base station apparatus 3. For convenience of explanation, the mobile station apparatus 5 located in the area A is referred to as a mobile station apparatus 5A-1, and the mobile station apparatus 5 located in the area B is referred to as a mobile station apparatus 5B-1. The base station apparatus 3 sets the first combination for a second PDCCH region configured for the mobile station apparatus 5A-1 to indicate combinations of individual E-CCEs in the DL PRB pair and corresponding antenna ports. The base station apparatus 3 sets the third combination for a second PDCCH region configured for the mobile station apparatus 5B-1 to indicate combinations of individual E-CCEs in the DL PRB pair and corresponding antenna ports.

For example, the base station apparatus 3 transmits a signal of the second PDCCH assigned to the mobile station apparatus 5A-1 from antenna port 7 (antenna port 107) using resources of the E-CCE n and transmits a signal of the second PDCCH assigned to the mobile station apparatus 5B-1 from antenna port 9 (antenna port 109) using resources of the E-CCE n. At this time, the base station apparatus 3 performs precoding processing suitable for the mobile station apparatus 5A-1 on the signal of the second PDCCH and the UE-specific RS to be transmitted from antenna port 7 (antenna port 107), and performs precoding processing suitable for the mobile station apparatus 5B-1 on the signal of the second PDCCH and the UE-specific RS to be transmitted from antenna port 9 (antenna port 109). The mobile station apparatus 5A-1 demodulates the signal of the second PDCCH mapped to the resources of the E-CCE n, by using the UE-specific RS corresponding to antenna port 7 (antenna port 107). The mobile station apparatus 5B-1 demodulates the signal of the second PDCCH mapped to the resources of the E-CCE n, by using the UE-specific RS corresponding to antenna port 9 (antenna port 109). Because the mobile station apparatus 5A-1 and the mobile station apparatus 5B-1 are located at geographically sufficiently separated locations, the base station apparatus 3 can apply beamforming (precoding processing) to the signals of the second PDCCHs assigned to both the mobile station apparatuses 5 without causing large interference. MU-MIMO is realized in the above-described manner.

For example, the base station apparatus 3 transmits a signal of the second PDCCH assigned to the mobile station apparatus 5A-1 from antenna port 7 (antenna port 107) using resources of the E-CCE n, transmits a signal of the second PDCCH assigned to the mobile station apparatus 5A-1 from antenna port 8 (antenna port 108) using resources of the E-CCE n+1, transmits a signal of the second PDCCH assigned to the mobile station apparatus 5B-1 from antenna port 9 (antenna port 109) using resources of the E-CCE n, and transmits a signal of the second PDCCH assigned to the mobile station apparatus 5B-1 from antenna port 10 (antenna port 110) using resources of the E-CCE n+1. At this time, the base station apparatus 3 performs precoding processing suitable for the mobile station apparatus 5A-1 on the signals of the second PDCCH and the UE-specific RSs to be transmitted from antenna port 7 (antenna port 107) and antenna port 8 (antenna port 108), and performs precoding processing suitable for the mobile station apparatus 5B-1 on the signals of the second PDCCH and the UE-specific RSs to be transmitted from antenna port 9 (antenna port 109) and antenna port 10 (antenna port 110). The mobile station apparatus 5A-1 demodulates the signal of the second PDCCH mapped to the resources of the E-CCE n, by using the UE-specific RS corresponding to antenna port 7 (antenna port 107), and also demodulates the signal of the second PDCCH mapped to the resources of the E-CCE n+1, by using the UE-specific RS corresponding to antenna port 8 (antenna port 108). The mobile station apparatus 5B-1 demodulates the signal of the second PDCCH mapped to the resources of the E-CCE n, by using the UE-specific RS corresponding to antenna port 9 (antenna port 109), and also demodulates the signal of the second PDCCH mapped to the resources of the E-CCE n+1, by using the UE-specific RS corresponding to antenna port 10 (antenna port 110). Because the mobile station apparatus 5A-1 and the mobile station apparatus 5B-1 are located at geographically sufficiently separated locations, the base station apparatus 3 can apply beamforming (precoding processing) to the signals of the second PDCCHs assigned to both the mobile station apparatuses 5 without causing large interference. MU-MIMO is realized in the above-described manner.

A description will be given of the case where a mobile station apparatus 5 (mobile station apparatus 5A-2) different from the mobile station apparatus 5A-1 is further located in the area A and a mobile station apparatus 5 (mobile station apparatus 5B-2) different from the mobile station apparatus 5B-1 is further located in the area B, for example. The base station apparatus 3 sets the first combination for the mobile station apparatus 5A-1 in the second PDCCH region to indicate combinations of individual E-CCEs in the DL PRB pair and corresponding antenna ports. The base station apparatus 3 sets the third combination for the mobile station apparatus 5A-2 in the second PDCCH region to indicate combinations of individual E-CCEs in the DL PRB pair and corresponding antenna ports. The base station apparatus 3 sets the third combination for the mobile station apparatus 5B-1 in the second PDCCH region to indicate combinations of individual E-CCEs in the DL PRB pair and corresponding antenna ports. The base station apparatus 3 sets the first combination for the mobile station apparatus 5B-2 in the second PDCCH region to indicate combinations of individual E-CCEs in the DL PRB pair and corresponding antenna ports.

For example, the base station apparatus 3 transmits a signal of the second PDCCH assigned to the mobile station apparatus 5A-1 from antenna port 7 (antenna port 107) using resources of the E-CCE n and transmits a signal of the second PDCCH assigned to the mobile station apparatus 5B-1 from antenna port 9 (antenna port 109) using resources of the E-CCE n. The base station apparatus 3 transmits a signal of the second PDCCH assigned to the mobile station apparatus 5A-2 from antenna port 8 (antenna port 108) using resources of the E-CCE n+3 and transmits a signal of the second PDCCH assigned to the mobile station apparatus 5B-2 from antenna port 10 (antenna port 110) using resources of the E-CCE n+3. At this time, the base station apparatus 3 performs precoding processing suitable for the mobile station apparatus 5A-1 on the signal of the second PDCCH and the UE-specific RS to be transmitted from antenna port 7 (antenna port 107), performs precoding processing suitable for the mobile station apparatus 5A-2 on the signal of the second PDCCH and the UE-specific RS to be transmitted from antenna port 8 (antenna port 108), performs precoding processing suitable for the mobile station apparatus 5B-1 on the signal of the second PDCCH and the UE-specific RS to be transmitted from antenna port 9 (antenna port 109), and performs precoding processing suitable for the mobile station apparatus 5B-2 on the signal of the second PDCCH and the UE-specific RS to be transmitted from antenna port 10 (antenna port 110). The mobile station apparatus 5A-1 demodulates the signal of the second PDCCH mapped to the resources of the E-CCE n, by using the UE-specific RS corresponding to antenna port 7 (antenna port 107). The mobile station apparatus 5A-2 demodulates the signal of the second PDCCH mapped to the resources of the E-CCE n+3, by using the UE-specific RS corresponding to antenna port 8 (antenna port 108). The mobile station apparatus 5B-1 demodulates the signal of the second PDCCH mapped to the resources of the E-CCE n, by using the UE-specific RS corresponding to antenna port 9 (antenna port 109). The mobile station apparatus 5B-2 demodulates the signal of the second PDCCH mapped to the resources of the E-CCE n+3, by using the UE-specific RS corresponding to antenna port 10 (antenna port 110). Because the mobile station apparatus 5A-1 and the mobile station apparatus 5B-1 are located at geographically sufficiently separated locations, the base station apparatus 3 can apply beamforming (precoding processing) to the signals of the second PDCCHs assigned to both the mobile station apparatuses 5 without causing large interference. Also, because the mobile station apparatus 5A-2 and the mobile station apparatus 5B-2 are located at geographically sufficiently separated locations, the base station apparatus 3 can apply beamforming (precoding processing) to the signals of the second PDCCHs assigned to both the mobile station apparatuses 5 without causing large interference. MU-MIMO is realized in the above-described manner.

For example, the base station apparatus 3 transmits a signal of the second PDCCH assigned to the mobile station apparatus 5A-1 from antenna port 7 (antenna port 107) using resources of the E-CCE n, transmits a signal of the second PDCCH assigned to the mobile station apparatus 5A-1 from antenna port 8 (antenna port 108) using resources of the E-CCE n+1, transmits a signal of the second PDCCH assigned to the mobile station apparatus 5A-2 from antenna port 7 (antenna port 107) using resources of the E-CCE n+2, and transmits a signal of the second PDCCH assigned to the mobile station apparatus 5A-2 from antenna port 8 (antenna port 108) using resources of the E-CCE n+3. Also, the base station apparatus 3 transmits a signal of the second PDCCH assigned to the mobile station apparatus 5B-1 from antenna port 9 (antenna port 109) using resources of the E-CCE n, transmits a signal of the second PDCCH assigned to the mobile station apparatus 5B-1 from antenna port 10 (antenna port 110) using resources of the E-CCE n+1, transmits a signal of the second PDCCH assigned to the mobile station apparatus 5B-2 from antenna port 9 (antenna port 109) using resources of the E-CCE n+2, and transmits signals of the second PDCCH assigned to the mobile station apparatus 5B-2 from antenna port 10 (antenna port 110) using resources of the E-CCE n+3. At this time, the base station apparatus 3 performs precoding processing suitable for the mobile station apparatus 5A-1 and the mobile station apparatus 5A-2 on the signals of the second PDCCHs and the UE-specific RSs to be transmitted from antenna port 7 (antenna port 107) and antenna port 8 (antenna port 108), and performs precoding processing suitable for the mobile station apparatus 5B-1 and the mobile station apparatus 5B-2 on the signals of the second PDCCHs and the UE-specific RSs to be transmitted from antenna port 9 (antenna port 109) and antenna port 10 (antenna port 110). The mobile station apparatus 5A-1 demodulates the signal of the second PDCCH mapped to the resources of the E-CCE n, by using the UE-specific RS corresponding to antenna port 7 (antenna port 107), and also demodulates the signal of the second PDCCH mapped to the resources of the E-CCE n+1, by using the UE-specific RS corresponding to antenna port 8 (antenna port 108). The mobile station apparatus 5A-2 demodulates the signal of the second PDCCH mapped to the resources of the E-CCE n+2, by using the UE-specific RS corresponding to antenna port 7 (antenna port 107), and also demodulates the signal of the second PDCCH mapped to the resources of the E-CCE n+3, by using the UE-specific RS corresponding to antenna port 8 (antenna port 108). The mobile station apparatus 5B-1 demodulates the signal of the second PDCCH mapped to the resources of the E-CCE n, by using the UE-specific RS corresponding to antenna port 9 (antenna port 109), and also demodulates the signal of the second PDCCH mapped to the resources of the E-CCE n+1, by using the UE-specific RS corresponding to antenna port 10 (antenna port 110). The mobile station apparatus 5B-2 demodulates the signal of the second PDCCH mapped to the resources of the E-CCE n+2, by using the UE-specific RS corresponding to antenna port 9 (antenna port 109), and also demodulates the signal of the second PDCCH mapped to the resources of the E-CCE n+3, by using the UE-specific RS corresponding to antenna port 10 (antenna port 110). Because the set of the mobile station apparatus 5A-1 and the mobile station apparatus 5A-2 and the set of the mobile station apparatus 5B-1 and the mobile station apparatus 5B-2 are located at geographically sufficiently separated locations, the base station apparatus 3 can apply beamforming (precoding processing) to the signals of the second PDCCHs assigned to the mobile station apparatuses 5 located in the different areas without causing large interference. Also, because the mobile station apparatus 5A-1 and the mobile station apparatus 5A-2 are located at geographically sufficiently close locations (in area A), common beamforming (precoding processing) is suitable therefor. Thus, the base station apparatus 3 can efficiently transmit the signals of the second PDCCHs to both the mobile station apparatus 5A-1 and the mobile station apparatus 5A-2 using the same antenna ports (antenna port 7 and antenna port 8) (antenna port 107 and antenna port 108). Also, because the mobile station apparatus 5B-1 and the mobile station apparatus 5B-2 are located at geographically sufficiently close locations (in area B), common beamforming (precoding processing) is suitable therefor. Thus, the base station apparatus 3 can efficiently transmit the signals of the second PDCCHs to both the mobile station apparatus 5B-1 and the mobile station apparatus 5B-2 using the same antenna ports (antenna port 9 and antenna port 10) (antenna port 109 and antenna port 110). MU-MIMO is realized in the above-described manner.

A description will be given of processing performed in the case where the base station apparatus 3 has determined that the current state is not suitable for MU-MIMO. For example, the description will be given of the case where four mobile station apparatuses 5 are located at different locations (for example, in an area C, an area D, an area E, and an area F) within an area covered by the base station apparatus 3. For convenience of explanation, the mobile station apparatus 5 located in the area C is referred to as a mobile station apparatus 5C-1, the mobile station apparatus 5 located in the area D is referred to as a mobile station apparatus 5D-1, the mobile station apparatus 5 located in the area E is referred to as a mobile station apparatus 5E-1, and the mobile station apparatus 5 located in the area F is referred to as a mobile station apparatus 5F-1. Here, the area C, the area D, the area E, and the area F are not sufficiently separated from one another. Thus, the description will be given of the case where it is difficult to apply beamforming (precoding processing) to signals of the second PDCCHs assigned to the mobile station apparatuses 5 located in these areas without causing large interference and difficult to apply MU-MIMO. On the other hand, the area C, the area D, the area E, and the area F are not located very close to one another. Thus, the description will be given of the case where beamforming (precoding processing) suitable for the signals of the second PDCCHs assigned to the mobile station apparatuses 5 located in these areas is different from one another. The base station apparatus 3 sets the first combination for the second PDCCH region configured for the mobile station apparatus 5C-1, the second PDCCH region configured for the mobile station apparatus 5D-1, the second PDCCH region configured for the mobile station apparatus 5E-1, and the second PDCCH region configured for the mobile station apparatus 5F-1 to indicate combinations of individual E-CCEs in the DL PRB pair and corresponding antenna ports.

For example, the base station apparatus 3 transmits a signal of the second PDCCH assigned to the mobile station apparatus 5C-1 from antenna port 7 (antenna port 107) using resources of the E-CCE n, transmits a signal of the second PDCCH assigned to the mobile station apparatus 5D-1 from antenna port 8 (antenna port 108) using resources of the E-CCE n+1, transmits a signal of the second PDCCH assigned to the mobile station apparatus 5E-1 from antenna port 9 (antenna port 109) using resources of the E-CCE n+2, and transmits a signal of the second PDCCH assigned to the mobile station apparatus 5F-1 from antenna port 10 (antenna port 110) using resources of the E-CCE n. At this time, the base station apparatus 3 performs precoding processing suitable for the mobile station apparatus 5C-1 on the signal of the second PDCCH and the UE-specific RS to be transmitted from antenna port 7 (antenna port 107), performs precoding processing suitable for the mobile station apparatus 5D-1 on the signal of the second PDCCH and the UE-specific RS to be transmitted from antenna port 8 (antenna port 108), performs precoding processing suitable for the mobile station apparatus 5E-1 on the signal of the second PDCCH and the UE-specific RS to be transmitted from antenna port 9 (antenna port 109), and performs precoding processing suitable for the mobile station apparatus 5F-1 on the signal of the second PDCCH and the UE-specific RS to be transmitted from antenna port 10 (antenna port 110). The mobile station apparatus 5C-1 demodulates the signal of the second PDCCH mapped to the resources of the E-CCE n, by using the UE-specific RS corresponding to antenna port 7 (antenna port 107). The mobile station apparatus 5D-1 demodulates the signal of the second PDCCH mapped to resources of the E-CCE n+1, by using the UE-specific RS corresponding to antenna port 8 (antenna port 108). The mobile station apparatus 5E-1 demodulates the signal of the second PDCCH mapped to the resources of the E-CCE n+2, by using the UE-specific RS corresponding to antenna port 9 (antenna port 109). The mobile station apparatus 5F-1 demodulates the signal of the second PDCCH mapped to the resources of the E-CCE n+3, by using the UE-specific RS corresponding to antenna port 10 (antenna port 110). As described above, the base station apparatus 3 can perform suitable beamforming (precoding processing) on the signals of the second PDCCHs assigned to the mobile station apparatuses 5 located in the individual areas independently. Accordingly, requirements regarding the performance of the signals of the second PDCCHs assigned to the mobile station apparatuses 5 located in the individual areas are met.

In the case where the area C, the area D, the area E, and the area F are separated from one another and beamforming (precoding processing) can be applied to the signals of the second PDCCHs assigned to the mobile station apparatuses 5 located in these areas without causing large interference and thus MU-MIMO can be applied, the base station apparatus 3 may, for example, set the first combination for the mobile station apparatus 5C-1 in the second PDCCH region, the second combination for the mobile station apparatus 5D-1 in the second PDCCH region, the third combination for the mobile station apparatus 5E-1 in the second PDCCH region, and the fourth combination for the mobile station apparatus 5F-1 in the second PDCCH region to indicate combinations of individual E-CCEs in the DL PRB pair and corresponding antenna ports.

Also, the UE-specific RSs are multiplexed by the base station apparatus 3 in a DL PRB pair in which the second PDCCH is mapped. The mobile station apparatus 5 performs demodulation processing on the signal of the second PDCCH by using the UE-specific RS. Different combinations of the UE-specific RSs used for demodulation of the second PDCCH and antenna ports corresponding to individual E-CCEs in a DL PRB pair can be set for different second PDCCH regions. That is, different combinations of individual E-CCEs within a DL PRB pair of the second PDCCH region and corresponding antenna ports can be set for different mobile station apparatuses 5. In the second PDCCH region to which the first physical resource mapping is applied, UE-specific RSs for a plurality of transmit antennas (antenna port 7, antenna port 8, antenna port 9, and antenna port 10) (antenna port 107, antenna port 108, antenna port 109, and antenna port 110) are mapped. In the second PDCCH region to which the second physical resource mapping is applied, the UE-specific RS for one transmit antenna (antenna port 7) (antenna port 107) is mapped. In the second PDCCH region to which the second physical resource mapping is applied, the UE-specific RS for two transmit antennas (antenna port 7 and antenna port 8) (antenna port 107 and antenna port 108) may be mapped in the case where transmit diversity such as SFBC (Space Frequency Block Coding) or the like is applied to the distributed E-PDCCH.

In the second PDCCH region to which the first physical resource mapping is applied, different E-CCEs in a DL PRB pair are associated with different transmit antennas, and signals are transmitted from the respective transmit antennas. In the second PDCCH region to which the second physical resource mapping is applied, individual E-CCEs in a DL PRB pair are associated with the same (common) transmit antenna, and signals are transmitted from the corresponding transmit antenna.

For example, as for combinations of individual E-CCEs in a DL PRB pair and corresponding antenna ports, the first combination, the second combination, the third combination, or the fourth combination can be used for a second PDCCH region to which the first physical resource mapping is applied. That is, one combination is set (configured) for each mobile station apparatus 5 from among the plurality of combinations. In the first combination, referring to FIG. 20, a signal of the second PDCCH of the E-CCE n is transmitted from antenna port 7 (antenna port 107), a signal of the second PDCCH of the E-CCE n+1 is transmitted from antenna port 8 (antenna port 108), a signal of the second PDCCH of the E-CCE n+2 is transmitted from antenna port 9 (antenna port 109), and a signal of the second PDCCH of the E-CCE n+3 is transmitted from antenna port 10 (antenna port 110). In the second combination, referring to FIG. 20, a signal of the second PDCCH of the E-CCE n is transmitted from antenna port 8 (antenna port 108), a signal of the second PDCCH of the E-CCE n+1 is transmitted from antenna port 9 (antenna port 109), a signal of the second PDCCH of the E-CCE n+2 is transmitted from antenna port 10 (antenna port 110), and a signal of the second PDCCH of the E-CCE n+3 is transmitted from antenna port 7 (antenna port 107). In the third combination, referring to FIG. 20, a signal of the second PDCCH of the E-CCE n is transmitted from antenna port 9 (antenna port 109), a signal of the second PDCCH of the E-CCE n+1 is transmitted from antenna port 10 (antenna port 110), a signal of the second PDCCH of the E-CCE n+2 is transmitted from antenna port 7 (antenna port 107), and a signal of the second PDCCH of the E-CCE n+3 is transmitted from antenna port 8 (antenna port 108). In the fourth combination, referring to FIG. 20, a signal of the second PDCCH of the E-CCE n is transmitted from antenna port 10 (antenna port 110), a signal of the second PDCCH of the E-CCE n+1 is transmitted from antenna port 7 (antenna port 107), a signal of the second PDCCH of the E-CCE n+2 is transmitted from antenna port 8 (antenna port 108), and a signal of the second PDCCH of the E-CCE n+3 is transmitted from antenna port 9 (antenna port 109).

Here, the relationship among the first combination, the second combination, the third combination, and the fourth combination can be considered that antenna ports associated with individual E-CCEs in a DL PRB pair are shifted. Also, a relationship between the first combination and the third combination will be described. A plurality of E-CCEs in a DL PRB pair are classified into a plurality of groups (sets), for example, two groups (a group A and a group B). It can be considered that the first combination and the third combination have a relationship in which antenna-port sets associated with E-CCEs of groups are transposed. More specifically, the antenna-port set (antenna port 7 and antenna port 8) (antenna port 107 and antenna port 108) corresponding to the group A (E-CCE n and E-CCE n+1 illustrated in FIG. 20) of the first combination is the same as the antenna-port set (antenna port 7 and antenna port 8) (antenna port 107 and antenna port 108) corresponding to the group B (E-CCE n+2 and E-CCE n+3 illustrated in FIG. 20) of the third combination. Also, the antenna-port set (antenna port 9 and antenna port 10) (antenna port 109 and antenna port 110) corresponding to the group B (E-CCE n+2 and E-CCE n+3 illustrated in FIG. 20) of the first combination is the same as the antenna-port set (antenna port 9 and antenna port 10) (antenna port 109 and antenna port 110) corresponding to the group A (E-CCE n and E-CCE n+1 illustrated in FIG. 20) of the third combination. Note that the relationship between the second combination and the fourth combination is the same as the relationship between the first combination and the third combination.

Each processing unit of the base station apparatus 3 will be described. The radio resource control unit 103 sets combinations of individual E-CCEs in a DL PRB pair and corresponding antenna ports for a second PDCCH region. Specifically, the radio resource control unit 103 sets transmit antennas used for transmission of signals of the individual E-CCEs in the DL PRB pair. The mobile station apparatus 5 is notified of part of information set by the radio resource control unit 103 via the transmission processing unit 107. For example, the mobile station apparatus 5 is notified of information representing the DL PRB pair of the second PDCCH region, information representing physical resource mapping (information representing the first physical resource mapping or the second physical resource mapping) applied to the second PDCCH region, and information representing the combinations of the individual E-CCEs in the DL PRB pair and corresponding antenna ports (the first combination, the second combination, the third combination, or the fourth combination).

The radio resource control unit 103 outputs various control signals to the control unit 105. For example, the control signals include a control signal representing physical resource mapping of the second PDCCH region, a control signal representing transmit antennas used for transmission of signals of individual E-CCEs in the DL PRB pair of the second PDCCH region, a control signal representing resource allocation of the second PDCCH, and a control signal representing an amount of phase rotation used in precoding processing.

Based on the control signals input from the radio resource control unit 103, the control unit 105 performs, on the transmission processing unit 107, control related to assignment of a DL PRB pair to the PDSCH, resource allocation of the PDCCH, setting of a modulation scheme applied to the PDSCH, coding rates applied to the PDSCH and the PDCCH (E-CCE aggregation number of the second PDCCH), setting of UE-specific RSs in the second PDCCH region, setting of transmit antennas used for transmission of signals of E-CCEs, and setting of precoding processing applied to the PDSCH, the PDCCH, and the UE-specific RSs. In addition, the control unit 105 performs control so that information, such as information representing the second PDCCH region, information representing physical resource mapping of the second PDCCH region, information representing combinations of individual E-CCEs in the DL PRB pair and corresponding antenna ports (the first combination, the second combination, the third combination, or the fourth combination), is transmitted to the mobile station apparatus 5 via the transmission processing unit 107 using the PDSCH.

The transmission processing unit 107 transmits, to the mobile station apparatus 5 using the PDSCH, the information input from the radio resource control unit 103 such as information representing the second PDCCH region, information representing physical resource mapping of the second PDCCH region, information representing combinations of individual E-CCEs in the DL PRB pair and corresponding antenna ports (the first combination, the second combination, the third combination, or the fourth combination), and information data input from a higher layer. The transmission processing unit 107 also transmits the DCI input from the control unit 105 to the mobile station apparatus 5 using the PDCCH (the first PDCCH and the second PDCCH).

Each processing unit of the mobile station apparatus 5 will be described. The reception processing unit 401 receives a signal from the base station apparatus 3, and demodulates and decodes the received signal in accordance with an instruction given by the control unit 405. For example, the reception processing unit 401 estimates the channel by using the UE-specific RS mapped in the second PDCCH region specified by the base station apparatus 3, demodulates a signal of the second PDCCH, and performs processing for detecting a signal containing control information addressed to the mobile station apparatus 5. For example, the reception processing unit 401 recognizes, in accordance with the combinations of individual E-CCEs in the DL PRB pair of the second PDCCH region and corresponding antenna ports notified by the base station apparatus 3, transmit antennas (antenna ports) associated with the UE-specific RSs used for demodulation of signals of the individual E-CCEs in the DL PRB pair of the second PDCCH region and performs processing for detecting a signal containing control information addressed to the mobile station apparatus 5.

In addition, the reception processing unit 401 outputs control information that has been generated by the radio resource control unit 103 of the base station apparatus 3 and is obtained by decoding the PDSCH, to the control unit 405 and to the radio resource control unit 403 of the mobile station apparatus 5 via the control unit 405. For example, the control information that has been generated by the radio resource control unit 103 of the base station apparatus 3 includes information representing a DL PRB pair of the second PDCCH region, information representing physical resource mapping (information indicating the first physical resource mapping or the second physical resource mapping) applied to the second PDCCH region, and information representing combinations of individual E-CCEs in the DL PRB pair and corresponding antenna ports (the first combination, the second combination, the third combination, or the fourth correspondence).

The control unit 405 controls the reception processing unit 401 and the transmission processing unit 407 in accordance with an instruction given by the radio resource control unit 403. For example, the control unit 405 controls the reception processing unit 401 in accordance with combinations of individual E-CCEs in a DL PRB pair and corresponding antenna ports (correspondences between individual E-CCEs in a DL PRB pair and transmit antennas associated with corresponding UE-specific RSs) specified by the radio resource control unit 403 so that the UE-specific RS on the corresponding transmit antenna (antenna port) is to be used in demodulation of a signal of each E-CCE.

The radio resource control unit 403 stores and holds the control information which has been generated by the radio resource control unit 103 of the base station apparatus 3 and notified by the base station apparatus 3. The radio resource control unit 403 also controls the reception processing unit 401 and the transmission processing unit 407 via the control unit 405. That is, the radio resource control unit 403 includes a function of a memory that holds various parameters and so forth. For example, the radio resource control unit 403 holds information regarding a DL PRB pair of a second PDCCH region, information regarding physical resource mapping of the second PDCCH region, and information regarding combinations of individual E-CCEs in the DL PRB pair of the second PDCCH region and corresponding antenna ports (the first combination, the second combination, the third combination, or the fourth combination); and outputs various control signals to the control unit 405.

The mobile station apparatus 5 sets a search space corresponding to candidates of the E-CCE aggregation number in the second PDCCH region to which the first physical resource mapping is applied. In accordance with combinations of individual E-CCEs in a DL PRB pair and corresponding antenna ports (correspondences between individual E-CCEs in a DL PRB pair of the second PDCCH region and antenna ports (transmit antennas) associated with the individual E-CCEs) notified by the base station apparatus 3, the mobile station apparatus 5 recognizes transmit antennas (antenna ports) used for transmission of signals of the individual E-CCEs in the DL PRB pair of the second PDCCH region.

Figure 24:
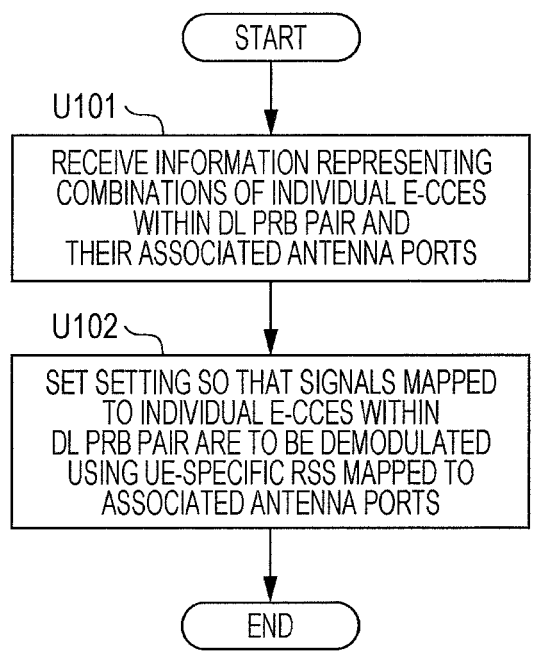
FIG. 24 a flowchart illustrating an example of processing related to setting of UE-specific RSs used for demodulation of individual E-CCEs in a DL PRB pair of a second PDCCH region performed by the mobile station apparatus 5 in accordance with a second embodiment of the present invention.

FIG. 24 a flowchart illustrating an example of processing related to setting of UE-specific RSs used for demodulation of individual E-CCEs in a DL PRB pair of a second PDCCH region performed by the mobile station apparatus 5 in accordance with the second embodiment of the present invention. Here, a description will be given of an example of processing performed for a second PDCCH region to which the first physical resource mapping is applied.

The mobile station apparatus 5 receives, from the base station apparatus 3, information representing combinations of individual E-CCEs in a DL PRB pair and corresponding antenna ports through RRC signaling (step U101). Then, based on the information received from the base station apparatus 3, the mobile station apparatus 5 sets a setting so that signals of the individual E-CCEs in the DL PRB pair are to be demodulated using UE-specific RSs associated with the corresponding antenna ports (step U102).

Figure 25:
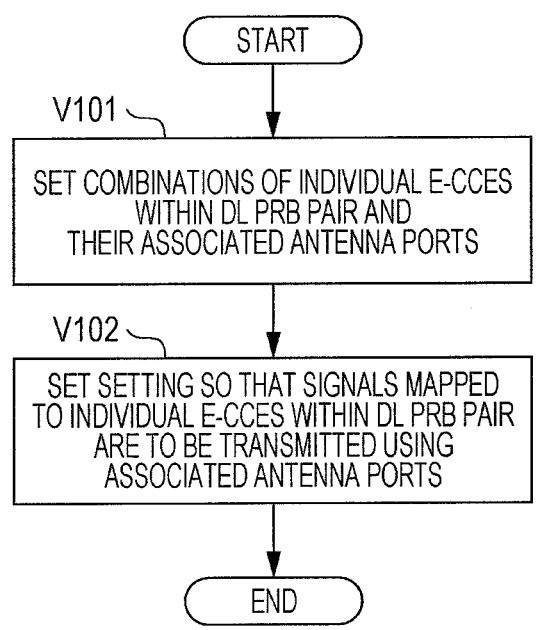
FIG. 25 is a flowchart illustrating an example of processing related to setting of transmit antennas (antenna ports) used for transmission of individual E-CCEs in a DL PRB pair of a second PDCCH region performed by the base station apparatus 3 in accordance with the second embodiment of the present invention.

FIG. 25 is a flowchart illustrating an example of processing related to setting of transmit antennas (antenna ports) used for transmission of individual E-CCEs in a DL PRB pair of a second PDCCH region performed by the base station apparatus 3 in accordance with the second embodiment of the present invention. Here, a description will be given of an example of processing performed for a second PDCCH region to which the first physical resource mapping is applied.

Based on the location state or the like of the mobile station apparatus 5 within a cell (based on a result of determination as to whether MU-MIMO is to be applied), the base station apparatus 3 sets combinations of individual E-CCEs in a DL PRB pair and corresponding antenna ports for the mobile station apparatus 5 (step V101). Then, the base station apparatus 3 sets a setting so that signals of the individual E-CCEs in the DL PRB pair are to be transmitted using the corresponding antenna ports (step V102).

As described above, in the communication system 1 according to the second embodiment of the present invention, a plurality of physical resource block pairs (PRB pairs) are configured as a control channel region (a second PDCCH region) (a second PDCCH region to which the first physical resource mapping is applied) which is a region to which a control channel (second PDCCH) is to be possibly mapped. Resources obtained by dividing one physical resource block pair (PRB pair) constitute first elements (E-CCEs). The control channel (second PDCCH) (localized E-PDCCH) is constituted by an aggregation (E-CCE aggregation) of one or more first elements. The communication system 1 includes a plurality of mobile station apparatuses 5 and a base station apparatus 3 configured to perform communication with the plurality of mobile station apparatuses 5 using the control channels (second PDCCHs). The base station apparatus 3 sets one combination from among a plurality of combinations to indicate correspondences between the plurality of first elements (E-CCEs) in the physical resource block pair (PRB pair) and a plurality of antenna ports used for transmission of signals of the individual first elements (E-CCEs). Based on the combination set by the base station apparatus 3, the mobile station apparatus 5 sets antenna ports associated with reference signals (UE-specific RSs) each used for demodulation of the signal of the corresponding first element (E-CCE) in the physical resource block pair (PRB pair). Accordingly, the base station apparatus 3 can efficiently control an improvement of the overall capacity of control channels through spatial multiplexing of the second PDCCHs using MU-MIMO and control an improvement of the overall capacity of control channels by improving performances on the second PDCCHs using beamforming instead of MU-MIMO.

Note that in the embodiments of the present invention, a region of resources to which the second PDCCH is to be possibly mapped is defined as the second PDCCH region for simplicity of explanation; however, the present invention is obviously applicable to a region defined by different terms as long as the region has the similar role.

Also, the mobile station apparatus 5 is not limited to a mobile terminal, and the present invention can be realized by implementing the functions of the mobile station apparatus 5 in a fixed terminal.

The characteristics means of the present invention described above can also be realized by implementing and controlling the functions using an integrated circuit. That is, an integrated circuit according to the present invention is an integrated circuit to be mounted in a mobile station apparatus that performs communication with a base station apparatus using a control channel constituted by an aggregation of one or more first elements each of which is constituted by resources obtained by dividing one physical resource block pair. A plurality of physical resource block pairs are configured as a control channel region which is a region to which the control channel is to be possibly mapped. The integrated circuit includes a first control unit configured to control antenna ports associated with reference signals each used for demodulation of a signal of the corresponding first element in the physical resource block.

Also, an integrated circuit according to the present invention is an integrated circuit to be mounted in a base station apparatus that performs communication with a plurality of mobile station apparatuses using control channels each constituted by an aggregation of one or more first elements each of which is constituted by resources obtained by dividing one physical resource block pair. A plurality of physical resource block pairs are configured as a control channel region which is a region to which the control channel is to be possibly mapped. The integrated circuit includes a second control unit configured to control antenna ports used for transmission of signals of the respective first elements in the physical resource block pair.

Operations described in the embodiments of the present invention may be realized with programs. Programs that run on the mobile station apparatus 5 and the base station apparatus 3 according to the present invention are programs that control a CPU or the like (programs that cause a computer to function) so as to implement the functions of the above-described embodiments of the present invention. Additionally, information handled by these apparatuses is temporarily accumulated in a RAM during processing, and thereafter stored in various types of ROM or an HDD, and read out, and modified/written by the CPU as needed. A recording medium that stores the programs may be any of a semiconductor medium (e.g., a ROM or non-volatile memory card), an optical recording medium (e.g., a DVD, MO, MD, CD, or BD), or a magnetic recording medium (e.g., a magnetic tape or flexible disk). Also, in addition to implementations of the functions of the above-described embodiments through execution of a loaded program, the functions of the above-described embodiments of the present invention may be implemented by performing processing in cooperation with the operating system or other application programs based on instructions of the program.

Also, in the case of distribution into the market, the program may be distributed by being stored on a portable recording medium, or by being transferred to a server computer connected via a network such as the Internet. In this case, a storage apparatus of the server computer is also encompassed by the present invention. Part or the entirety of the mobile station apparatus 5 and the base station apparatus 3 according to the above-described embodiments may be typically implemented as an LSI which is an integrated circuit. Functional blocks of the mobile station apparatus 5 and the base station apparatus 3 may be individually formed as chips or some or all of them may be integrated into a chip. A method for integration may be a dedicated circuit or a general-purpose processor, as well as an LSI. In a case where the progress of semiconductor technologies produces an integration technology which replaces an LSI, an integrated circuit based on the technology can be used. The functional blocks of the mobile station apparatus 5 and the base station apparatus 3 may be implemented by a plurality of circuits.

Information and signals can be represented by using a variety of different technologies and methods. For example, a chip, symbol, bit, signal, information, command, instruction, and data that can be referred to in the above description can be represented by voltage, current, electromagnetic waves, a magnetic field or magnetic particles, an optical field or photons, or a combination thereof.

Various exemplary logical blocks, processing units, and algorithm steps described in association with the disclosure of the present description may be implemented as electronic hardware, computer software, or a combination thereof. In order to make synonymity of the hardware and the software clear, various exemplary elements, blocks, modules, circuits, and steps have been generally described in terms of their functionality. Whether such functionality is implemented as hardware or is implemented as software depends on design constraints of each application and the entire system. Although the persons skilled in the art may implement the described functionality by various methods for each specific application, the determination of the implementation should not be construed as deviation from the scope of the present disclosure.

Various exemplary logical blocks and processing units described in association with the disclosure of the present description may be implemented or executed by a general-purpose processor; a digital signal processor (DSP); an application specific integrated circuit (ASIC); a field programmable gate array signal (FPGA); other programmable logical apparatuses; discrete gates or transistor logics, or discrete hardware components, which are designed to execute the functions described in the present description; or a combination thereof. The general-purpose processor may be a microprocessor. Alternatively, the processor may be a conventional processor, controller, microcontroller, or state machine. The processor may be implemented as a combination of computing devices. For example, the combination may be a combination of the DSP and the microprocessor, a combination of multiple microprocessors, a combination of one or more microprocessors connected to a DSP core, or a combination of other similar configurations.

The methods and the algorithm steps described in association with the disclosure of the present description may be directly embodied by hardware, a software module that can be executed by the processor, or a combination of these two. The software module may exist in a RAM, a flash memory, a ROM, an EPROM, a register, a hard disk, a removable disk, a CD-ROM, or a recording medium in any known form in this field. The typical recording medium may be connected to the processor so that the processor can read out information from the recording medium and can write information to the recording medium. In another method, the recording medium may be built into the processor. The processor and the recording medium may be included in the ASIC. The ASIC may be included in the mobile station apparatus (user terminal). Alternatively, the processor and the recording medium may be included in the mobile station apparatus 5 as the discrete elements.

In one or more typical designs, the described functions above may be implemented as hardware, software, firmware, or a combination thereof. When the functions are implemented as software, the functions may be held as one or more instructions or codes on a computer-readable medium or may be transferred. The computer-readable medium includes both a communication medium and a computer recording medium, which include a medium to assist the portability of a computer program from one location to another location. The recording medium may be any commercially available medium that can be accessed by a general-purpose or special-purpose computer. The above media are only exemplary computer-readable media and are not be exclusively used. The computer-readable media may include a RAM; a ROM; an EEPROM; a CD-ROM or other optical disc media; magnetic disk media or other magnetic recording media; and media that can be accessed by a general-purpose or special-purpose computer or a general-purpose or special-purpose processor and that can be used to carry or hold desired program code means in the form of an instruction or a data structure. Any connection is appropriately referred to as the computer-readable medium. For example, when software is transmitted from a Web site, a server, or another remote source by using a coaxial cable, an optical fiber cable, a twisted pair, a digital subscriber line (DSL), or a radio technique such as infrared radiation, radio waves, or microwaves, the coaxial cable, the optical fiber cable, the twisted pair, the DSL, and the radio technique such as the infrared radiation, the radio waves, or the microwaves are included in the definition of the media. The disks or discs used in the present description include a compact disc (CD), a laser disc (registered trademark), an optical disc, a digital versatile disc (DVD), a floppy disk (registered trademark), and a Blu-ray disc. Disks generally magnetically reproduce data while discs generally optically reproduce data with laser beams. Combinations of the above ones should be included in the computer-readable media.

While the embodiments of the present invention have been described in detail with reference to the drawings, the specific configurations are not limited to the embodiments, and designs or the like not departing from the gist of the invention are also within the scope of the appended claims.

(1) A communication system according to the present invention is a communication system including: a plurality of mobile station apparatuses; and a base station apparatus configured to communicate with the plurality of mobile station apparatuses using a control channel, the control channel being constituted by an aggregation of one or more first elements each of which is constituted by a resource obtained by dividing one physical resource block pair, a plurality of physical resource block pairs being configured as a control channel region which is a region to which the control channel is to be possibly mapped, wherein the base station apparatus includes a second control unit configured to control an antenna port used for transmission of a signal mapped to a corresponding first element in the physical resource block pair, and the mobile station apparatus includes a first control unit configured to control an antenna port associated with a reference signal used for demodulation of a signal mapped to a corresponding first element in the physical resource block pair.

(2) In the communication system according to the present invention, the base station apparatus includes a second radio resource control unit configured to set, for the control channel region, either a first correspondence or a second correspondence to indicate correspondences between signals mapped to the first elements in the physical resource block pair and associated antenna ports, and the second control unit is configured to perform control so that the signals mapped to different first elements in the physical resource block pair are to be transmitted using different antenna ports in a case where the second radio resource control unit has set the first correspondence, and is configured to perform control so that the signals mapped to the plurality of first elements in the physical resource block pair are classified into a plurality of groups, the signals mapped to the first elements of the same group are to be transmitted using a common antenna port, and the signals mapped to the first elements of different groups are to be transmitted using different antenna ports in a case where the second radio resource control unit has set the second correspondence.

(3) In the communication system according to the present invention, the mobile station apparatus includes a first radio resource control unit configured to set, for the control channel region, either a first correspondence or a second correspondence to indicate correspondences between signals mapped to the first elements in the physical resource block pair and associated antenna ports, and the first control unit is configured to perform control so that the signals mapped to different first elements in the physical resource block pair are to be demodulated using respective reference signals associated with different antenna ports in a case where the first radio resource control unit has set the first correspondence, and is configured to perform control so that the signals mapped to the plurality of first elements in the physical resource block pair are classified into a plurality of groups, the signals mapped to the first elements of the same group are to be demodulated using a reference signal associated with a common antenna port, and the signals mapped to the first elements of different groups are to be demodulated using respective reference signals associated with different antenna ports in a case where the first radio resource control unit has set the second correspondence.

(4) In the communication system according to the present invention, the second radio resource control unit is configured to set, for the mobile station apparatus, an antenna-port set from among a plurality of antenna-port sets constituted by a plurality of different antenna ports in a case where the second radio resource control unit has set the second correspondence.

(5) In the communication system according to the present invention, the first radio resource control unit is configured to set, based on an instruction given by the base station apparatus, an antenna-port set from among a plurality of antenna-port sets constituted by a plurality of different antenna ports in a case where the first radio resource control unit has set the second correspondence.

(6) A mobile station apparatus according to the present invention is a mobile station apparatus configured to communicate with a base station apparatus using a control channel, the control channel being constituted by an aggregation of one or more first elements each of which is constituted by a resource obtained by dividing one physical resource block pair, a plurality of physical resource block pairs being configured as a control channel region which is a region to which the control channel is to be possibly mapped, the mobile station apparatus including a first control unit configured to control an antenna port associated with a reference signal used for demodulation of a signal mapped to a corresponding first element in the physical resource block pair.

(7) The mobile station apparatus according to the present invention includes a first radio resource control unit configured to set, for the control channel region, either a first correspondence or a second correspondence to indicate correspondences between signals mapped to the first elements in the physical resource block pair and associated antenna ports, wherein the first control unit is configured to perform control so that the signals mapped to different first elements in the physical resource block pair are to be demodulated using respective reference signals associated with different antenna ports in a case where the first radio resource control unit has set the first correspondence, and is configured to perform control so that the signals mapped to the plurality of first elements in the physical resource block pair are classified into a plurality of groups, the signals mapped to the first elements of the same group are to be demodulated using a reference signal associated with a common antenna port, and the signals mapped to the first elements of different groups are to be demodulated using respective reference signals associated with different antenna ports in a case where the first radio resource control unit has set the second correspondence.

(8) In the mobile station apparatus according to the present invention, the first radio resource control unit is configured to set, based on an instruction given by the base station apparatus, an antenna-port set from among a plurality of antenna-port sets constituted by a plurality of different antenna ports in a case where the first radio resource control unit has set the second correspondence.

(9) A base station apparatus according to the present invention is a base station apparatus configured to communicate with a plurality of mobile station apparatuses using a control channel, the control channel being constituted by an aggregation of one or more first elements each of which is constituted by a resource obtained by dividing one physical resource block pair, a plurality of physical resource block pairs being configured as a control channel region which is a region to which the control channels are to be possibly mapped, the base station apparatus including a second control unit configured to control an antenna port used for transmission of a signal mapped to a corresponding first element in the physical resource block pair.

(10) The base station apparatus according to the present invention includes a second radio resource control unit configured to set, for the control channel region, either a first correspondence or a second correspondence to indicate correspondences between signals mapped to the first elements in the physical resource block pair and associated antenna ports, wherein the second control unit is configured to perform control so that the signals mapped to different first elements in the physical resource block pair are to be transmitted using different antenna ports in a case where the second radio resource control unit has set the first correspondence, and is configured to perform control so that the signals mapped to the plurality of first elements in the physical resource block pair are classified into a plurality of groups, the signals mapped to the first elements of the same group are to be transmitted using a common antenna port, and the signals mapped to the first elements of different groups are to be transmitted using different antenna ports in a case where the second radio resource control unit has set the second correspondence.

(11) In the base station apparatus according to the present invention, the second radio resource control unit is configured to set, for the mobile station apparatus, an antenna-port set from among a plurality of antenna-port sets constituted by a plurality of different antenna ports in a case where the second radio resource control unit has set the second correspondence.

(12) A communication method according to the present invention is a communication method used in a mobile station apparatus configured to communicate with a base station apparatus using a control channel, the control channel being constituted by an aggregation of one or more first elements each of which is constituted by a resource obtained by dividing one physical resource block pair, a plurality of physical resource block pairs being configured as a control channel region which is a region to which the control channel is to be possibly mapped, the communication method including at least a step of controlling an antenna port associated with a reference signal used for demodulation of a signal mapped to a corresponding first element in the physical resource block pair.

(13) A communication method according to the present invention is a communication method used in a base station apparatus configured to communicate with a plurality of mobile station apparatuses using a control channel, the control channel being constituted by an aggregation of one or more first elements each of which is constituted by a resource obtained by dividing one physical resource block pair, a plurality of physical resource block pairs being configured as a control channel region which is a region to which the control channel is to be possibly mapped, the communication method including at least a step of controlling an antenna port used for transmission of a signal mapped to a corresponding first element in the physical resource block pair.

(14) An integrated circuit according to the present invention is an integrated circuit to be mounted in a mobile station apparatus configured to communicate with a base station apparatus using a control channel, the control channel being constituted by an aggregation of one or more first elements each of which is constituted by a resource obtained by dividing one physical resource block pair, a plurality of physical resource block pairs being configured as a control channel region which is a region to which the control channel is to be possibly mapped, the integrated circuit including a first control unit configured to control an antenna port associated with a reference signal used for demodulation of a signal mapped to a corresponding first element in the physical resource block pair.

(15) An integrated circuit according to the present invention is an integrated circuit to be mounted in a base station apparatus configured to communicate with a plurality of mobile station apparatuses using a control channel, the control channel being constituted by an aggregation of one or more first elements each of which is constituted by a resource obtained by dividing one physical resource block pair, a plurality of physical resource block pairs being configured as a control channel region which is a region to which the control channel is to be possibly mapped, the integrated circuit including a second control unit configured to control an antenna port used for transmission of a signal mapped to a corresponding first element in the physical resource block pair.

(16) To achieve the above object, the present invention has made the following measures. Specifically, a communication system according to the present invention is a communication system including: a plurality of mobile station apparatuses; and a base station apparatus configured to communicate with the plurality of mobile station apparatuses using a control channel, the control channel being constituted by an aggregation of one or more first elements each of which is constituted by a resource obtained by dividing one physical resource block pair, a plurality of physical resource block pairs being configured as a control channel region which is a region to which the control channel is to be possibly mapped, wherein the base station apparatus includes a second radio resource control unit configured to set, for each of the mobile station apparatuses, one combination from among a plurality of combinations as for correspondences between the plurality of first elements in the physical resource block pair and a plurality of antenna ports used for transmission of signals mapped to the first elements, and the mobile station apparatus includes a first radio resource control unit configured to set antenna ports each associated with a reference signal used for demodulation of a signal mapped to a corresponding first element in the physical resource block pair.

(17) In the communication system according to the present invention, different first elements in the physical resource block pair are associated with different antenna ports.

(18) A mobile station apparatus according to the present invention is a mobile station apparatus configured to communicate with a base station apparatus using a control channel, the control channel being constituted by an aggregation of one or more first elements each of which is constituted by a resource obtained by dividing one physical resource block pair, a plurality of physical resource block pairs being configured as a control channel region which is a region to which the control channel is to be possibly mapped, the mobile station apparatus including a first reception unit configured receive, from the base station apparatus, information representing one combination from among a plurality of combinations as for correspondences between the plurality of first elements in the physical resource block pair and a plurality of antenna ports used for transmission of signals mapped to the first elements; and a first radio resource control unit configured to set, based on the information representing the one combination received by the first reception unit, antenna ports each associated with a reference signal used for demodulation of a signal mapped to a corresponding first element in the physical resource block pair.

(19) In the mobile station apparatus according to the present invention, different first elements in the physical resource block pair are associated with different antenna ports.

(20) A base station apparatus according to the present invention is a base station apparatus configured to communicate with a plurality of mobile station apparatuses using a control channel, the control channel being constituted by an aggregation of one or more first elements each of which is constituted by a resource obtained by dividing one physical resource block pair, a plurality of physical resource block pairs being configured as a control channel region which is a region to which the control channel is to be possibly mapped, the base station apparatus including a second radio resource control unit configured to set, for each of the mobile station apparatuses, one combination from among a plurality of combinations as for correspondences between the plurality of first elements in the physical resource block pair and a plurality of antenna ports used for transmission of signals mapped to the first elements.

(21) In the base station apparatus according to the present invention, different first elements in the physical resource block pair are associated with different antenna ports.

(22) A communication method according to the present invention is a communication method used in a mobile station apparatus configured to communicate with a base station apparatus using a control channel, the control channel being constituted by an aggregation of one or more first elements each of which is constituted by a resource obtained by dividing one physical resource block pair, a plurality of physical resource block pairs being configured as a control channel region which is a region to which the control channel is to be possibly mapped, the communication method including at least a step of receiving, from the base station apparatus, information representing one combination from among a plurality of combinations as for correspondences between the plurality of first elements in the physical resource block pair and a plurality of antenna ports used for transmission of signals mapped to the first elements; and a step of setting, based on the received information representing the one combination, antenna ports each associated with a reference signal used for demodulation of a signal mapped to a corresponding first element in the physical resource block pair.

(23) A communication method according to the present invention is a communication method used in a base station apparatus configured to communicate with a plurality of mobile station apparatuses using a control channel, the control channel being constituted by an aggregation of one or more first elements each of which is constituted by a resource obtained by dividing one physical resource block pair, a plurality of physical resource block pairs being configured as a control channel region which is a region to which the control channel is to be possibly mapped, the communication method including at least a step of setting, for each of the mobile station apparatuses, one combination from among a plurality of combinations as for correspondences between the plurality of first elements in the physical resource block pair and a plurality of antenna ports used for transmission of signals mapped to the first elements.

(24) An integrated circuit according to the present invention is an integrated circuit to be mounted in a mobile station apparatus configured to communicate with a base station apparatus using a control channel, the control channel being constituted by an aggregation of one or more first elements each of which is constituted by a resource obtained by dividing one physical resource block pair, a plurality of physical resource block pairs being configured as a control channel region which is a region to which the control channel is to be possibly mapped, the integrated circuit including a first reception unit configured receive, from the base station apparatus, information representing one combination from among a plurality of combinations as for correspondences between the plurality of first elements in the physical resource block pair and a plurality of antenna ports used for transmission of signals mapped to the first elements; and a first radio resource control unit configured to set, based on the information representing the one combination received by the first reception unit, antenna ports each associated with a reference signal used for demodulation of a signal mapped to a corresponding first element in the physical resource block pair.

(25) An integrated circuit according to the present invention is an integrated circuit to be mounted in a base station apparatus configured to communicate with a plurality of mobile station apparatuses using a control channel, the control channel being constituted by an aggregation of one or more first elements each of which is constituted by a resource obtained by dividing one physical resource block pair, a plurality of physical resource block pairs being configured as a control channel region which is a region to which the control channel is to be possibly mapped, the integrated circuit including a second radio resource control unit configured to set, for each of the mobile station apparatuses, one combination from among a plurality of combinations each indicating correspondences between the plurality of first elements in the physical resource block pair and a plurality of antenna ports used for transmission of signals mapped to the first elements.

REFERENCE SIGNS LIST 3 base station apparatus
4(A-C) RRH
5(A-C) mobile station apparatus
101 reception processing unit
103 radio resource control unit
105 control unit
107 transmission processing unit
109 receive antenna
111 transmit antenna
201 physical downlink shared channel processing unit
203 physical downlink control channel processing unit
205 downlink pilot channel processing unit
207 multiplexing unit
209 IFFT unit
211 GI insertion unit
213 D/A unit
215 transmission RF unit
219 turbo coding unit
221 data modulation unit
223 convolutional coding unit
225 QPSK modulation unit
227 precoding processing unit (for PDCCH)
229 precoding processing unit (for PDSCH)
231 precoding processing unit (for downlink pilot channel)
301 reception RF unit
303 A/D unit
309 symbol timing detection unit
311 GI removal unit
313 FFT unit
315 subcarrier demapping unit
317 channel estimation unit
319 channel equalization unit (for PUSCH)
321 channel equalization unit (for PUCCH)
323 IDFT unit
325 data demodulation unit
327 turbo decoding unit
329 physical uplink control channel detection unit
331 preamble detection unit
333 SRS processing unit
401 reception processing unit
403 radio resource control unit
405 control unit
407 transmission processing unit
409 receive antenna
411 transmit antenna
501 reception RF unit
503 A/D unit
505 symbol timing detection unit
507 GI removal unit
509 FFT unit
511 demultiplexing unit
513 channel estimation unit
515 channel compensation unit (for PDSCH)
517 physical downlink shared channel decoding unit
519 channel compensation unit (for PDCCH)
521 physical downlink control channel decoding unit
523 data demodulation unit
525 turbo decoding unit
527 QPSK demodulation unit
529 Viterbi decoding unit
531 downlink reception quality measurement unit
533 PDCCH demapping unit
605 D/A unit
607 transmission RF unit
611 turbo coding unit
613 data modulation unit
615 DFT unit
617 uplink pilot channel processing unit
619 physical uplink control channel processing unit
621 subcarrier mapping unit
623 IFFT unit
625 GI insertion unit
627 transmit power adjustment unit
629 random access channel processing unit

The invention claimed is:

1. A mobile station apparatus configured to communicate with a base station apparatus, comprising:
a control circuit configured to set, on the basis of higher layer signaling, two sets of PRB (Physical Resource Block) pairs for monitoring an EPDCCH (Enhanced Physical Downlink Control Channel); and
a reception processing circuit configured to receive the EPDCCH, the EPDCCH transmitted through use of one or more ECCEs (Enhanced Control Channel Element) in either one of the two sets of PRB pairs, which is configured for localized EPDCCH transmission, and a demodulation reference signal, which is associated with the EPDCCH, wherein
an antenna port for the EPDCCH transmission is given by at least an index of the ECCE and a configured value based on the higher layer signaling, the demodulation reference signal is transmitted on the antenna port and on the PRBs upon which the EPDCCH is mapped, in a case that the number of the ECCEs for each of the PRB pairs is four, each of the PRB pairs includes a first ECCE, a second ECCE, a third ECCE and a fourth ECCE, indices of the first ECCE, the second ECCE, the third ECCE, and the fourth ECCE are consecutive, the antenna port of the EPDCCH, which is transmitted by using the first ECCE and the second ECCE, is a first antenna port or a second antenna port, and the antenna port of the EPDCCH, which is transmitted by using the third ECCE and the fourth ECCE, is a third antenna port or a fourth antenna port.

2. The mobile station apparatus according to claim 1, wherein, in a case that the configured value is a first value, the antenna port of the EPDCCH which is transmitted by using the first ECCE and the second ECCE is the first antenna port, and the antenna port of the EPDCCH which is transmitted by using the third ECCE and the fourth ECCE is the third antenna port, and in a case that the configured value is a second value, the antenna port of the EPDCCH which is transmitted by using the first ECCE and the second ECCE is the second antenna port, and the antenna port of the EPDCCH which is transmitted by using the third ECCE and the fourth ECCE is the fourth antenna port.

3. A base station apparatus configured to communicate with a mobile station apparatus, comprising:

a radio resource control circuit configured to set, on the basis of higher layer signaling, two sets of PRB (Physical Resource Block) pairs for monitoring an EPDCCH (Enhanced Physical Downlink Control Channel); and a transmission processing circuit configured to transmit the EPDCCH, which is transmitted through use of one or more ECCEs (Enhanced Control Channel Element) in either one of the two sets of PRB pairs, which is configured for localized EPDCCH transmission, and a demodulation reference signal, which is associated with the EPDCCH, wherein an antenna port for the EPDCCH transmission is given by at least an index of the ECCE and a configured value based on the higher layer signaling, the demodulation reference signal is transmitted on the antenna port and on the PRBs upon which the EPDCCH is mapped, in a case that the number of the ECCEs for each of the PRB pairs is four, each of the PRB pairs includes a first ECCE, a second ECCE, a third ECCE, and a fourth ECCE, indices of the first ECCE, the second ECCE, the third ECCE, and the fourth ECCE are consecutive, the antenna port of the EPDCCH, which is transmitted by using the first ECCE and the second ECCE, is a first antenna port or a second antenna port, and the antenna port of the EPDCCH, which is transmitted by using the third ECCE and the fourth ECCE, is a third antenna port or a fourth antenna port.

4. The base station apparatus according to claim 3, wherein, in a case that the configured value is a first value, the antenna port of the EPDCCH which is transmitted by using the first ECCE and the second ECCE is the first antenna port, and the antenna port of the EPDCCH which is transmitted by using the third ECCE and the fourth ECCE is the third antenna port, and in a case that the configured value is a second value, the antenna port of the EPDCCH which is transmitted by using the first ECCE and the second ECCE is the second antenna port, and the antenna port of the EPDCCH which is transmitted by using the third ECCE and the fourth ECCE is the fourth antenna port.

5. A communication method for a mobile station apparatus configured to communicate with a base station apparatus, comprising:

setting, on the basis of higher layer signaling, two sets of PRB (Physical Resource Block) pairs for monitoring an EPDCCH (Enhanced Physical Downlink Control Channel); and receiving the EPDCCH, which is transmitted through use of one or more ECCEs (Enhanced Control Channel Element) in either one of the two sets of PRB pairs, which is configured for localized EPDCCH transmission, and a demodulation reference signal, which is associated with the EPDCCH, wherein an antenna port for the EPDCCH transmission is given by at least an index of the ECCE and a configured value based on the higher layer signaling, the demodulation reference signal is transmitted on the antenna port and on the PRBs upon which the EPDCCH is mapped, in a case that the number of the ECCEs for each of the PRB pairs is four, each of the PRB pairs includes a first ECCE, a second ECCE, a third ECCE, and a fourth ECCE, indices of the first ECCE, the second ECCE, the third ECCE, and the fourth ECCE are consecutive, the antenna port of the EPDCCH, which is transmitted by using the first ECCE and the second ECCE, is a first antenna port or a second antenna port, and the antenna port of the EPDCCH, which is transmitted by using the third ECCE and the fourth ECCE, is a third antenna port or a fourth antenna port.

6. The communication method according to claim 5, wherein, in a case that the configured value is a first value, the antenna port of the EPDCCH which is transmitted by using the first ECCE and the second ECCE is the first antenna port, and the antenna port of the EPDCCH which is transmitted by using the third ECCE and the fourth ECCE is the third antenna port, and in a case that the configured value is a second value, the antenna port of the EPDCCH which is transmitted by using the first ECCE and the second ECCE is the second antenna port, and the antenna port of the EPDCCH which is transmitted by using the third ECCE and the fourth ECCE is the fourth antenna port.

7. A communication method for a base station apparatus configured to communicate with a mobile station apparatus, comprising:

setting, on the basis of higher layer signaling, two sets of PRB (Physical Resource Block) pairs for monitoring an EPDCCH (Enhanced Physical Downlink Control Channel); and transmitting the EPDCCH, which is transmitted through use of one or more ECCEs (Enhanced Control Channel Element) in either one of the two sets of PRB pairs, which is configured for localized EPDCCH transmission, and a demodulation reference signal, which is associated with the EPDCCH, wherein an antenna port for the EPDCCH transmission is given by at least an index of the ECCE and a configured value based on the higher layer signaling, the demodulation reference signal is transmitted on the antenna port and on the PRBs upon which the EPDCCH is mapped, in a case that the number of the ECCEs for each of the PRB pairs is four, each of the PRB pairs includes a first ECCE, a second ECCE, a third ECCE, and a fourth ECCE, indices of the first ECCE, the second ECCE, the third ECCE, and the fourth ECCE are consecutive, the antenna port of the EPDCCH, which is transmitted by using the first ECCE and the second ECCE, is a first antenna port or a second antenna port, and the antenna port of the EPDCCH, which is transmitted by using the third ECCE and the fourth ECCE, is a third antenna port or a fourth antenna port.

8. The communication method according to claim 7, wherein, in a case that the configured value is a first value, the antenna port of the EPDCCH which is transmitted by using the first ECCE and the second ECCE is the first antenna port, and the antenna port of the EPDCCH which is transmitted by using the third ECCE and the fourth ECCE is the third antenna port, and in a case that the configured value is a second value, the antenna port of the EPDCCH which is transmitted by using the first ECCE and the second ECCE is the second antenna port, and the antenna port of the EPDCCH which is transmitted by using the third ECCE and the fourth ECCE is the fourth antenna port.

* * * * *